(12) United States Patent
Kim et al.

(10) Patent No.: US 10,291,090 B2
(45) Date of Patent: May 14, 2019

(54) MOTOR ASSEMBLY AND METHOD FOR PROVIDING THE SAME

(71) Applicant: SAMSUNG ELECTRONICS CO., LTD., Suwon-si (KR)

(72) Inventors: Young Kwan Kim, Anyang-si (KR); Byung Ryel In, Suwon-si (KR); Deok Jin Kim, Hwaseong-si (KR); Kwang Soo Kim, Seoul (KR); Jong Jin Park, Suwon-si (KR); Myung Bae Bang, Yongin-si (KR); Keun Young Yoon, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 382 days.

(21) Appl. No.: 14/729,466

(22) Filed: Jun. 3, 2015

(65) Prior Publication Data
US 2015/0357871 A1    Dec. 10, 2015

(30) Foreign Application Priority Data

Jun. 5, 2014    (KR) .................. 10-2014-0068328
Dec. 19, 2014  (KR) .................. 10-2014-0184622

(51) Int. Cl.
| H02K 1/28 | (2006.01) |
| H02K 7/04 | (2006.01) |
| B29C 65/48 | (2006.01) |
| H02K 1/27 | (2006.01) |
| H02K 1/30 | (2006.01) |
| H02K 15/03 | (2006.01) |

(52) U.S. Cl.
CPC .............. *H02K 1/28* (2013.01); *B29C 65/48* (2013.01); *H02K 1/2733* (2013.01); *H02K 1/30* (2013.01); *H02K 7/04* (2013.01); *H02K 15/03* (2013.01)

(58) Field of Classification Search
CPC .......... H02K 1/2733; H02K 1/28; H02K 1/30; H02K 7/04; H02K 15/03; B29C 65/48
USPC .................. 310/51, 156.21; 264/262; 29/596
IPC ................................... H02K 1/28; B29C 65/48
See application file for complete search history.

(56) References Cited

U.S. PATENT DOCUMENTS

| 5,568,681 | A | * | 10/1996 | Chudi | ................ | H02K 15/028 |
| | | | | | | 29/447 |
| 5,936,324 | A | * | 8/1999 | Montagu | .............. | H02K 1/2726 |
| | | | | | | 310/156.11 |
| 9,653,975 | B2 | * | 5/2017 | Ishimatsu | .............. | H02K 1/276 |
| 2003/0182787 | A1 | * | 10/2003 | Nilson | ................ | H02K 1/2726 |
| | | | | | | 29/598 |

(Continued)

FOREIGN PATENT DOCUMENTS

| EP | 2 670 031 A1 | 12/2013 |
| JP | 7-312853 | 11/1995 |

(Continued)

OTHER PUBLICATIONS

Takahashi et al (JP 2000-201444 ), English translation, 2018.*

(Continued)

*Primary Examiner* — John K Kim
(74) *Attorney, Agent, or Firm* — Staas & Halsey LLP

(57) ABSTRACT

A motor assembly having an internal channel passing an interior of a rotor, and a method for producing the same are provided. The motor assembly includes an adhesive flowing along the internal channel, and the rotor can be firmly coupled and improving durability and production efficiency of the rotor.

14 Claims, 61 Drawing Sheets

(56) References Cited

U.S. PATENT DOCUMENTS

| | | | | |
|---|---|---|---|---|
| 2004/0256939 A1* | 12/2004 | Kim | ............... | H02K 21/46 |
| | | | | 310/156.53 |
| 2006/0186752 A1* | 8/2006 | Matsumoto | ............ | H02K 1/276 |
| | | | | 310/156.53 |
| 2012/0049662 A1* | 3/2012 | Ions | ................ | H02K 1/2733 |
| | | | | 310/43 |
| 2015/0061445 A1* | 3/2015 | Ishimatsu | ............. | H02K 1/276 |
| | | | | 310/156.21 |
| 2015/0357871 A1* | 12/2015 | Kim | ............... | H02K 1/28 |
| | | | | 310/51 |

FOREIGN PATENT DOCUMENTS

| | | |
|---|---|---|
| JP | 2000-201444 | 7/2000 |
| JP | 2002-10545 | 1/2002 |
| JP | 2004-129466 | 4/2004 |

OTHER PUBLICATIONS

Extended European Search Report dated Nov. 16, 2015 in European Patent Application No. 15170735.3.

European Intention to Grant dated Nov. 15, 2017 in corresponding European Application No. 15 170 735.3.

\* cited by examiner

MOTOR ASSEMBLY AND METHOD FOR PROVIDING THE SAME

CROSS-REFERENCE TO RELATED APPLICATIONS

This application is related to, and claims the priority benefit of Korean Patent Application Nos. 10-2014-0068328 and 10-2014-0184622, filed on Jun. 5, 2014 and Dec. 19, 2014, respectively, in the Korean Intellectual Property Office, the disclosures of which are incorporated herein by reference.

BACKGROUND

1. Field

Embodiments of the present invention relate to a motor assembly having an improved structure of a rotor and a method for producing the same.

2. Description of the Related Art

In general, vacuum cleaners are household appliances that suck up air in which foreign materials such as dirt are contained using a vacuum pressure generated by a motor mounted in a main body thereof and then filter the foreign materials in the main body.

The motor generates suction by discharging the air inside the vacuum cleaner to the outside to reduce an internal pressure. The generated suction allows the foreign materials such as dirt to be sucked from a floor to be cleaned along with external air by a suction and to be removed by a dust collector.

Such a motor is a machine that may generate a rotating force from electric energy and may be equipped with a stator and a rotor. The rotor is configured to electromagnetically interact with the stator, and may be rotated by a force acting between a magnetic field and a current flowing through a coil.

When the rotor of the motor is rotated, the suction may be generated by a suction fan rotated together with the rotor. These components may be disposed as a module. However, spaces for the motor, components fixing the motor, the suction fan, etc. interfere with each other. As a result, the overall size of the vacuum cleaner is increased.

SUMMARY

It is an aspect of the present invention to provide a motor assembly in which a structure of a rotor is improved to be able to increase production efficiency and durability of the rotor, and a method for producing the same.

Additional aspects of the invention will be set forth in part in the description which follows and, in part, will be obvious from the description, or may be learned by practice of the invention.

In accordance with an aspect of the present invention, a motor assembly includes a stator having a rotor receptacle, and a rotor disposed in the rotor receptacle to electromagnetically interact with the stator. The rotor includes a rotor shaft to be rotated about a rotor axis, a magnet disposed on the rotor shaft to form a magnetic field and having a magnet bonding channel along which an adhesive for adhering the rotor shaft and the magnet flows, and a support member disposed on the magnet in a direction of the rotor axis and having an adhesive channel along which the adhesive to adhere the support member and the magnet flows and that communicates with the magnet bonding channel.

The magnet bonding channel may be formed between an outer circumferential surface of the rotor shaft and an inner circumferential surface of the magnet such that the adhesive flows.

The support member may include a first support member disposed at one side of the magnet in the direction of the rotor axis, and a second support member disposed at the other side of the magnet in the direction of the rotor axis.

The support member may include a balancer to prevent eccentricity of the rotor.

The adhesive channel may be formed and bent between the support member and the magnet, and the magnet bonding channel may be formed and bent between the magnet and the rotor shaft.

The adhesive channel may include a first channel provided in the first support member such that the adhesive flows between the first support member and one side of the magnet, and a second channel configured to communicate with the first channel via the magnet bonding channel and provided in the second support member such that the adhesive flows between the second support member and the other side of the magnet.

The first channel and the second channel may include a plurality of first channels and a plurality of second channels, respectively. The plurality of first channels and the plurality of second channels may be disposed around the rotor axis at intervals in a circumferential direction.

The first channel may include an inflow channel provided in an outer surface of the first support member so as to communicate with an inlet into which the adhesive flows, and a first flow channel, which communicates with the inflow channel, is provided in an inner surface of the first support member facing the one side of the magnet, and is formed toward the rotor axis. The second channel may include a second flow channel, which communicates with the magnet bonding channel, provided in an inner surface of the second support member facing the other side of the magnet, and is radially formed around the rotor axis, and an outflow channel that is provided in an outer surface of the second support member and communicates with the second flow channel and an outlet out of which the adhesive flows.

The inlet and the outlet may be disposed apart from the rotor shaft.

The inflow channel and the outflow channel may be spaced apart from the rotor shaft in a direction parallel to the rotor shaft, and be provided to pass through the first support member and the second support member respectively.

The magnet bonding channel may be formed between the rotor shaft and the magnet in a range between one side and the other side of the magnet at the rotor shaft.

The support member may include an adhesion portion that faces the magnet, and an anti-leakage groove that is recessed with respect to the adhesion portion and is provided to prevent the adhesive flowing along the adhesive channel from being discharged outside the rotor.

The anti-leakage groove may include an outer anti-leakage groove that is disposed outside the first and second channels around the rotor axis and that is formed around the rotor axis in a circumferential direction.

The first channel and the second channel may include a plurality of first channels and a plurality of second channels that are disposed around the rotor axis at intervals in a circumferential direction respectively. The anti-leakage groove may include inner anti-leakage grooves that are spaced around the rotor axis in the circumferential direction and are disposed between the plurality of first channels and the plurality of second channels.

The magnet may include a carbon fiber provided on an outer circumferential surface thereof in order to prevent the magnet from being separated when the rotor is rotated.

In accordance with an aspect of the present invention, a method for producing a motor assembly includes preparing a rotor shaft, a magnet, a center of which the rotor shaft passes, and a pair of support members, the centers of which the rotor shaft passes, which are disposed at upper and lower sides of the magnet, and that have an adhesive channel along which an adhesive flows, and forcing the adhesive to flow through the adhesive channel to adhere the pair of support members and the magnet, and the magnet and the rotor shaft.

The pair of support members may include a first support member disposed at one side of the magnet, and a second support member disposed at the other side of the magnet. The adhesive channel may include a first channel provided in the first support member such that the adhesive flows between the first support member and the one side of the magnet, a magnet bonding channel configured to communicate with the first channel and formed between the magnet and the rotor shaft, and a second channel configured to communicate with the magnet bonding channel and provided such that the adhesive flows between the second support member and the other side of the magnet. The adhesive may come into contact with the pair of support member, the magnet, and the rotor shaft while flowing along the first channel, the magnet bonding channel, and the second channel.

The first channel may include an inflow channel that is provided in an outer surface of the first support member so as to communicate with an inlet into which the adhesive flows, and a first flow channel that communicates with the inflow channel, is provided in an inner surface of the first support member facing the one side of the magnet, and is formed toward the rotor axis. The second channel may include a second flow channel that communicates with the magnet bonding channel, is provided in an inner surface of the second support member facing the other side of the magnet, and is radially formed around the rotor axis, and an outflow channel that is provided in an outer surface of the second support member and communicates with the second flow channel and an outlet out of which the adhesive flows.

In accordance with an aspect of the present invention, a motor assembly includes a stator having a rotor receptacle, and a rotor disposed in the rotor receptacle and provided to electromagnetically interact with the stator. The rotor includes a rotor shaft provided to be rotated about a rotor axis, a magnet disposed on the rotor shaft so as to form a magnetic field together with the stator, a balancer disposed on the magnet in a direction of the rotor axis, and an internal channel provided such that an adhesive for adhering the rotor shaft, the magnet, and the balancer flows between the rotor shaft, the magnet, and the balancer.

The internal channel may include an adhesive channel along which the adhesive flows so as to pass the balancer and the magnet, and a magnet bonding channel provided to pass the magnet and the rotor shaft.

The balancer may include a first balancer disposed at one side of the magnet in the direction of the rotor axis, and a second balancer disposed at the other side of the magnet in the direction of the rotor axis.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
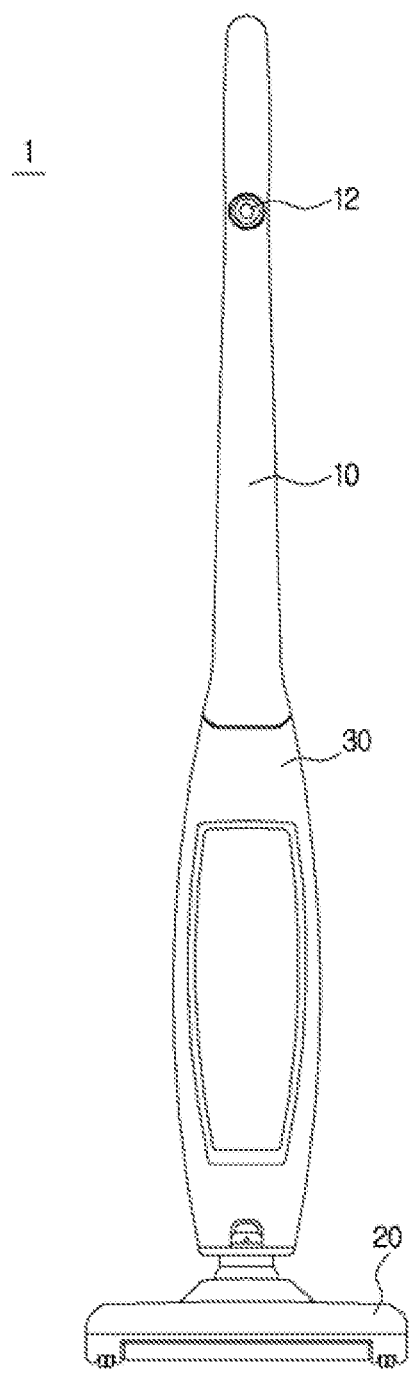
FIG. 1 is a view illustrating a vacuum cleaner according to an embodiment of the present invention.

Reference will now be made in detail to exemplary embodiments of the present invention, examples of which are illustrated in the accompanying drawings, wherein like reference numerals refer to like elements throughout.

Figure 2:
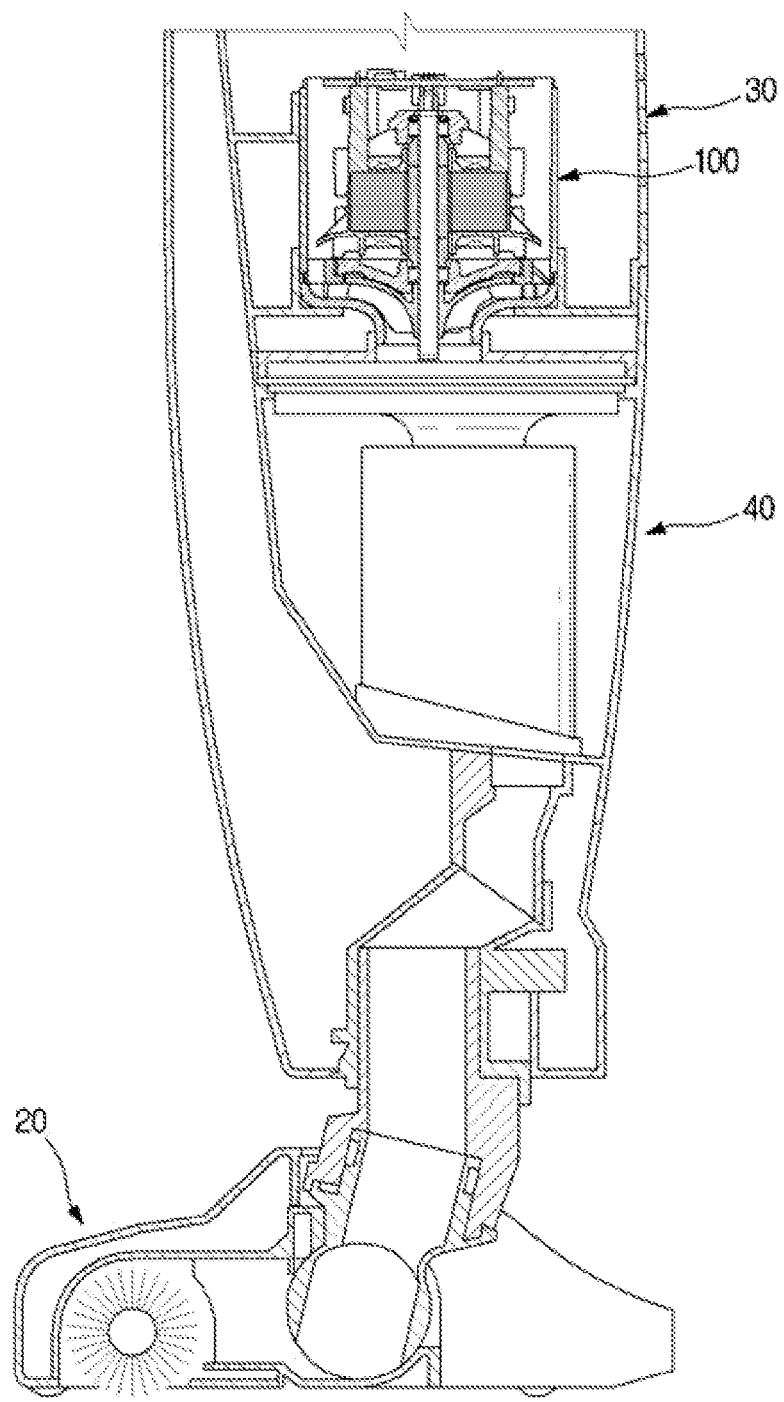
FIG. 2 is a cross-sectional view of some components of the vacuum cleaner according to the an embodiment of the present invention.

FIG. 1 is a view illustrating a vacuum cleaner according to an embodiment of the present invention. FIG. 2 is a cross-sectional view of some components of the vacuum cleaner according to an embodiment of the present invention.

The vacuum cleaner 1 according to an embodiment of the present invention may be applied to a stick vacuum cleaner.

The vacuum cleaner 1 according to an embodiment of the present invention includes a stick body 10, a suction section 20, and a cleaner body 30.

The stick body 10 is a portion coupled to an upper end of the cleaner body 30. A user can grasp the stick body 10 to operate the vacuum cleaner 1. The stick body 10 may be provided with a controller 12 so as to enable the user to control the vacuum cleaner 1.

The suction section 20 may be provided at a lower portion of the cleaner body 30 such that it can come into contact with the floor to be cleaned. The suction section 20 may be provided to come into contact with the floor to be cleaned so as to allow dirt or filth on the floor to be introduced into the cleaner body 30 by suction generated from a motor assembly 100.

The cleaner body 30 includes the motor assembly 100 installed therein, and a dust container 40. The motor assembly 100 may be driven to generate suction in the cleaner body 30, and the dust container 40 may be provided to be disposed upstream of an air flow relative to the motor assembly 100 such that dirt or filth can be filtered and collected from the air introduced from the suction section 20.

Figure 3:
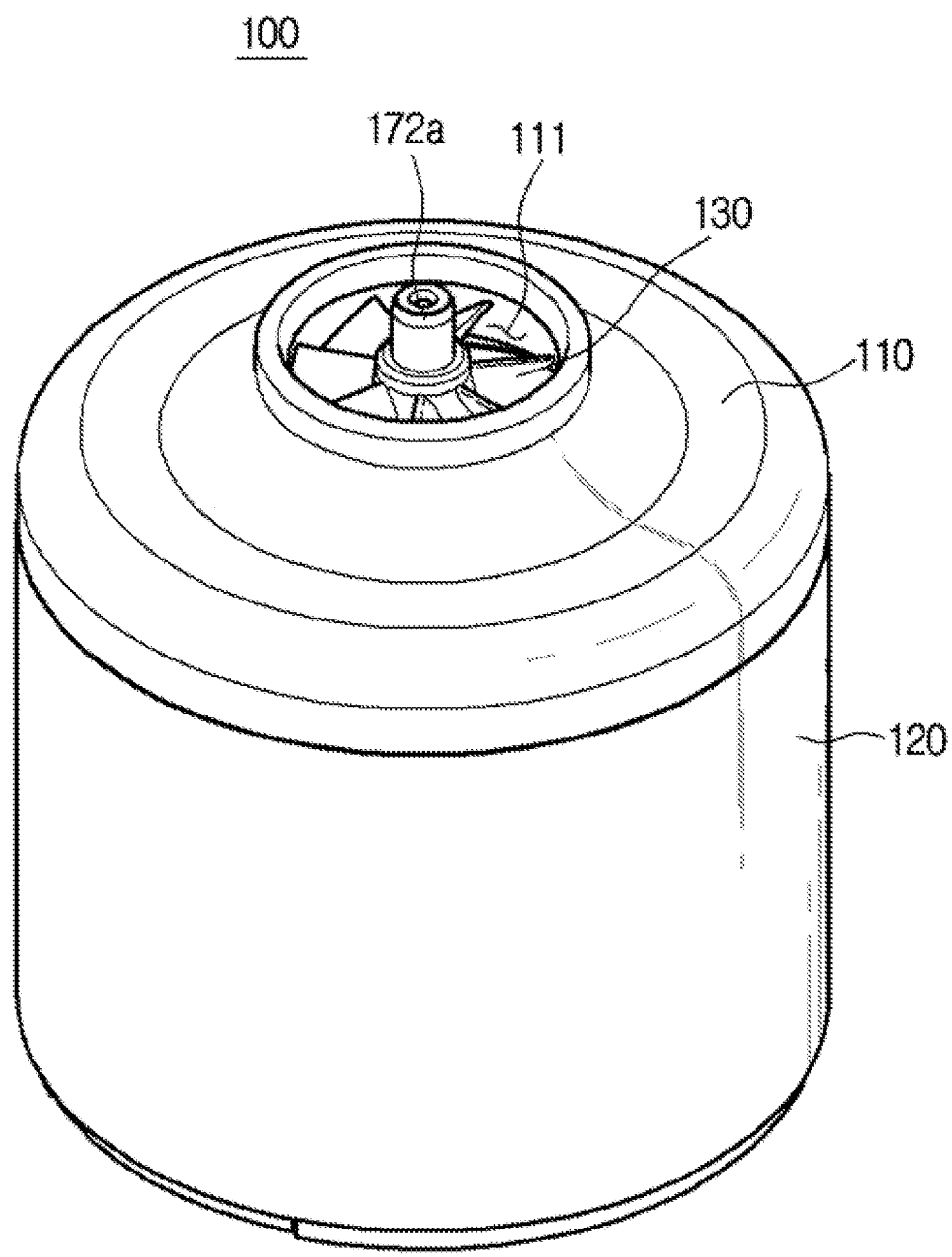
FIG. 3 is a perspective view of a motor assembly according to an embodiment of the present invention.
Figure 4:
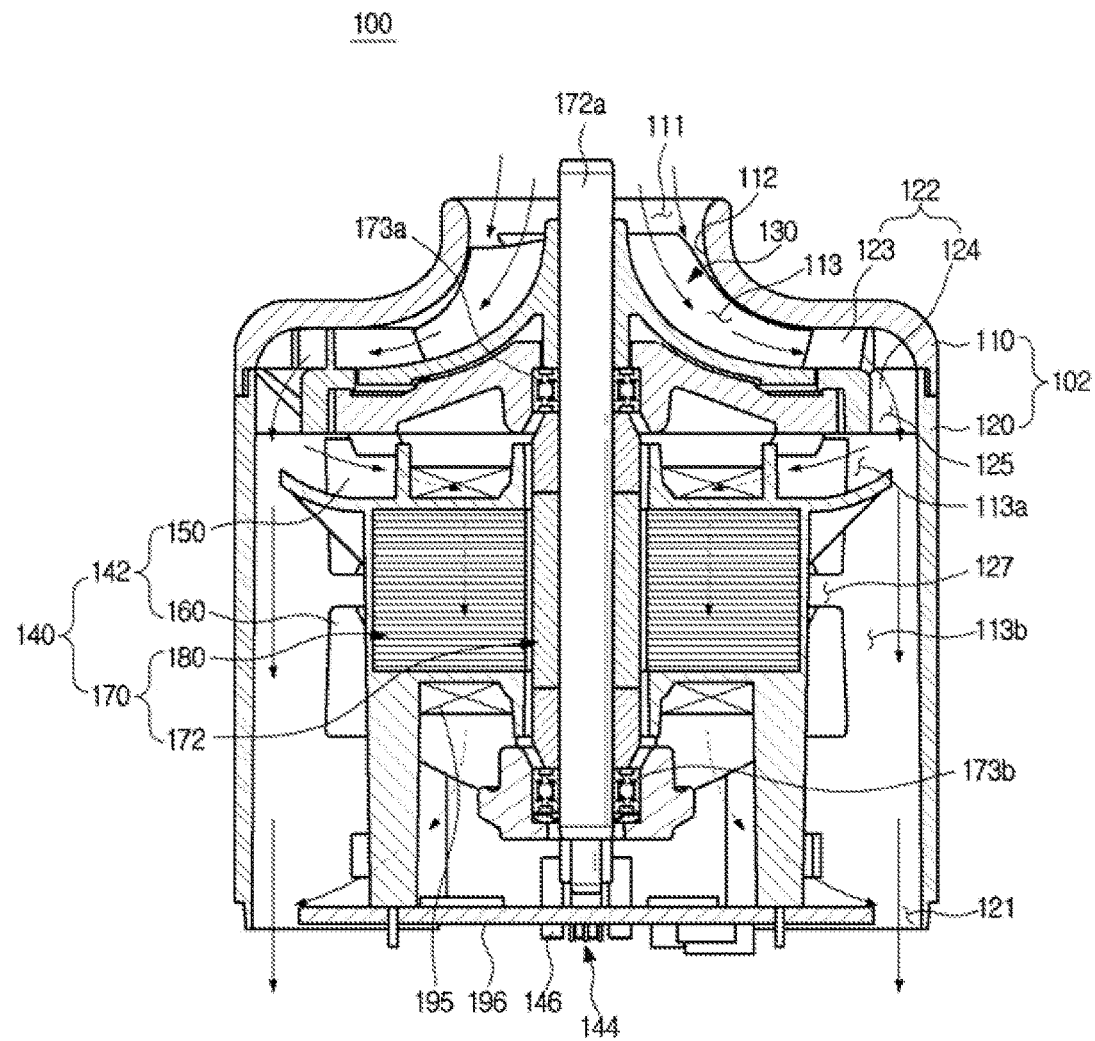
FIG. 4 is a cross-sectional view of the motor assembly according to an embodiment of the present invention.
Figure 5:
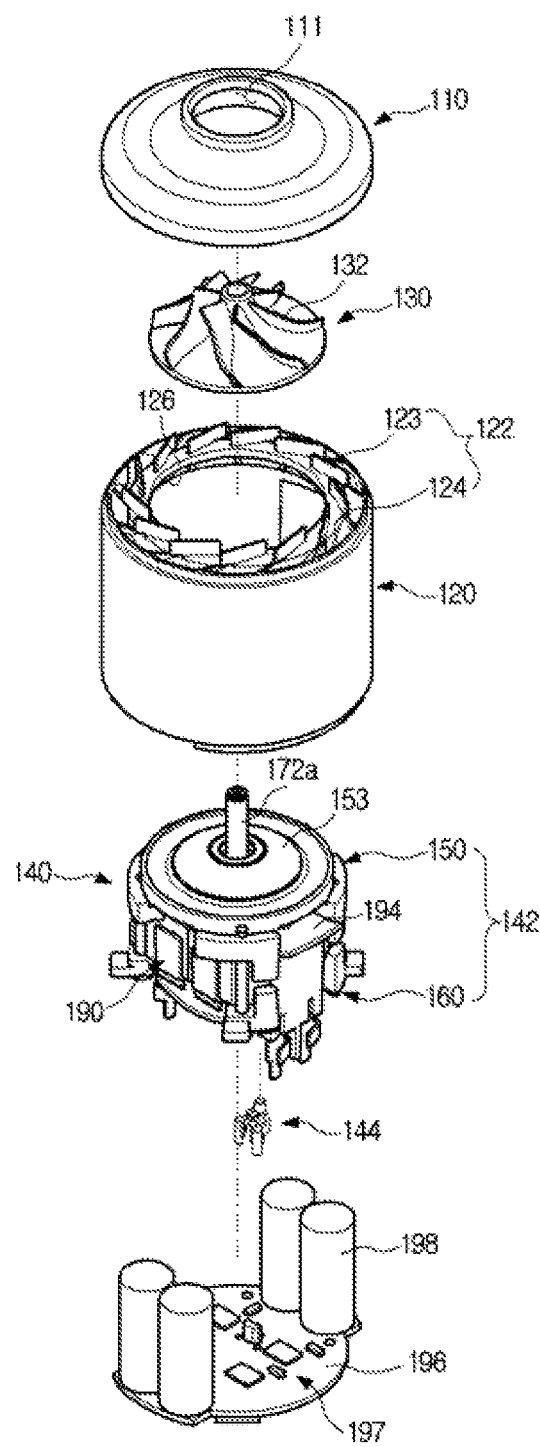
FIG. 5 is an exploded perspective view of the motor assembly according to an embodiment of the present invention.

FIG. 3 is a perspective view of a motor assembly according to an embodiment of the present invention. FIG. 4 is a cross-sectional view of the motor assembly according to an embodiment of the present invention. FIG. 5 is an exploded perspective view of the motor assembly according to an embodiment of the present invention.

The motor assembly 100 may be provided inside the cleaner body 30 so as to generate suction.

The motor assembly 100 may include a housing 102, a motor 170 that is installed in the housing 102 and generates suction, a motor housing 142 that may be provided in the housing 102 to fix the motor 170, and an impeller 130 that may be rotatably installed on a rotor shaft 172b of the motor 170.

The housing 102 includes a first housing 110, and a second housing 120 provided to be coupled with the first housing 110. The housing 102 may be provided to have an approximately cylindrical shape. However, the shape of the housing 102 is not limited to such a shape, and may be variously provided. The first housing 110 and the second housing 120 may be provided to be separable in an axial direction of a rotor shaft 172b. The first housing 110 may be provided with an air suction port 111 through which the air is introduced into the housing 102 by the motor 170, and the second housing 120 is provided with an air discharge port 121 through which the air introduced into the housing 102 is discharged. The second housing 120 may be coupled with the first housing 110 at the back of the first housing 110. Thus, the air suction port 111 may be provided in the front of the housing 102, and the air discharge port 121 may be provided in the rear of the housing 102. However, the air suction port 111 and the air discharge port 121 are not limited to such arrangement.

The first housing 110 and the second housing 120 may be coupled to define an air flow path 113 that runs from the air suction port 111 to the air discharge port 121 as well as an internal space 127 in which the motor 170 or the impeller 130 is disposed.

The air flow path 113 may include a module flow path 113a and a module external flow path 113b. The air may be sucked by the impeller 130 of the motor assembly 100, and the sucked air flows along the air flow path 113. The air introduced into the housing 102 may flow along the module flow path 113a into a motor module 140 due to a flow path guide 194 of an insulator 190, and along the module external flow path 113b between an exterior of the motor module 140 and an interior of the housing 102. The sucked air passing the module flow path 113a can cool heat generated from an interior of the motor module 140. The sucked air passing the module flow path 113a and the sucked air passing the module external flow path 113b can cool heat generated from a circuit board 196 while passing the circuit board 196.

The first housing 110 may include a shroud 112.

The shroud 112 may be provided to correspond to the impeller 130 or a diffuser 122, and guides the air introduced into the housing 102 by the motor 170. The shroud 112 may be provided such that the flow path is widened in a flowing direction of the air sucked from the air suction port 111 by the motor 170 and such that a space formed by the shroud 112 is widened with respect to the axial direction of the rotor shaft 172b. The shroud 112 causes the air introduced through the air suction port 111 to be guided into the housing 102, and may be provided in a shape corresponding to an upper portion of the impeller 130.

The impeller 130 may be provided inside the air suction port 111 of the first housing 110. The impeller 130 may be provided to be rotated together with the rotor shaft 172b. The impeller 130 may be provided with a plurality of blades 132 generating a flow of air. The impeller 130 may be provided such that the radius of gyration of each blade 132 is reduced in a direction in which the plurality of blades 132 get away from the rotor 172. The plurality of blades 132 are provided to discharge the air, which is introduced toward the rotor shaft 172b by the rotation of the impeller 130, in a radial direction of the rotor shaft 172b. An example of the impeller 130 has been described. The shape and arrangement of the impeller 130 are not limited. Various structures may be used as long as it causes the air to flow.

A material of the impeller 130 may include a plastic. The impeller 130 may be formed of a carbon fiber reinforced plastic containing a carbon fiber.

The second housing 120 may include a diffuser 122. The diffuser 122 may be provided to increase a flow rate of the air flowing with an impeller 130. The diffuser 122 may be provided to be disposed outside in a radial direction of the impeller 130.

The diffuser 122 may be provided in a radial direction with respect to the impeller 130. The diffuser 122 may be formed in a direction in which it extends with respect to the plurality of blades 132 of the impeller 130. The diffuser 122 may be made up of a plurality of ribs 123 and 124. The plurality of ribs 123 and 124 of the diffuser 122 may be formed in a direction in which they extend with respect to the plurality of blades 132 of the impeller 130 such that an interval between the neighboring ribs is gradually increased. The plurality of ribs 123 and 124 may be formed to increase the flow rate of the air while guiding the air flowing with the impeller 130. The diffuser 122 and the shroud 112 formed at the first housing 110 form a diffuser flow path 125 so as to increase the flow rate of the air while guiding the air flowing with the impeller 130.

The plurality of ribs 123 and 124 may include first ribs 123 and second ribs 124. The first ribs 123 may be provided on the same plane as a downstream end of the air flow caused by the impeller 130, and the second ribs 124 are formed to have a predetermined inclination in a direction of a rotor axis 172a such that the air guided by the first ribs 123 flows into the housing 102 in an upward/downward direction that is the direction of the rotor axis 172a.

The motor module 140 may be provided in the housing 102. The motor module 140 may be provided such that the motor 170 is fixed in the housing 102 as one module.

The motor module 140 may include the motor 170 and the motor housing 142.

The motor housing 142 may include a front motor housing 150 and a rear motor housing 160 that is provided to be coupled with the front motor housing 150 across the motor 170.

The front motor housing 150 may be provided to be able to be fixed to the housing 102. A seating hole 126 may be formed in the center of the second housing 120 such that the front motor housing 150 is coupled, and thus the front motor housing 150 can be coupled to the seating hole 126. For example, the front motor housing 150 may be fitted into the seating hole 126. The coupling method is not restricted.

The front motor housing 150 may include a front motor housing body 151, an impeller seat 153, and a front seat 154. The front motor housing body 151 may be formed in an approximate disc shape, and include a body coupler 152 corresponding to a shape of the seating hole 126 so as to be coupled to the seating hole 126 of the second housing 120.

The impeller seat 153 may be provided on a front surface of the front motor housing body 151 such that the impeller 130 is seated thereon. A front surface of the impeller seat 153 may be provided to correspond to a shape of a rear surface of the impeller 130 in order to avoid interfering with rotation of the impeller 130 coupled to the rotor shaft 172b.

The front seat 154 may be provided on a rear surface of the front motor housing body 151 such that the motor 170 may be seated thereon. The front seat 154 may be provided to seat and fix a stator 180 such that the center of a rotor 172 provided rotatably may be disposed to be identical to the rotational center of the impeller 130.

The shape of the front seat 154 is not restricted. According to an embodiment of the present invention, the front seat 154 may be formed to protrude from the front motor housing body 151 such that the motor 170 can be seated at a predetermined distance from the front motor housing body 151.

The arrangement of the front seat 154 is not restricted. According to an embodiment of the present invention, four front seats 154 may be disposed to correspond to respective ends of the stator 180 because the stator 180 may be formed long in a first direction w1.

The rear motor housing 160 may be provided to be able to be coupled with the front motor housing 150. The motor 170 may be disposed between the front motor housing 150 and the rear motor housing 160.

The rear motor housing 160 may include a rear motor housing body 161 and a rear seat 164. The rear motor housing body 161 may be formed long in a lengthwise direction of the stator 180 so as to correspond to a shape of the stator 180.

The arrangement of the rear seat 164 is not restricted. According to an embodiment of the present invention, four rear seats 164 may be disposed to correspond to respective ends of the stator 180 because the stator 180 may be formed long in the lengthwise direction.

The front and rear motor housings 150 and 160 may be respectively provided with screw holes 151b and 161b such that they can be coupled to each other by screws 148.

A structure in which the motor 170 may be fixed in the front and rear motor housings 150 and 160 is described.

Figure 6A:
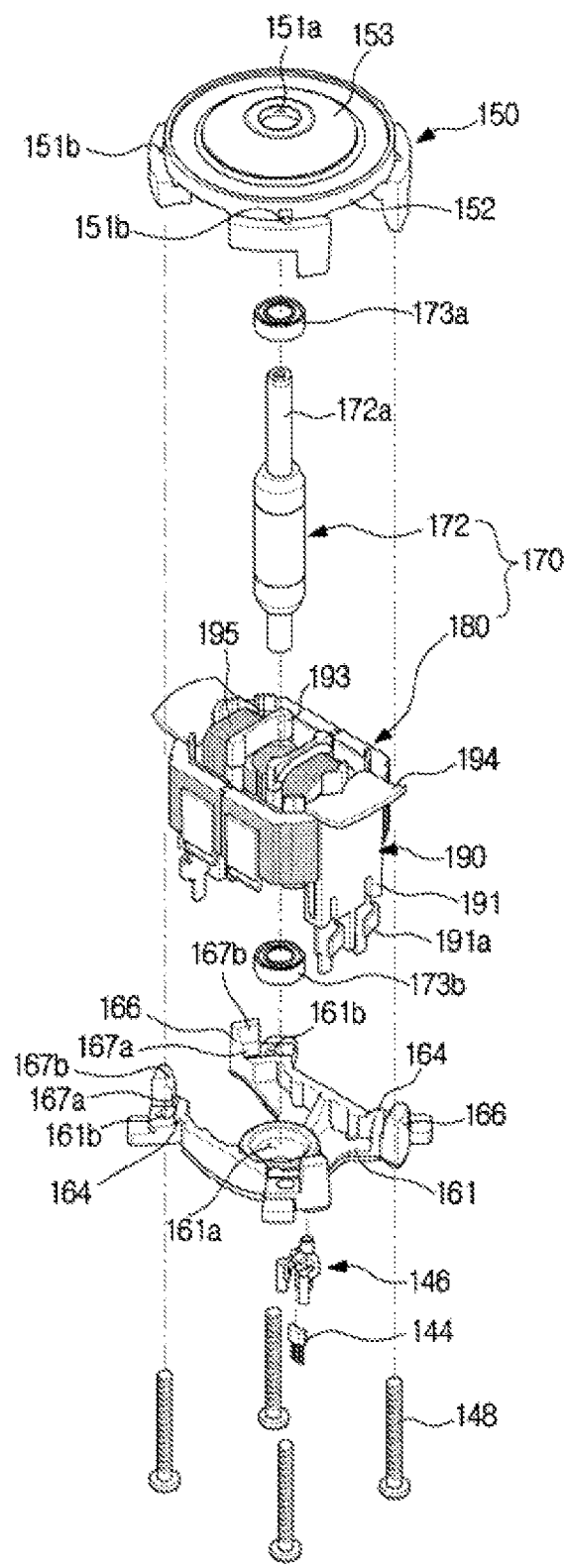
FIGS. 6A and 6B are exploded perspective views of a motor module according an embodiment of the present invention.
Figure 6B:
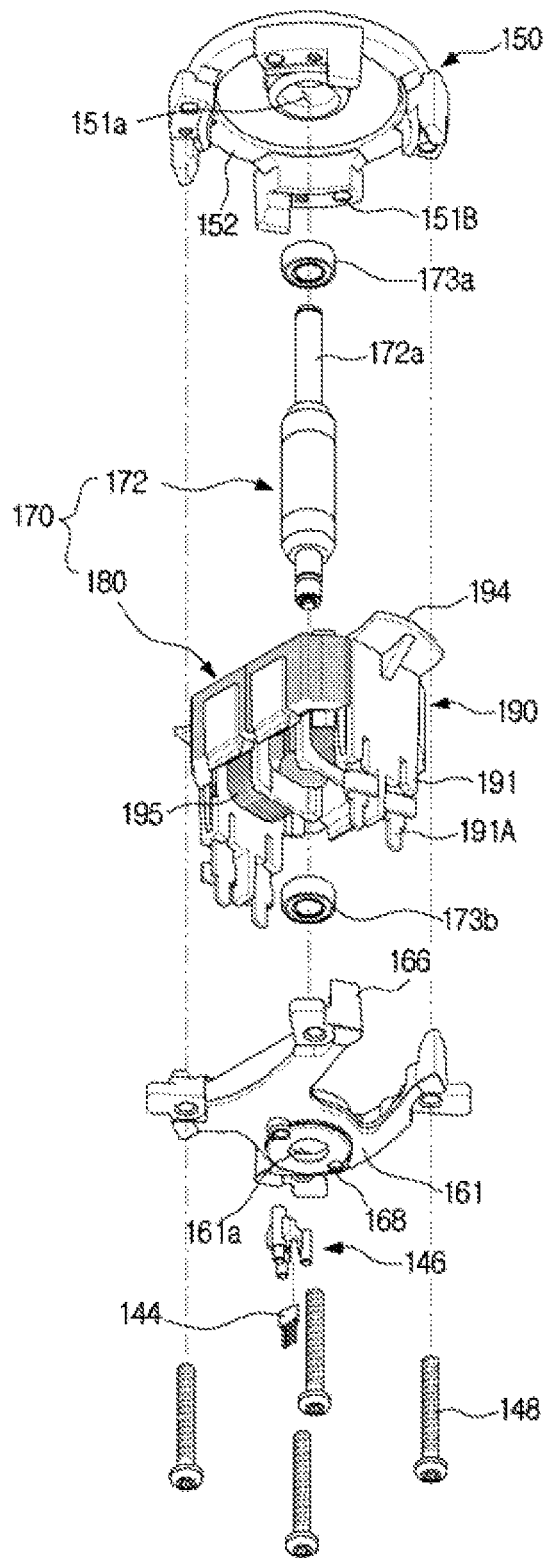

FIGS. 6A and 6B are exploded perspective views of a motor module according to an embodiment of the present invention.

The centers of the front and rear motor housings 150 and 160 may be respectively provided with front and rear through-holes 151a and 161a through which the rotor shaft 172b can pass. Front and rear bearings 173a and 173b may be disposed in the respective front and rear through-holes 151a and 161a for the rotation of the rotor shaft 172b.

The front motor housing 150 may include front seating protrusions 156 in addition to the front seats 154.

The front seats 154 may be provided inside the front motor housing 150 such that one side of the motor 170 may be seated thereon. The front through-hole 151a may be formed in the center of the plurality of front seats 154 such that the centers of the rotor 172, the impeller 130, and the diffuser 122 are identical to each other in a state in which the stator 180 may be seated on or fixed to the front seats 154.

The front seating protrusions 156 may be formed to protrude from the front motor housing body 151 of the front motor housing 150 along circumferences of the front seats 154 such that the motor 170 may be enclosed with inner surfaces thereof. The front seating protrusions 156 prevent the motor 170 from being deflected in a direction perpendicular to the rotor axis 172a when the motor assembly 100 is operated. The front surface of the motor 170 may be seated on the front seats 154, and lateral surfaces of the motor 170 are seated on front protrusion seating faces 156a of the front seating protrusions 156. The front seating protrusions 156 may be formed with front guide faces 156b that guide the motor 170 to be easily seated on the front seats 154. The front guide faces 156b may be provided with ends of the front seating protrusions 156 such that they can be formed inward so as to have a predetermined angle of inclination. The front guide faces 156b may be provided to be connected to the front protrusion seating faces 156a.

The front motor housing body 151 of the front motor housing 150 may be formed in an approximately circular shape, and four front seating protrusions 156 are disposed to protrude from the front motor housing body 151 of the front motor housing 150.

The rear motor housing 160 may include rear seating protrusions 166 in addition to the rear seats 164.

The rear seats 164 may be provided inside the rear motor housing 160 such that the other side of the motor 170 may be seated thereon. The rear through-hole 161a may be formed in the center of the plurality of rear seats 164 such that the centers of the rotor 172, the impeller 130, and the diffuser 122 are identical to each other in a state in which the stator 180 may be seated on or fixed to the rear seats 164.

The rear seating protrusions 166 may be formed to protrude from the rear motor housing body 161 of the rear motor housing 160 along circumferences of the rear seats 164 such that the motor 170 may be enclosed with inner surfaces thereof. The rear seating protrusions 166 prevent the motor 170 from being deflected in a direction perpendicular to the rotor axis 172a when the motor assembly 100 is operated in cooperation with the front seating protrusions 156.

The rear seating protrusions 166 may be provided with rear guide faces 167b such that the motor 170 may be easily seated on the rear seats 164 when the motor 170 and the rear seating protrusions 166 are coupled. The rear guide faces 167b may be formed inward so as to have a predetermined angle of inclination. The rear surface of the motor 170 may be seated on the rear seats 164, and the lateral surfaces of the motor 170 are seated on rear protrusion seating faces 167a of the rear seating protrusions 166. The rear seating protrusions 166 may be formed with the rear guide faces 167b that guide the motor 170 to be easily seated on the rear seats 164. The rear guide faces 167b may be provided with ends of the rear seating protrusions 166 such that they can be formed to have a predetermined angle of inclination. The rear guide faces 167b may be provided to be connected to the rear protrusion seating faces 167a.

The rear motor housing body 161 of the rear motor housing 160 may be formed long in the lengthwise direction, i.e., the first direction w1, of the stator 180 so as to correspond to the shape of the stator 180 to be described below. Four rear seating protrusions 166 may be provided to be disposed at positions that correspond to the front seating protrusions 156 of the front motor housing 150.

The rear motor housing 160 may be provided with a magnet sensor 144.

The magnet sensor 144 may be provided on the same axis as a magnet of the rotor 172, and can detect a position according to the rotation of the rotor 172. This information may be transmitted to a position sensor (not shown) of the circuit board 196. Thereby, it is possible to perform position control of the rotor 172.

The magnet sensor 144 may be disposed to be seated on a sensor bracket 146, and transmits the information to the position sensor (not shown) of the circuit board 196. The sensor bracket 146 may be provided such that one end thereof may be coupled to a sensor seat 168 provided on the rear surface of the rear motor housing 160 and the other end thereof may be coupled to the circuit board 196. The position sensor may not be directly located at the rotor 172, but the magnet sensor 144 may be disposed near the rotor 172. Thereby, the position control of the rotor 172 can be realized by adding a simple structure.

The front and rear motor housings 150 and 160 may be provided with the respective screw holes 151b and 161b such that they can be coupled to each other by the screws 148. According to an embodiment, the screw holes 151b may be respectively formed in the four front seats 154, and the screw holes 161b may be respectively formed in the four rear seats 164. The screws 148 may be provided to pass through the screw holes 161b of the rear seats 164 and to be coupled to the corresponding screw holes 151b of the front seats 154. That is, the front and rear motor housings 150 and 160 can be fixedly coupled by the four screws 148.

Figure 7:
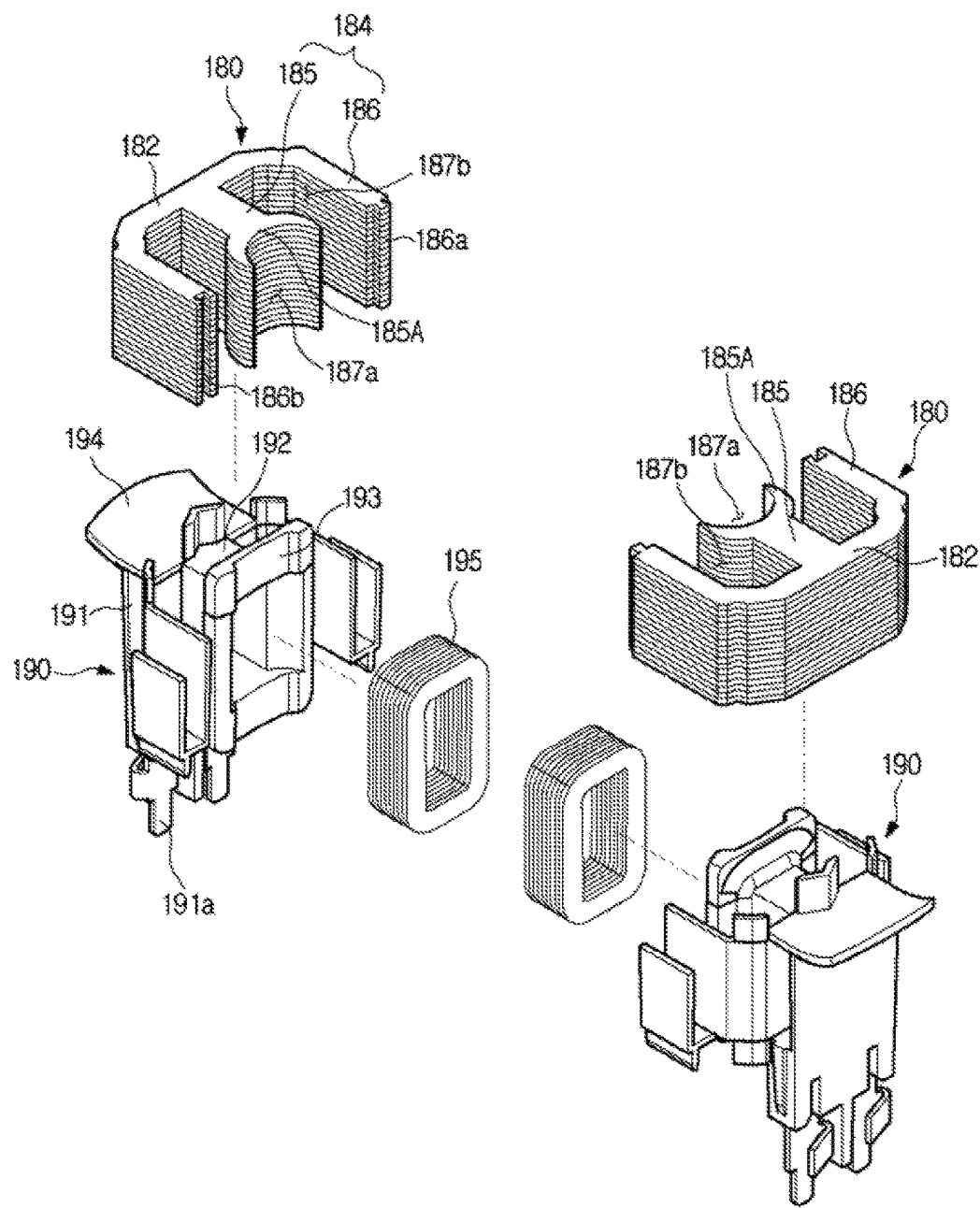
FIG. 7 is an exploded perspective view of a motor according to an embodiment of the present invention.

FIG. 7 is an exploded perspective view of a motor according to an embodiment of the present invention.

The motor 170 may include a rotor 172 and a stator 180.

The rotor 172 may be rotatably provided in the center of the stator 180.

The stator 180 may be provided to electromagnetically interact with the rotor 172.

The stator 180 may be configured to include a stator body 182, an insulator 190, and a coil 195.

The stator body 182 may be made up of a pair of stator bodies 182 that are disposed across the rotor 172 in the first direction w1 so as to face each other. That is, the stator bodies 182 may be disposed long so as to face each other. The pair of stator bodies 182 may be provided to be coupled to each other in the first direction w1 that is the lengthwise direction. That is, the stator 180 may not be provided around the rotor 172 in a circular shape in a circumferential direction of the rotor 172, but the stator 180 may be provided to enclose the rotor 172. A length determined in the first direction w1 may be longer than that determined in a second direction w2 perpendicular to the first direction w1. That is, assuming that the length of the stator 180 which is determined in the first direction w1 be L1, and the length of the stator 180 which is determined in the second direction w2 be L2, the stator 180 may be formed to meet a condition that L1 is greater than L2.

As the stator 180 may be formed to be longer in one (lengthwise) direction than in the other (widthwise) direction, an outward space of the stator 180 in the other direction may be formed to be relatively wider than an outward space of the stator 180 in one direction. Therefore, a flow path passing the corresponding space can be secured. As a result, it is possible to smoothly cool the motor and to improve performance of the motor assembly.

As the stator 180 may be formed long in the first direction w1, arrangement regions 188 may be provided around the rotor 172 in a circumferential direction of the stator 180. That is, the arrangement regions 188 may be provided at lateral portions of the stator 180 that are portions perpendicular to the lengthwise direction of the stator 180.

The arrangement regions 188 are regions provided on the same plane as the stator 180, and may be provided to improve practical use of the internal space 127 of the motor assembly 100. Each arrangement region 188 may be formed in an approximately semi-circular shape, and the components of the motor assembly 100 may be disposed in the arrangement regions 188. According to an embodiment of the present invention, at least one capacitor 198 may be disposed.

The arrangement regions 188 may be provided in a pair at the opposite sides of the stator 180, and the capacitors 198 may also be provided in a pair. According to an embodiment of the present invention, a total of four capacitors 198 may be disposed in the arrangement regions 188 two by two. Each capacitor 198 serves to smooth a electric current or to remove a ripple.

A rotor receptacle 187a for holding the rotor 172 may be defined in the middle between the pair of stator bodies 182. Each stator body 182 may be formed by laminating pressed steel sheets.

Each stator body 182 may include at least one stator core 184. A plurality of stator cores 184 may be provided in parallel to each other. The pair of stator bodies 182 have at least two stator cores 184 formed in parallel, and may be symmetrically provided across the rotor 172.

Each stator core 184 includes a center core 185 and side cores 186 provided at sides of the center core 185.

The center cores 185 may be provided to face each other across the rotor 172. The rotor receptacle 187a may be defined between the center cores 185 such that the rotor 172 may be rotatable. A pair of side cores 186 are provided at both the sides of the center core 185 in parallel to the center core 185.

The stator core 184 of one of the pair of stator bodies 182 and the stator core 184 of the other stator body 182 may be formed to be disposed on the same line. That is, the stator cores 184 may be disposed to face each other. In other words, the stator core 184 of one of the pair of stator bodies 182 may be provided such that the stator core 184 of the other stator body 182 may be disposed on a line along which it extends in a lengthwise direction.

The side cores 186 may be provided at both the sides of the center core 185 such that the pair of side cores 186 of one of the stator bodies 182 of the stator 180 can be coupled with the pair of side cores 186 of the other stator body 182. The side cores 186 of one of the opposite stator bodies 182 of the stator 180 may be provided with coupling tails 186a, and the side cores 186 of the other stator body 182 may be provided with coupling sockets 186b into which the coupling tails 186a can be interlocked.

As the center core 185 and the side cores 186 are disposed in parallel in the same direction, the coil 195 can be easily wound when wound around the stator 180.

A stator slot 187b may be formed between the center core 185 and the side core 186 of the stator core 184. As the coil 195 is wound around the stator core 184, the coil 195 may be housed in the stator slots 187b. An inner end of the stator core 184 which is adjacent to the rotor 172 may be provided with an expanded core 185a in which a width of the stator core 184 is partly increased. The expanded core 185a may be formed in such a way that an inner end of the center core 185 which is directed to the rotor 172 is increased in width to surround a circumference of the rotor 172. A gap 185b may be formed for the rotation of the rotor 172 between an inner surface of the expanded core 185a and an outer surface of the rotor 172.

The insulator 190 may be formed of a material having an electrical insulating property. The insulator 190 may be formed to surround a part of the stator 180, particularly the stator core 184. The insulator 190 includes an insulator body 191 that may be provided to correspond to one surface of the stator body 182, a center core support 192 that extends from the insulator body 191 so as to correspond to the center core 185, and a coil guide 193 that protrudes from the center core support 192 in a radially outward direction.

The coil 195 may be wound around the center core 185 and the center core support 192 in a state in which the insulator 190 may be coupled with the stator body 182. The coil 195 may be wound around the side cores 186 and the insulator 190 surrounding the side cores 186. According to an embodiment of the present invention the coil 195 may be wound around the center core 185 and the center core support 192. That is, according to an embodiment of the present invention, an example in which the coil 195 may be wound around the center core 185 is described. However, for the purpose of output density and easy control, the coil 95 may be wound around the center core 185 as well as the pair of side cores 186 so as to have a three-phase polarity.

The insulator 190 may include a flow path guide 194. The flow path guide 194 may be provided to be inclined from a lengthwise end of the stator 180 toward the air flow path 113. With this configuration, part of the air sucked into the housing 102 by the impeller 130 may be caused to flow into the motor module 140, thereby forming the module flow path 113a. That is, the air flow path 113 may be divided into the module flow path 113a and the module external flow path 113b by the flow path guide 194.

The insulator 190 may include a body coupler 191a. The body coupler 191a may be provided at one side of the insulator body 191 so as to guide the coil 195 wound onto the motor 170 to the circuit board 196. The body coupler 191a may be provided to be inserted into and fixed to the circuit board 196 such that the motor 170 and the circuit board 196 are coupled.

Figure 8:
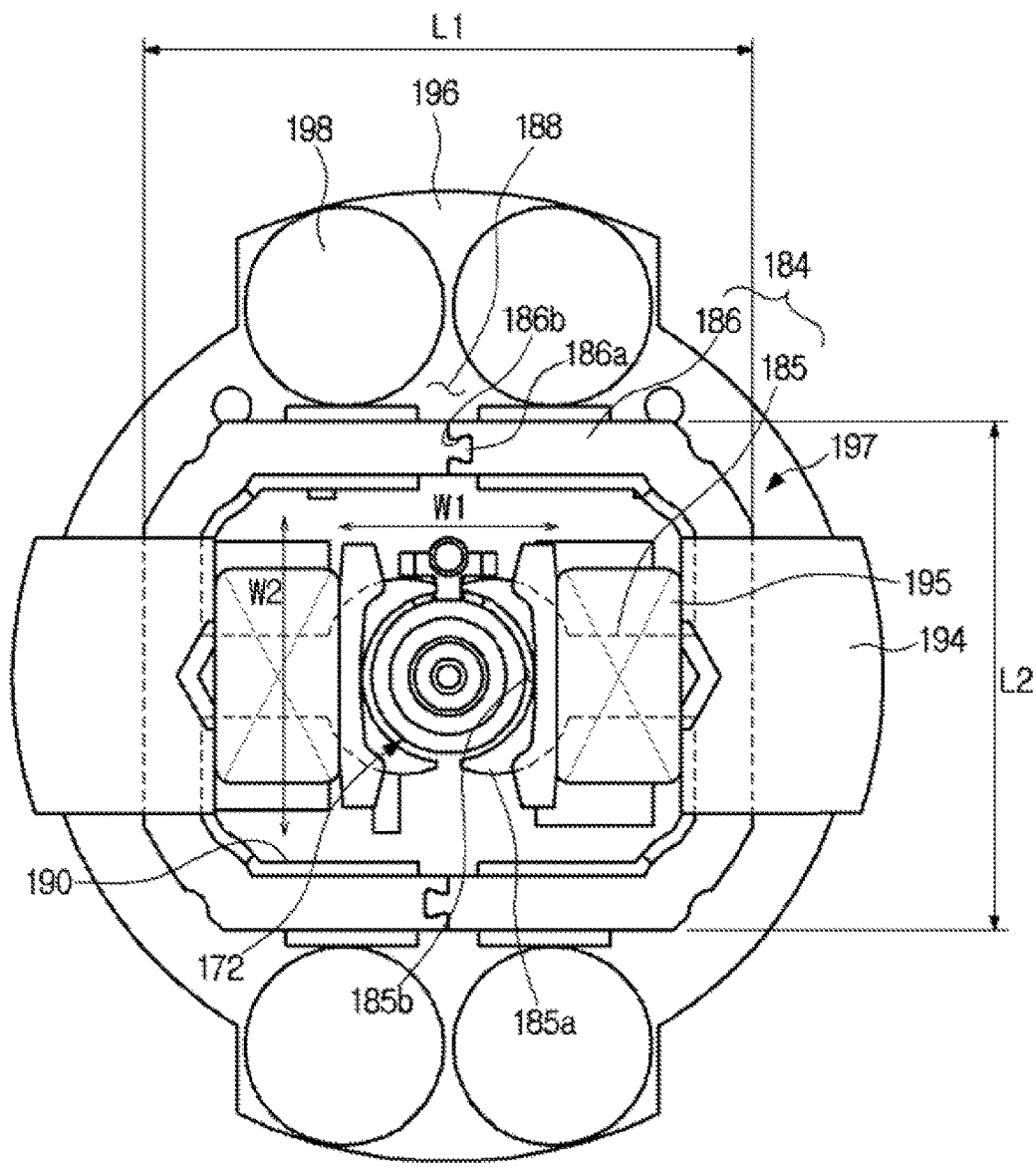
FIG. 8 is a view illustrating an arrangement relation between the motor and a circuit board according to an embodiment of the present invention.

FIG. 8 is a view illustrating an arrangement relation between the circuit board and the motor according to an embodiment of the prevent invention.

The circuit board 196 may be provided below the motor 170 so as to transmit electric signals to the motor 170. A mounting region 197 in which circuit elements are disposed may be provided on one surface of the circuit board 196. The circuit elements including heat dissipating elements, capacitors 198, etc. may be disposed in the mounting region 197.

The electric signals should be transmitted from the circuit board 196 to the motor 170, and heat generated from the circuit board 196 can be removed through the airflow generated by the operation of the motor 170. Thus, the circuit board 196 can be disposed in the vicinity of the motor 170. However, a space to avoid interference of the motor 170 with the circuit elements is unnecessarily increased in actuality, and the motor assembly 100 is increased in size.

According to an embodiment of the present invention, the motor 170 may be provided to be formed long in one direction, and the arrangement regions 188 may be provided on the same plane. That is, the arrangement regions 188 are extra spaces provided such that other components of the motor assembly 100 can be disposed, and may be provided at the opposite sides of the stator 180 which are formed in a lengthwise direction or in one direction. According to an embodiment of the present invention, the housing 102 has an approximately cylindrical shape, and the impeller 130 may be provided in a circular shape. Thus, each arrangement region 188 may be provided in a circular segment shape having a predetermined length of arc.

Electrical elements may be disposed in the arrangement regions 188 of the motor 170 so as to avoid interfering with the motor 170 in the mounting region 197 of the circuit board 196. In the present embodiment, the example in which the capacitors 198 are disposed is given. However, other electrical elements may be disposed in the arrangement regions 188.

With this configuration, the motor 170 and the circuit board 196 can be disposed to be closer to each other, and thus the practical use of the internal space of the housing 102 can be improved.

Figure 9:
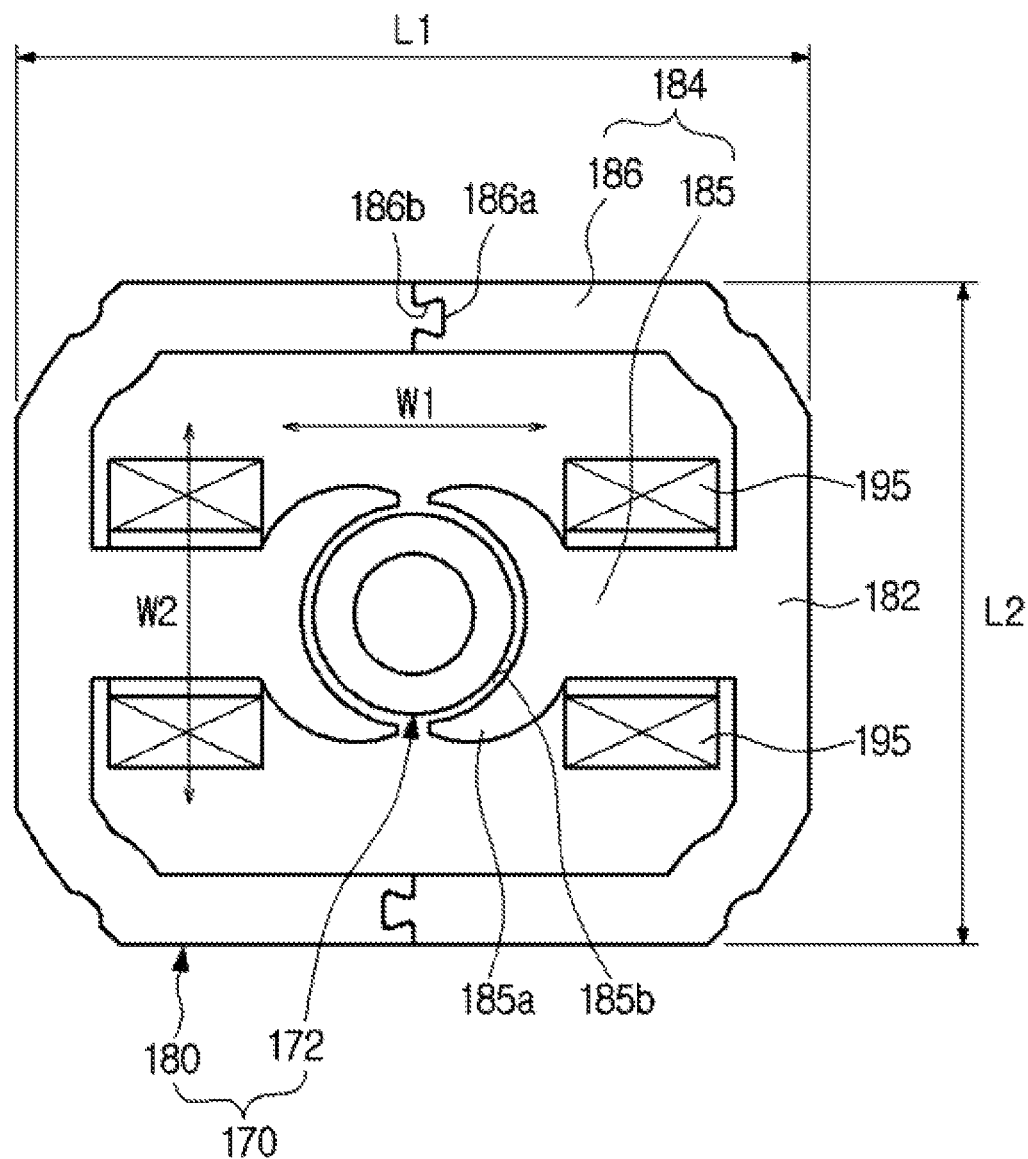
FIG. 9 is a front view of the motor according to an embodiment of the present invention.
Figure 10:
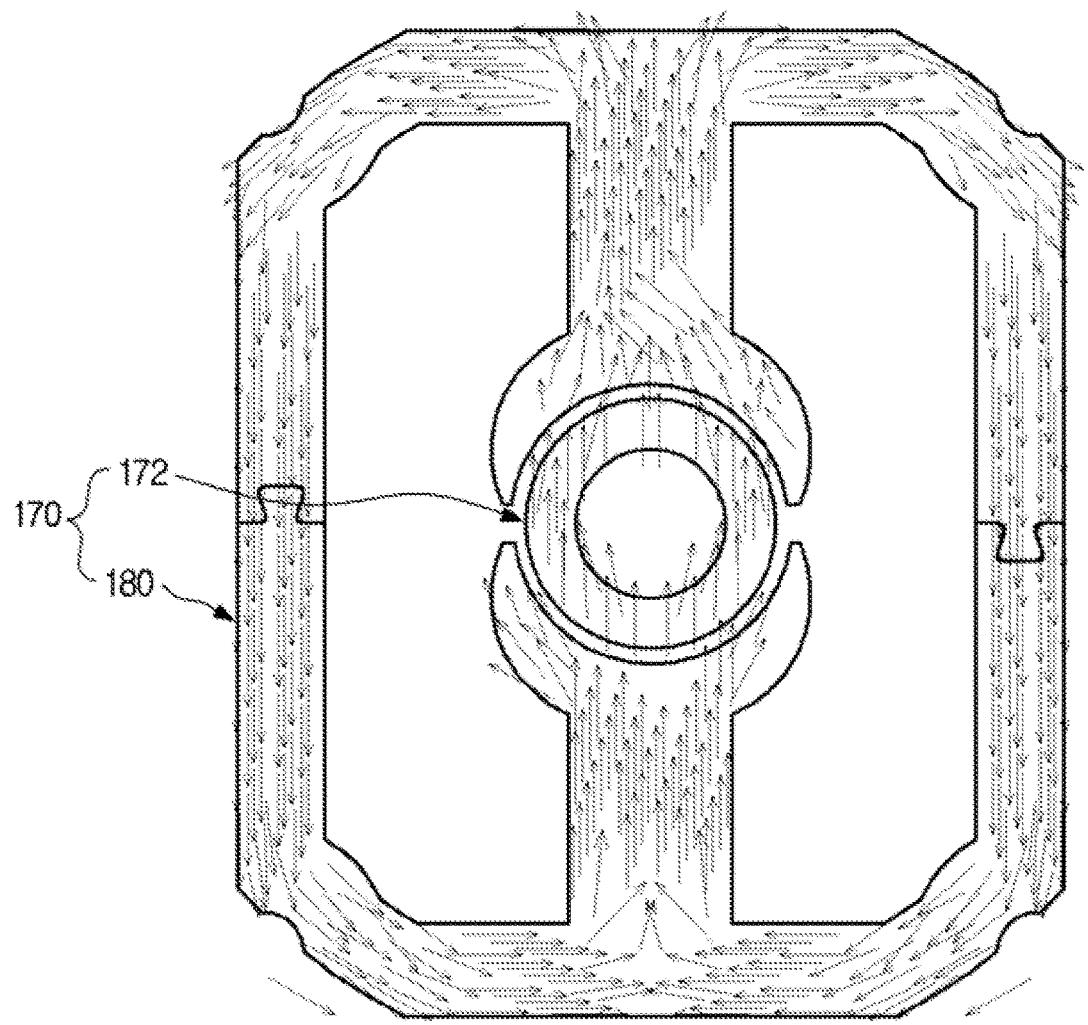
FIG. 10 is a view illustrating a flow of a magnetic field of the motor according to the an embodiment of the present invention.

FIG. 9 is a front view of the motor according to an embodiment of the present invention. FIG. 10 is a view illustrating a flow of a magnetic field of the motor according to an embodiment of the present invention.

The stator 180 may be provided such that the pair of stator bodies 182 symmetrically face each other.

The pair of expanded cores 185a provided at the ends of the pair of center cores 185 and around the rotor 172 may be provided such that the centers of curved inner surfaces thereof deviate from each other. The pair of expanded cores 185a are provided to enclose the outer surface of the rotor 172 such thin the center of the inner surface of one of the expanded cores 185a deviates from the center of the inner surface of the other of the expanded cores 185a. With this configuration, the pair of expanded cores 185a enclosing the rotor 172 are provided to have electromagnetic influences different in intensity and direction from each other such that the rotor 172 can be rotated in any one direction.

FIG. 10 is a view illustrating an electromagnetic flow passing through the stator 180 and the rotor 172.

The electromagnetic flow passing through the stator 180 and the rotor 172 may be formed between the center core 185 and any one of the pair of side cores 186 by a change in polarity resulting from the rotation of the rotor 172.

An exemplary process of assembling the motor assembly 100 according to the embodiment of the present invention is described.

Referring to FIG. 7, the pair of stator bodies 182 are coupled to one stator 180 by interlocking between the opposite side cores 186. At least part of the stator 180 may be covered for electrical insulation by the insulators 190.

Referring FIGS. 6A and 6B, the gap 185b may be formed in the rotor receptacle 187a defined between the expanded cores 185a by the pair of stator bodies 182 of the stator 180 coupled to the insulators 190, and the rotor 172 may be inserted into the rotor receptacle 187a. In this state, the rotor 172 and the stator 180 are fixed as one module by the motor housing 142.

One surface of the motor 170 and the other surface of the motor 170 are seated on the front seats 154 of the front motor housing 150 and the rear seats 164 of the rear motor housing 160, respectively. The lateral surfaces of the motor 170 may be seated on the seating protrusions.

Further, the rotor shaft 172b passes through the through-holes of the motor housing 142 such that the rotor 172 and the stator 180 are concentrically disposed when the motor 170 may be seated on and coupled to the motor housing 142.

The front motor housing 150 and the rear motor housing 160 may be coupled by the screws 148, and the coupling method is not limited thereto.

The motor 170 and the motor housing 142 may be formed as one module.

Referring to FIG. 5, the motor module 140 may be coupled into the seating hole 126 of the second housing 120. The body coupler 152 of the front motor housing 150 may be coupled into the seating hole 126 of the second housing 120.

The impeller 130 may be coupled to the rotor shaft 172b in front of the motor module 140. The impeller 130 may be disposed on the impeller seat 153 of the front motor housing 150.

The first housing 110 may be coupled in the front of the second housing 120. The shroud 112 may be provided on the inner surface of the first housing 110, and forms a flow path toward the interior of the housing 102 along with the impeller 130 and the diffuser.

The capacitors 198 may be disposed in the arrangement regions 188 of the motor 170 in the rear of the motor module 140, and the circuit board 196 may be coupled to prevent electrical elements from interfering with the motor 170. The motor module 140 may be provided such that it may be physically coupled with the circuit board 196 by the circuit couplers coupled to the insulators 190 and that the coils 195 provided for the motor 170 can be electrically coupled with the circuit board 196.

As the motor module 140 may be coupled with the housing 102 and the circuit board 196, the motor assembly 100 can be assembled.

Figure 11:
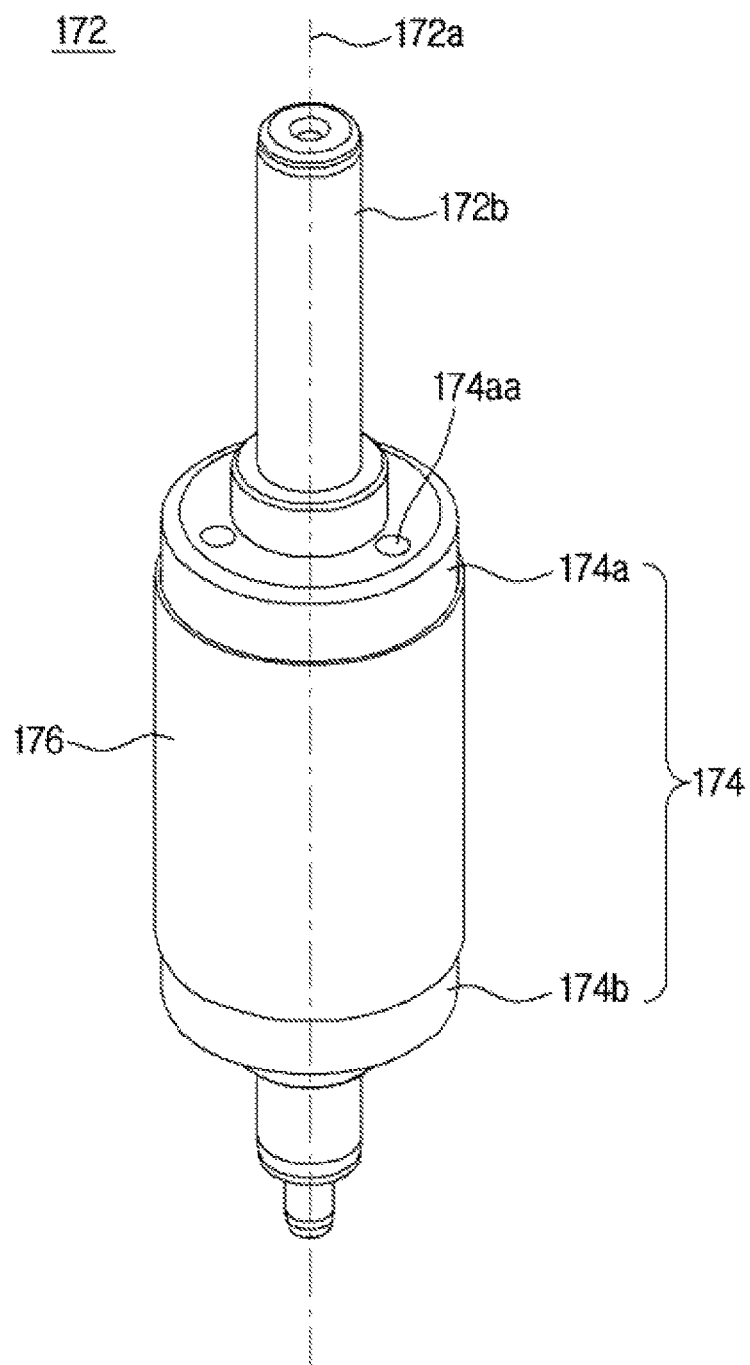
FIG. 11 is a perspective view of a rotor according to an embodiment of the present invention.
Figure 12:
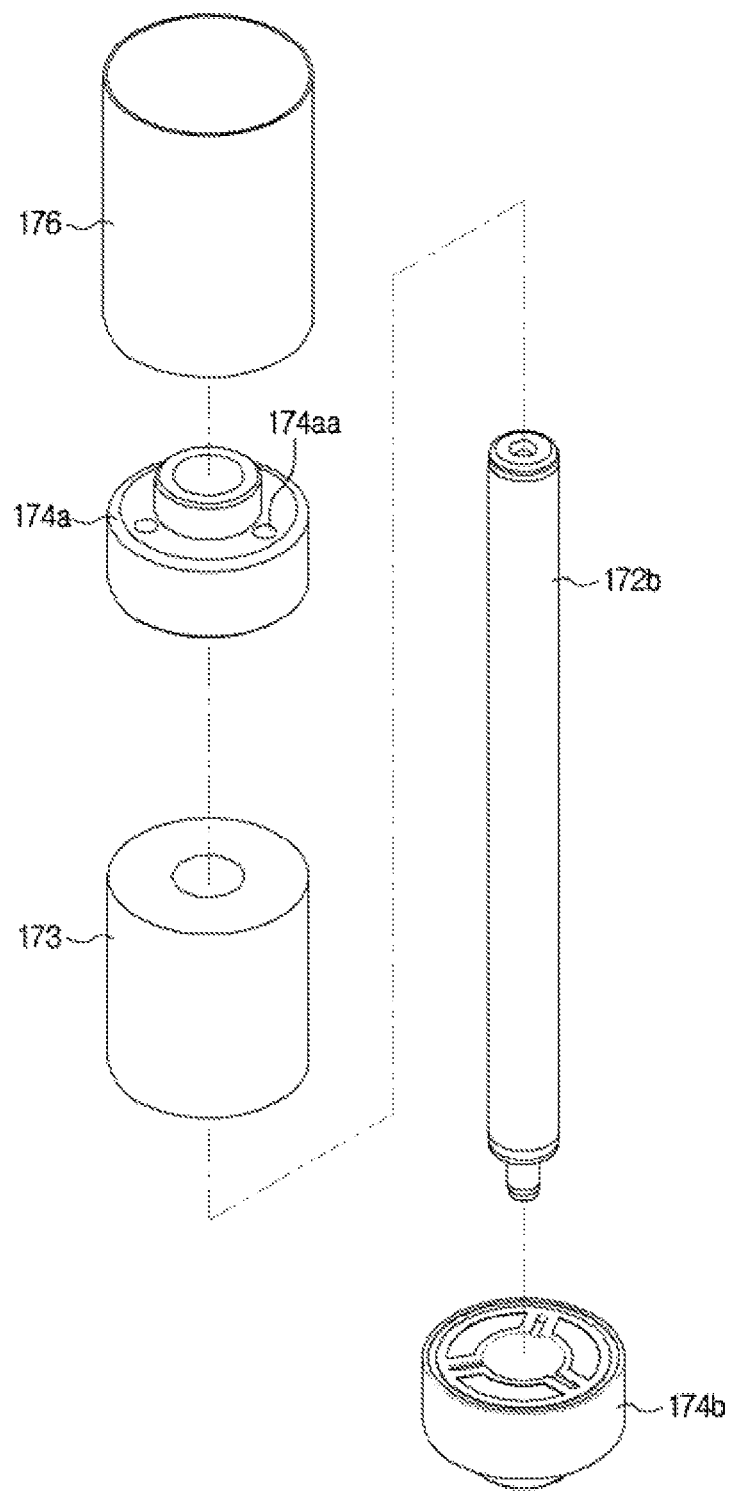
FIG. 12 is an exploded perspective view of the rotor according to an embodiment of the present invention.

FIG. 11 is a perspective view of the rotor according to an embodiment of the present invention. FIG. 12 is an exploded perspective view of the rotor according to an embodiment of the present invention.

The rotor 172 may be disposed in the rotor receptacle 187a of the stator 180. The rotor 172 may be provided to electromagnetically interact with the stator 180 in the rotor receptacle 187a.

The rotor 172 may include at least one magnet 173 in addition to the rotor shaft 172b.

The rotor shaft 172b may be provided to be rotatable on its rotor axis 172a. The impeller 130 may be coupled to one end of the rotor shaft 172b such that it can be rotated together with the rotor 172. The rotor shaft 172b may be provided in a rod shape. The rotor shaft 172b can be rotated with the gap 185b that may be formed between each expanded core 185a of the stator 180 and the rotor shaft 172b.

The magnet 173 may be provided such that the rotor shaft 172b passes therethrough. That is, the magnet 173 may be provided such that it can be disposed along a circumference of the rotor shaft 172b. A shape and layout of the magnet 173 are not restricted. However, according to an embodiment of the present invention, the magnet 173 may be provided in an annular shape such that the rotor shaft 172b passes through the center of the annulus.

The rotor 172 may include a support member 174.

The support member 174 may be provided to be close to the magnet 173. The support member 174 may be disposed close to the magnet 173 in a direction of the rotor axis 172a. A pair of support members 174 may be provided, and be disposed at opposite sides (one side and the other side) of the magnet 173 in the direction of the rotor axis 172a. The support members 174 may be balancers. That is, a pair of balancers may be provided on the opposite sides of the magnet 173 so as to compensate for eccentricity caused by the rotation of the rotor 172.

The support members 174 may be provided such that the rotor shaft 172b passes therethrough. That is, each support member 174 may be provided such that it can be disposed along the circumference of the rotor shaft 172b. A shape and layout of each support member 174 are not restricted. However, according to an embodiment of the present invention, each support member 174 may be provided in an annular shape such that the rotor shaft 172b passes through the center of the annulus.

The support members 174 may include a first support member 174a disposed on one side of the magnet 173 in the direction of the rotor axis 172a, and a second support member 174b disposed on the other side of the magnet 173 in the direction of the rotor axis 172a. Since the support members 174 are the balancers, the first support member 174a serves as a first balancer, and the second support member 174b serves as a second balancer.

The rotor 172 may further include a magnet cover 176.

The magnet cover 176 may be formed to enclose an outer circumferential surface of the magnet 173. When the rotor 172 is rotated at a high speed, the magnet 173 may be separated, and thus durability of the magnet 173 may be reduced. For this reason, the magnet cover 176 may be formed to enclose the outer circumferential surface of the magnet 173, thereby improving the durability of the magnet 173.

The magnet cover 176 is not limited to any material as long as the material is provided to improve the durability of the magnet 173. According to an embodiment, a carbon fiber may be applied. The magnet cover 176 formed of the carbon fiber may be provided to enclose the outer circumferential surface of the magnet 173 by a winding process, and may be hardened to withstand high-speed rotation. Thereby, the durability of the magnet 173 is improved.

The magnet cover 176 may be directly wound around the magnet 173. Alternatively, the magnet cover 176 may be wound around a cylindrical jig, and be hardened to be fitted onto the outer circumferential surface of the magnet 173. The magnet cover 176 may be more firmly fixed to the magnet 173 by an adhesive between the magnet cover 176 and the magnet 173.

Figure 13A:
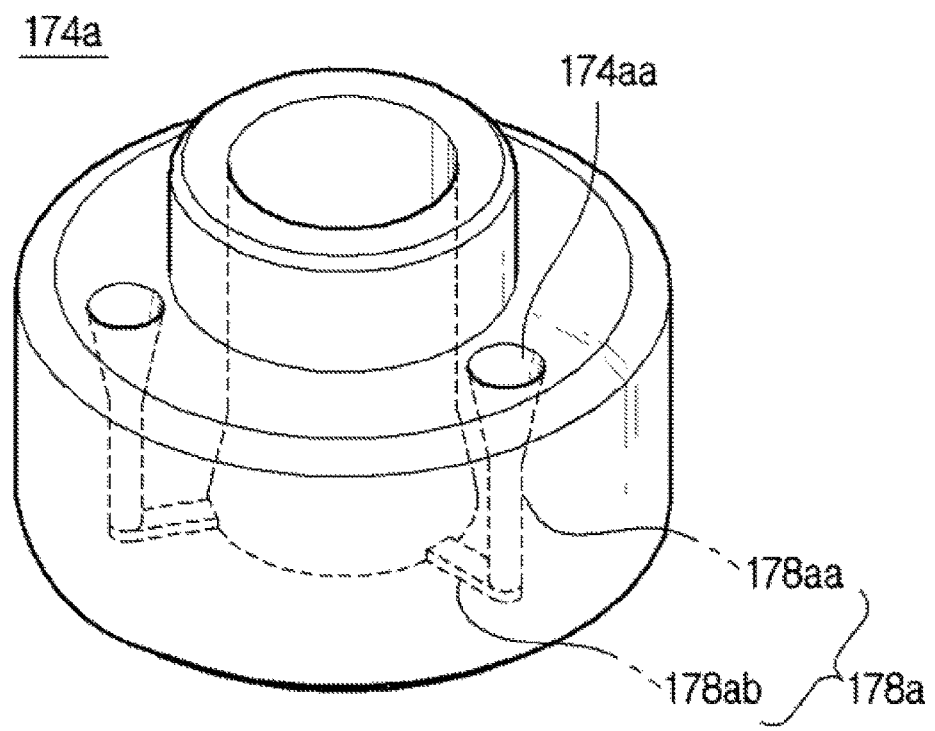
FIGS. 13A and 13B are perspective views of a support member of the rotor according to an embodiment of the present invention.
Figure 13B:
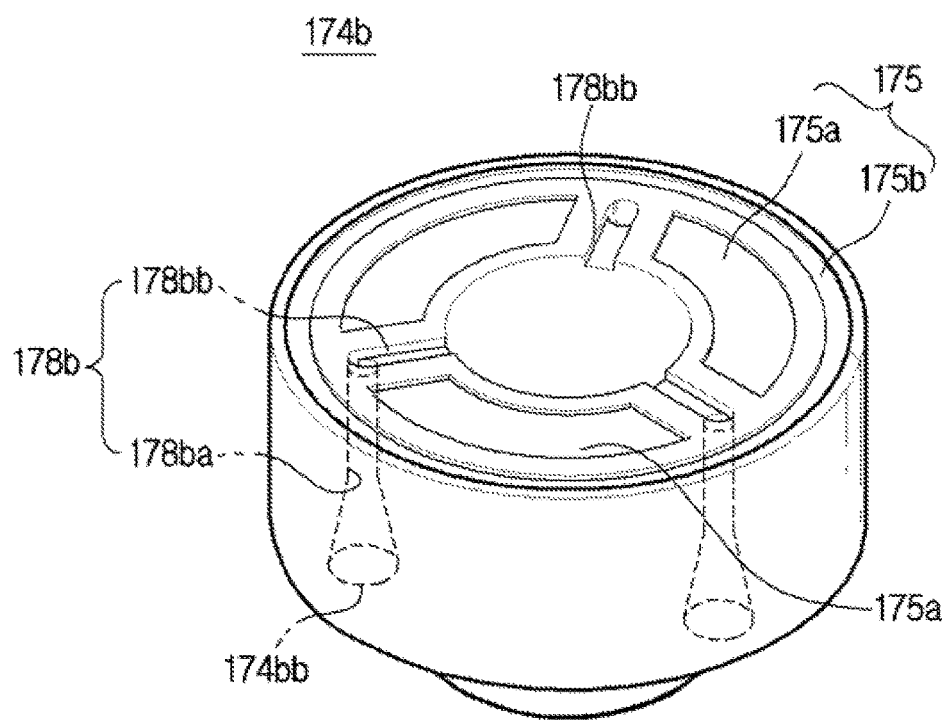
Figure 14:
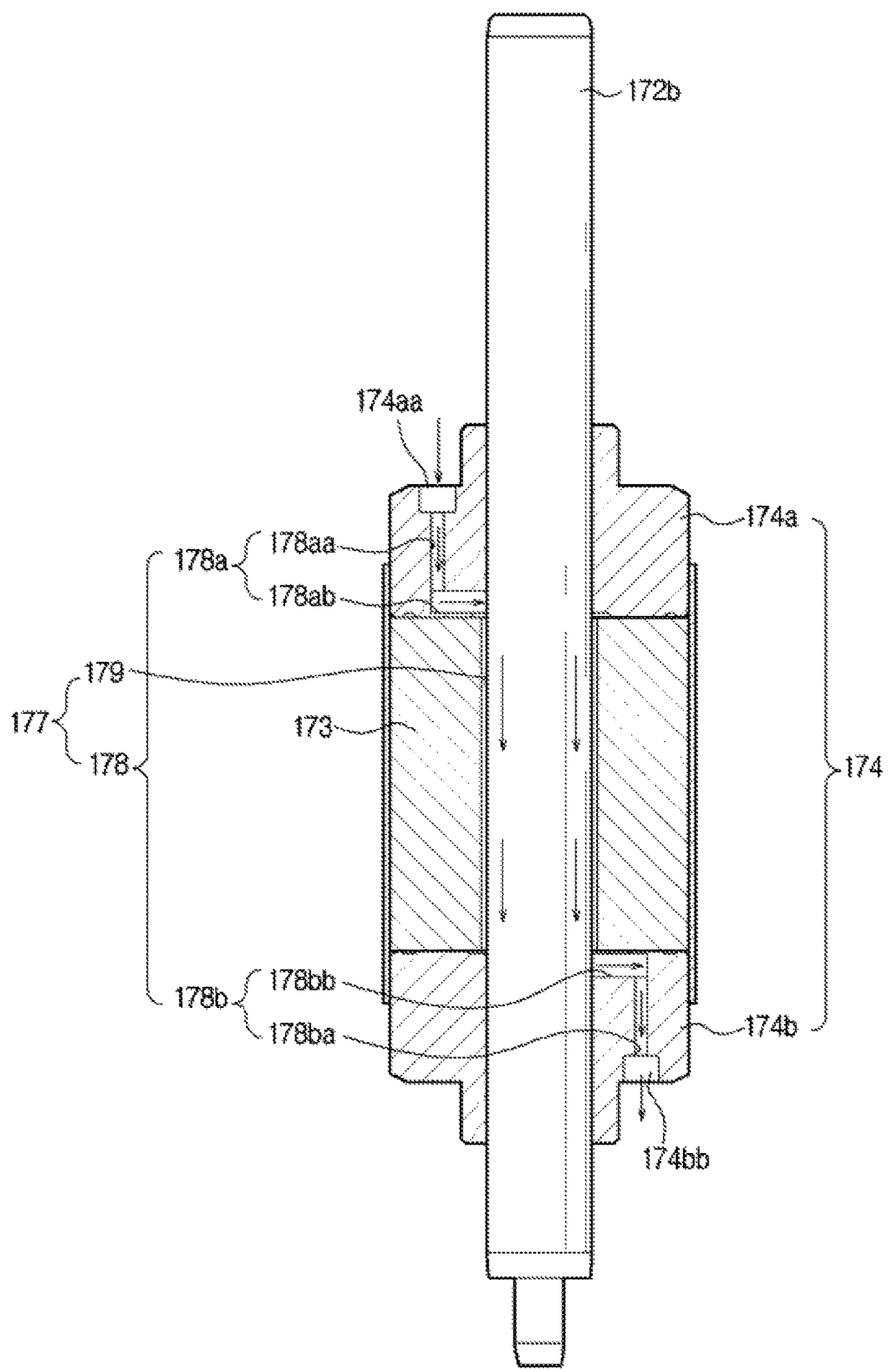
FIG. 14 is a cross-sectional view of the rotor according to an embodiment of the present invention.

FIGS. 13A and 13B are perspective views of the support member of the rotor according to an embodiment of the present invention. FIG. 14 is a cross-sectional view of the rotor according to an embodiment of the present invention.

The rotor 172 may include an internal channel 177 provided to cause an adhesive to flow for adhesion of the magnet 173, in addition to the rotor shaft 172b and the support members 174.

The internal channel 177 may include at least one adhesive channel 178 and at least one magnet bonding channel 179. The adhesive channel 178 may be included in each support member 174, and the magnet bonding channel 179 may be included in the magnet 173.

The adhesive channel 178 and the magnet bonding channel 179 are provided to communicate with each other. The adhesive may be injected into the adhesive channel 178, and may be caused to flow along the magnet bonding channel 179. Thereby, each component can be adhered. The adhesive channel 178 and the magnet bonding channel 179 may be formed in a bent shape to adhere the multiple components of the rotor 172. The adhesive channel 178 may be formed in the bent shape so as to communicate with the magnet bonding channel 179 such that the adhesive can flow and adhere the support members 174, the magnet 173, and the rotor shaft 172b.

The magnet bonding channel 179 may be provided to allow the adhesive to flow for the adhesion of the rotor shaft 172b and the magnet 173. The magnet bonding channel 179 may be defined by the outer circumferential surface of the rotor shaft 172b and an inner circumferential surface of the magnet 173. The magnet bonding channel 179 may be provided to have the shape of an annular flow path such that the adhesive can flow. After the magnet bonding channel 179 may be filled with the adhesive, the magnet 173 and the rotor shaft 172b can be adhered while the adhesive is solidified.

The magnet bonding channel 179 may be formed between the rotor shaft 172b and the magnet 173, and particularly in a range between the opposite sides of the magnet 173 at the rotor shaft 172b. That is, the adhesive may be applied only to a necessary portion in order to adhere the magnet 173 and the rotor shaft 172b. As a result, it is possible to increase production efficiency and to improve the quality of a product.

The adhesive channel 178 may be provided to form a flow path along which the adhesive can flow for the adhesion of the support member 174 and the magnet 173. The adhesive channel 178 may be formed in the support member 174.

The support members 174 may be provided with at least one inlet 174aa and at least one outlet 174bb such that the adhesive can flow into and out of the channels. The inlet 174aa may be formed in an outer surface of the first support member 174a, and the outlet 174bb may be formed in an outer surface of the second support member 174b. The number and arrangement of the inlets 174aa are not restricted. This is equally applied to the outlets 174bb. According to an embodiment, the inlets 174aa and the outlets 174bb are provided to correspond to the number of first adhesive channels 178a and the number of second adhesive channels.

The adhesive channel 178 may include a first adhesive channel 178a formed in the first support member 174a, and a second adhesive channel 178b formed in the second support member 174b.

The first adhesive channel 178a may be formed in the first support member 174a such that the adhesive can flow between the first support member 174a and one end face of the magnet 173. The first adhesive channel 178a may be provided such that the adhesive can flow between the first support member 174a and the one end face of the magnet 173 facing the first support member 174*a*. One end of the first adhesive channel 178*a* may be provided to communicate with the inlet 174*aa* of the first support member 174*a*. The other end of the first adhesive channel 178*a* may be provided to communicate with the magnet bonding channel 179.

At least one first adhesive channel 178*a* may be provided. When a plurality of first adhesive channels 178*a* are provided, arrangement thereof is not restricted. According to an embodiment, the first adhesive channels 178*a* are disposed parallel to the rotor axis 172*a* at regular intervals in a circumferential direction of the first support member 174*a* such that the adhesive uniformly flows into the channels. Three first adhesive channels 178*a* are disposed around the rotor axis 172*a* at intervals of 120 degrees.

Each first adhesive channel 178*a* may include an inflow channel 178*aa* and a first flow channel 178*ab*.

The inflow channel 178*aa* may be provided to communicate with the inlet 174*aa*. The inflow channel 178*aa* may be disposed to pass through the first support member 174*a*, and be provided to communicate with the first flow channel 178*ab*.

The first flow channel 178*ab* may be provided to guide the adhesive introduced into the inflow channel 178*aa* to the magnet bonding channel 179. One end of the first flow channel 178*ab* may be provided to communicate with an end of the inflow channel 178*aa*, and the other end of the first flow channel 178*ab* may be provided to communicate with the magnet bonding channel 179.

The first flow channel 178*ab* may be formed in an inner surface of the first support member 174*a* which faces the one end face of the magnet 173. The first flow channel 178*ab* may be provided to form a flow path from the end of the inflow channel 178*aa* to the magnet bonding channel 179 in the direction perpendicular to the rotor axis 172*a*.

A shape or arrangement of the first flow channel 178*ab* is not restricted. According to an embodiment, a first flow channel 178*ab* may be formed in the inner surface of the first support member 174*a*. However, the first flow channel 178*ab* may be formed in the magnet 173 so as to have the same shape.

The inlet 174*aa* may be disposed apart from the rotor shaft 172*b*, and the inflow channel 178*aa* communicating with the inlet 174*aa* may be provided to be separated in parallel from the rotor shaft 172*b*. To reduce flow resistance of the adhesive, a length of the flow path along which the adhesive moves should be short. In contrast, to stably couple the magnet 173 and the first support member 174*a*, the length of the flow path should be long. Therefore, the inlet 174*aa* may be disposed apart from the rotor shaft 172*b*, and the inflow channel 178*aa* formed between the inlet 174*aa* and the first flow channel 178*ab* may be formed to pass through the first support member 174*a* in parallel to the rotor axis 172*a* so as to reduce a flow path thereof. Thus, a length of the first flow channel 178*ab* can be relatively increased to the utmost.

The second adhesive channel 178*b* may be formed in the second support member 174*b* such that the adhesive can flow between the second support member 174*b* and the other end face of the magnet 173. The second adhesive channel 178*b* may be provided such that the adhesive can flow between the second support member 174*b* and the other end face of the magnet 173 facing the second support member 174*b*. One end of the second adhesive channel 178*b* may be provided to communicate with the outlet 174*bb* of the second support member 174*b*. The other end of the second adhesive channel 178*b* may be provided to communicate with the magnet bonding channel 179.

At least one second adhesive channel 178*b* may be provided. When a plurality of second adhesive channels 178*b* are provided, arrangement thereof is not restricted. According to an embodiment, the second adhesive channels 178*b* are disposed parallel to the rotor axis 172*a* at regular intervals in a circumferential direction of the second support member 174*b* such that the adhesive uniformly flows into the channels. Three adhesive channels 178*b* may be disposed around the rotor axis 172*a* at intervals of 120 degrees. The arrangement of the second adhesive channels 178*b* may not correspond to that of the first adhesive channels 178*a*.

Each second adhesive channel 178*b* may include an outflow channel 178*ba* and a second flow channel 178*bb*.

The outflow channel 178*ba* may be provided to communicate with the outlet 174*bb*. The outflow channel 178*ba* may be disposed to pass through the second support member 174*b*, and be provided to communicate with the second flow channel 178*bb*.

The second flow channel 178*bb* may be provided to guide the adhesive flowing through the first adhesive channel 178*a* and the magnet bonding channel 179 to the outflow channel 178*ba*. One end of the second flow channel 178*bb* may be provided to communicate with an end of the outflow channel 178*ba*, and the other end of the second flow channel 178*bb* may be provided to communicate with the magnet bonding channel 179.

The second flow channel 178*bb* may be formed in an inner surface of the second support member 174*b* which faces the other end face of the magnet 173. The second flow channel 178*bb* may be provided to form a flow path from the magnet bonding channel 179 to the end of the outflow channel 178*ba* in the direction perpendicular to the rotor axis 172*a*.

A shape or arrangement of the second flow channel 178*bb* is not restricted. In the present embodiment, the example in which the second flow channel 178*bb* may be formed in the inner surface of the second support member 174*b* is given. However, the second flow channel 178*bb* may be formed in the magnet 173 so as to have the same shape.

The outlet 174*bb* may be disposed apart from the rotor shaft 172*b*, and the outflow channel 178*ba* communicating with the outlet 174*bb* may be provided to be separated in parallel from the rotor shaft 172*b*. To reduce flow resistance of the adhesive, the length of the flow path along which the adhesive moves should be short. In contrast, to stably couple the magnet 173 and the second support member 174*b*, the length of the flow path should be long. Therefore, the outlet 174*bb* may be disposed apart from the rotor shaft 172*b*, and the outflow channel 178*ba* formed between the outlet 174*bb* and the second flow channel 178*bb* may be formed to pass through the second support member 174*b* in parallel to the rotor axis 172*a* so as to reduce a flow path thereof. Thus, a length of the second flow channel 178*bb* can be relatively increased to the utmost.

The support member 174 may include an anti-leakage groove 175.

The anti-leakage groove 175 may be provided to prevent the adhesive flowing along the channel from leaking out of the rotor 172. The anti-leakage groove 175 may be provided to enable collection of the adhesive, so that the support member 174 and the magnet 173 can be more firmly adhered. The anti-leakage groove 175 may be disposed to be close to the channel. When the adhesive flowing along the channel leaks from the channel, the adhesive can be collected into the anti-leakage groove 175.

The anti-leakage groove 175 may be formed in an adhesion portion of the support member 174 which comes into contact with the magnet 173. The adhesion portion may be provided in a plane shape as according to an embodiment of the present invention so as to come into surface contact with the magnet 173. The anti-leakage groove 175 may be recessed lower than the adhesion portion such that the adhesive can be collected in a recessed space. Thereby, it is possible to adhesion efficiency of the support member 174 and the magnet 173 and to prevent the adhesive from leaking into the outside.

The anti-leakage groove 175 may include at least one inner anti-leakage groove 175a and an outer anti-leakage groove 175b.

A plurality of inner anti-leakage grooves 175a may be provided to be disposed between the plurality of first adhesive channels 178a and between the plurality of second adhesive channels 178b. That is, the inner anti-leakage grooves 175a may be disposed between the plurality of first flow channels 178ab in the first support member 174a. Further, the inner anti-leakage grooves 175a may be disposed between the plurality of second flow channel 178bb in the second support member 174b.

The inner anti-leakage grooves 175a may be formed around the rotor axis 172a in a circumferential direction of the support member 174 so as to have an approximately arcuate shape. The inner anti-leakage grooves 175a are formed in the circumferential direction of the support member 174, and the magnet 173 and the support member 174 come into contact with each other. Thus, even when the rotor 172 is rotated at a rapid speed, the magnet 173 and the support member 174 are not decoupled.

The outer anti-leakage groove 175b may be disposed in the adhesion portion outside the adhesive channel 178. That is, the first flow channels 178ab or the second flow channels 178bb are formed in the adhesion portion, and the outer anti-leakage groove 175b may be disposed outside the flow channels around the rotor axis 172a. Thereby, it is possible to prevent the adhesive from leaking from the channels to the outside.

A shape of the outer anti-leakage groove 175a is not restricted. According to an embodiment of the present invention, the outer anti-leakage groove 175a may be formed in the adhesion portion in an annular shape so as to efficiently prevent the leakage of the adhesive.

Further, although not illustrated in the figures, an annular ring may be provided in the outer anti-leakage groove 175a. The annular ring may be disposed in the outer anti-leakage groove 175a, so that the adhesive can be prevented from leaking between the support member 174 and the magnet 173.

An exemplary method for producing the rotor 172 is described.

The magnet 173 may be coupled to the rotor shaft 172b, and the pair of support members 174 are respectively coupled at one side and the other side of the magnet 173.

The pair of support members 174 are respectively provided with the inlet 174aa and the outlet 174bb, both of which are connected by the internal channel 177 such that the adhesive flows.

When the adhesive is introduced into the inlet 174aa, the adhesive passes the inflow channel 178aa, and flows along the first flow channel 178ab formed between the first support member 174a and the magnet 173.

The adhesive passing the first flow channel 178ab flows along the magnet bonding channel 179 formed between the magnet 173 and the rotor shaft 172b, and may be guided to the second flow channel 178bb formed between the magnet 173 and the second support member 174b.

The adhesive passing the second flow channel 178bb flows along the outflow channel 178ba, and may be discharged outside from the outlet 174bb.

The internal channel 177 may be filled with the adhesive, and the adhesive may be cured after a predetermined time has elapsed. As a result, each component is coupled.

Further, when the adhesive passing the internal channel 177 leaks from the internal channel 177, the adhesive may be configured to be collected in the anti-leakage groove 175, so that the magnet 173 and the support members 174 can be more firmly coupled.

Figure 15:
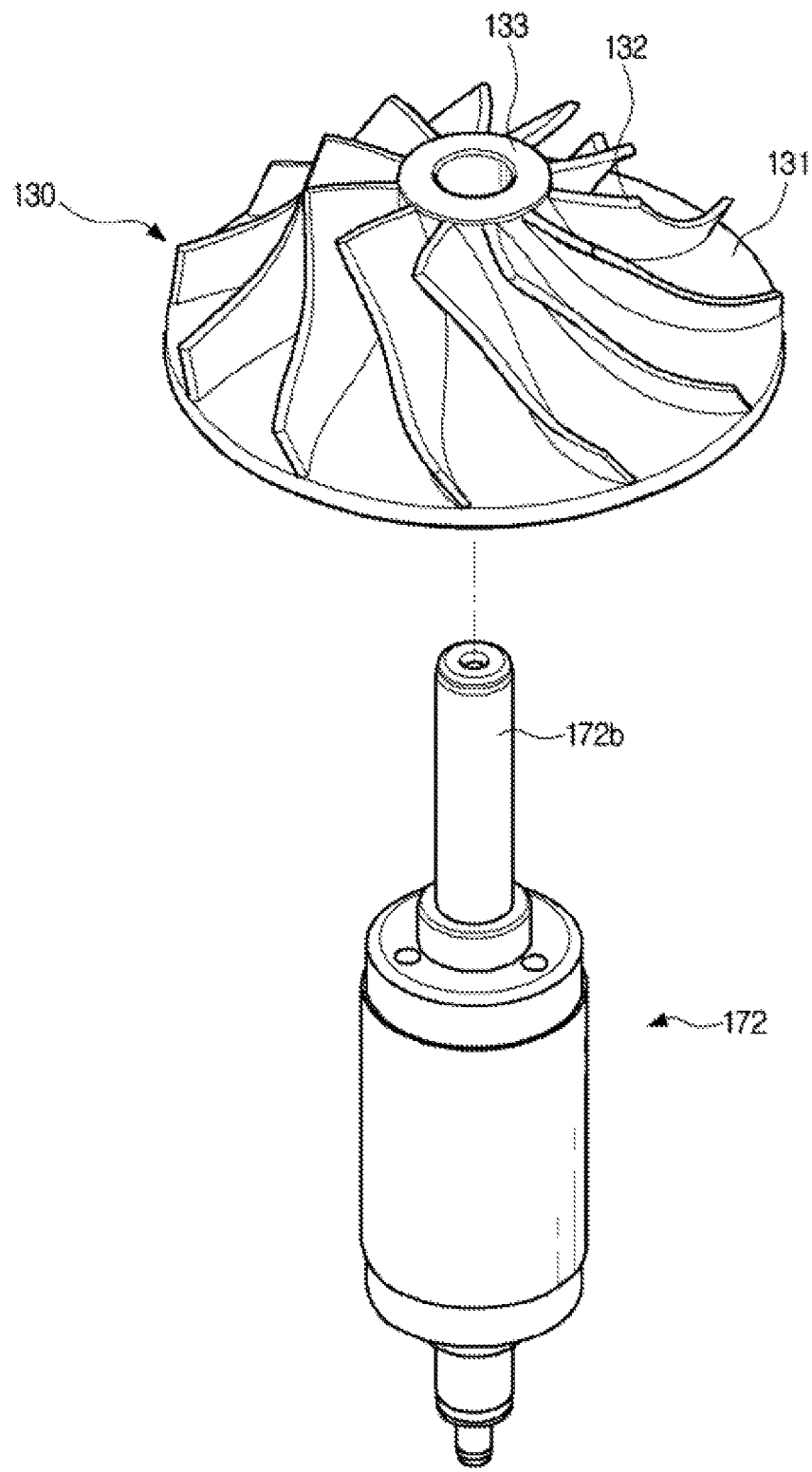
FIG. 15 is a disassembled perspective view of the rotor and an impeller according to an embodiment of the present invention.
Figure 16:
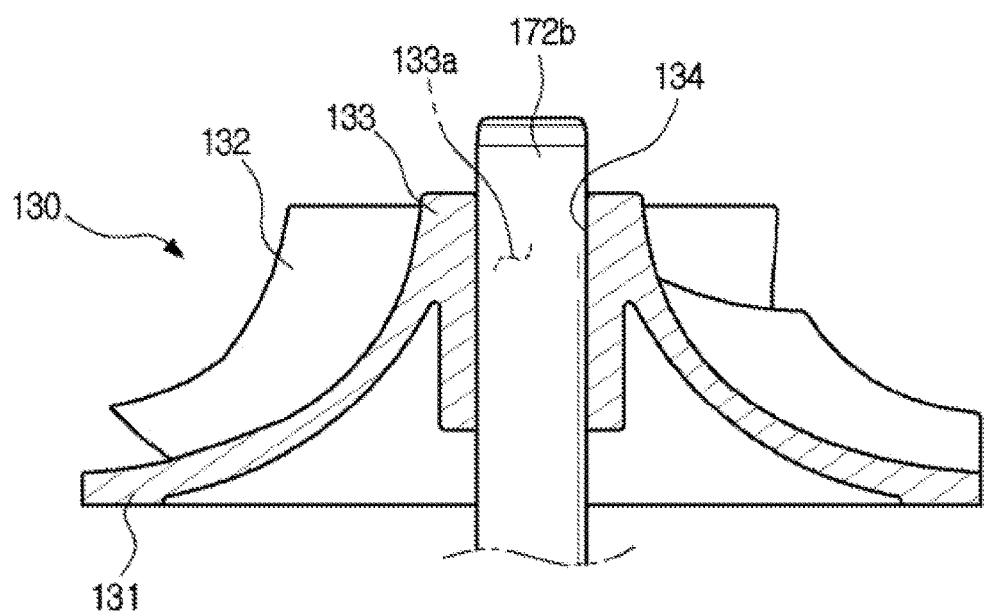
FIG. 16 is a cross-sectional view illustrating coupling of a rotor shaft and the impeller according to an embodiment of the present invention.

FIG. 15 is a disassembled perspective view of the rotor and the impeller according to an embodiment of the present invention. FIG. 16 is a cross-sectional view illustrating coupling of the rotor shaft and the impeller according to an embodiment of the present invention.

The impeller 130 may be provided to rotate together with the rotor shaft 172b.

The impeller 130 may include an impeller body 131, a shaft coupler 133, and a plurality of blades 132.

The impeller body 131 may be provided such that a cross section thereof may be reduced in the direction of the rotor axis 172a. The impeller body 131 may be provided such that air introduced in the direction of the rotor axis 172a by the rotation of the impeller 130 may be discharged in a radial direction perpendicular to the rotor axis 172a.

The plurality of blades 132 are provided for the impeller body 131 so as to be rotated together with the impeller body 131 to form an airflow. The plurality of blades 132 may be provided on an outer surface of the impeller body 131. The rotor 172 may be disposed at the back of the impeller body 131, and the plurality of blades 132 are disposed on a front surface of the impeller body 131. Thereby, the airflow can be formed.

The shaft coupler 133 may be provided for the impeller body 131 such that the rotor shaft 172b can be coupled to the impeller body 131. The shaft coupler 133 may be formed with a shaft inserting hole 133a into which the rotor shaft 172b can be inserted.

The shaft coupler 133 may include a shaft coupling face 134 corresponding to the outer circumferential surface of the rotor shaft 172b. An inner diameter of the shaft coupler 133 having the shaft coupling face 134 may be provided to correspond to an outer diameter of the rotor shaft 172b, so that the rotor shaft 172b can be press-fitted into the shaft coupler 133.

A way in which the rotor shaft 172b may be coupled to the shaft coupler 133 may be not restricted. According to an embodiment of the present invention, the rotor shaft 172b press-fitted into the shaft coupler 133, and thereby the impeller 130 and the rotor shaft 172b can be operated in one body.

A motor assembly 200 according to a second embodiment and a vacuum cleaner 51 having the same is described.

A description of components overlapping the description of those in the aforementioned embodiment is omitted.

Figure 17:
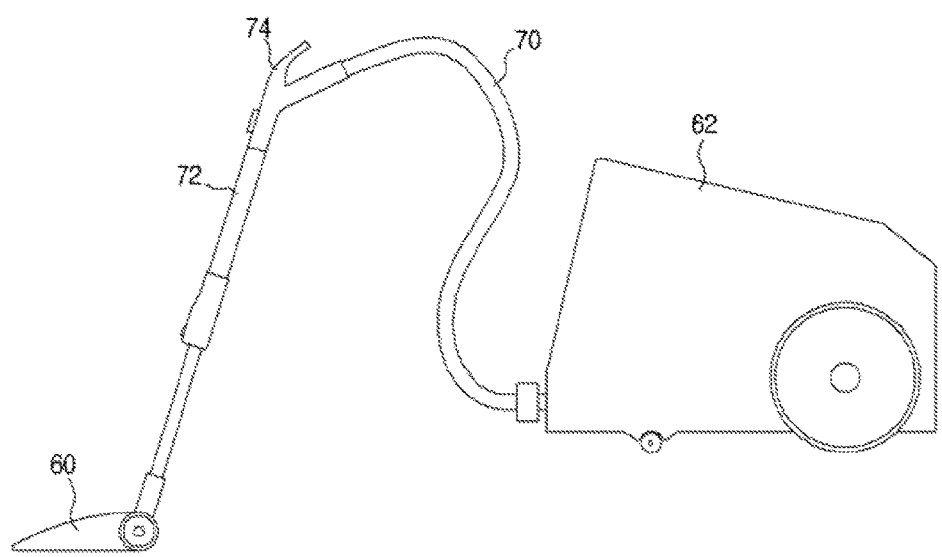
FIG. 17 is a view illustrating a vacuum cleaner according to an embodiment of the present invention.
Figure 18:
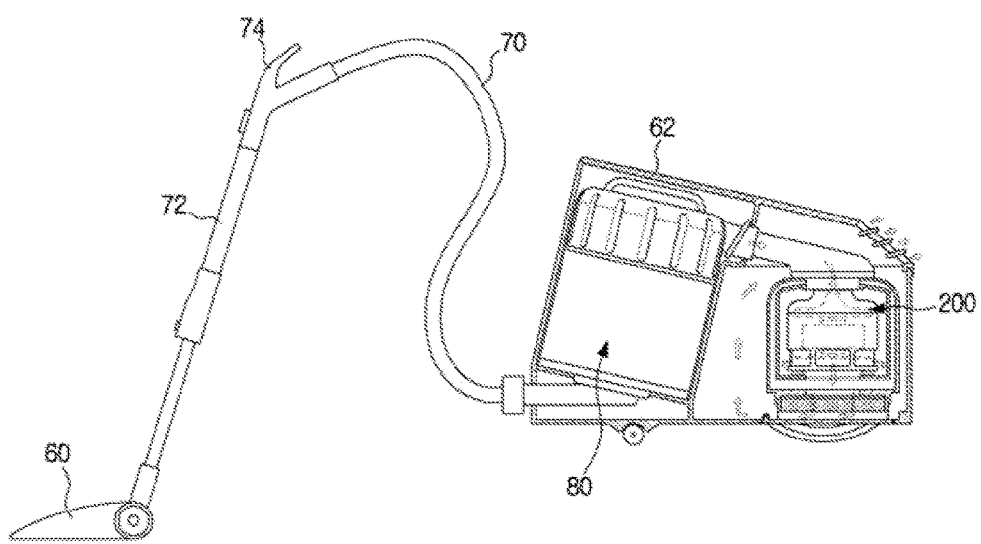
FIG. 18 is a cross-sectional view illustrating some components of the vacuum cleaner according to an embodiment of the present invention.

FIG. 17 is a view illustrating a vacuum cleaner according to a second embodiment of the present invention. FIG. 18 is a cross-sectional view illustrating some components of the vacuum cleaner according to an embodiment of the present invention.

A vacuum cleaner 51 according to a second embodiment of the present invention may be applied to a canister vacuum cleaner different than a vacuum cleaner of a first embodiment. A type of the vacuum cleaner 1 of the first embodiment and a type of the vacuum cleaner 51 of a second embodiment may be different from each other, but they are distinguished for the convenience of description. A motor assembly 200 of the second embodiment may be applied to the stick vacuum cleaner 1 of the first embodiment, and the motor assembly 100 of the first embodiment may be applied to the canister vacuum cleaner 51 of the second embodiment.

In the second embodiment of the present invention, the vacuum cleaner 51 includes a suction section 60 and a cleaner body 62.

The cleaner body 62 and the suction section 60 are interconnected through a connecting hose 70 and a connecting pipe 72 such that suction generated from the cleaner body 62 can be transmitted to the suction section 60. A handle 74 may be provided between the connecting hose 70 and the connecting pipe 72 so as to enable a user to grasp it.

The connecting hose 70 may be preferably formed of a corrugated pipe having flexibility. One end of the connecting hose 70 may be connected to the cleaner body 62, and the other end of the connecting hose 70 may be connected to the handle 74. Thus, the suction section 60 can be free to move within a predetermined radius around the cleaner body 62. The connecting pipe 72 may be formed to have a predetermined length, and may be connected to the suction section 60 at one end thereof and to the handle 74 at the other end thereof. The user grasps the handle 74 to move the suction section 60. Thereby, the user can clean a floor to be cleaned.

The connecting hose 70 may be connected in the front of the cleaner body 62 such that sucked air can be sent to the cleaner body 62.

The cleaner body 62 includes a motor assembly 200 and a dust container 80 provided therein. The motor assembly 200 may be driven to generate the suction in the cleaner body 62, and the dust container 80 may be provided to be disposed upstream of an air flow relative to the motor assembly 200 such that dirt or filth can be filtered and collected from the air introduced from the suction section 60.

Figure 19:
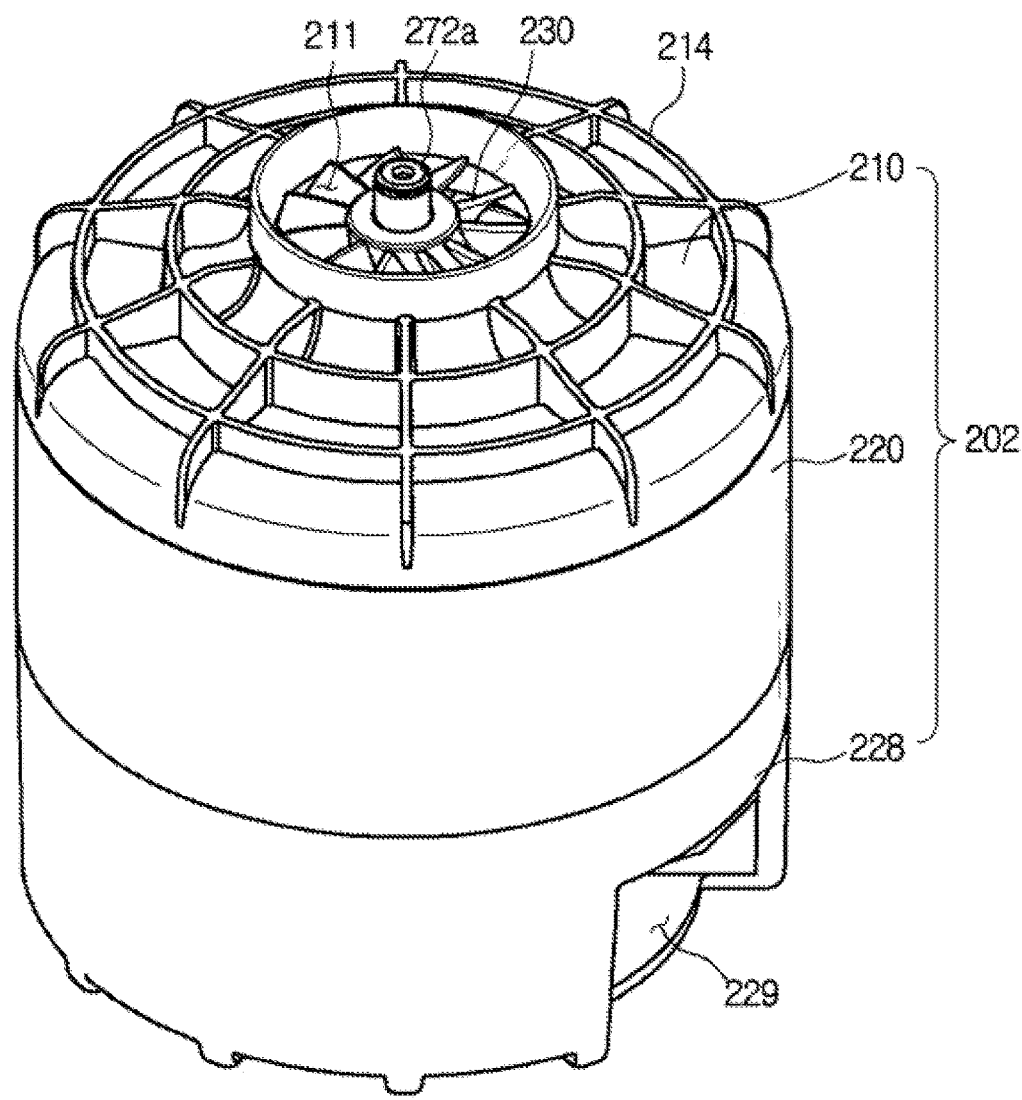
FIG. 19 is a perspective view of a motor assembly according to an embodiment of the present invention.
Figure 20:
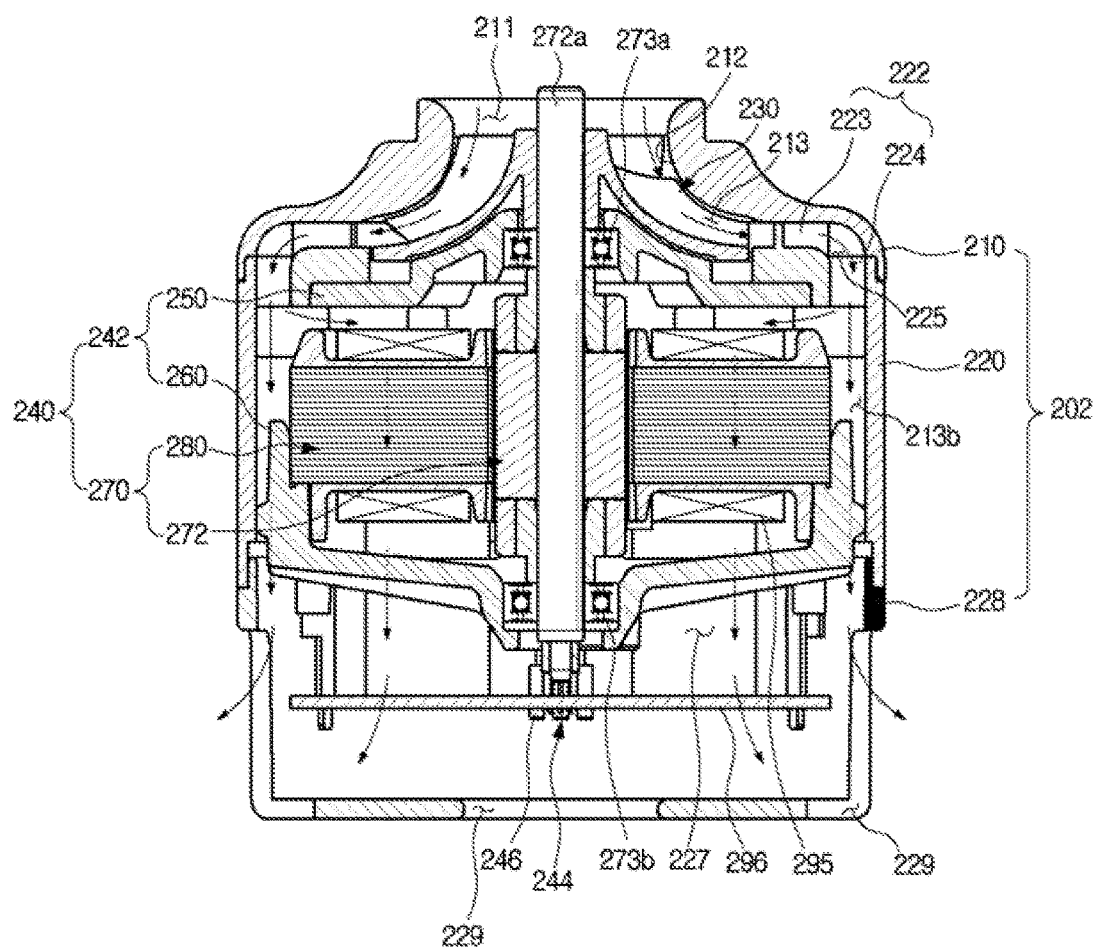
FIG. 20 is a cross-sectional view of the motor assembly according to an embodiment of the present invention.
Figure 21:
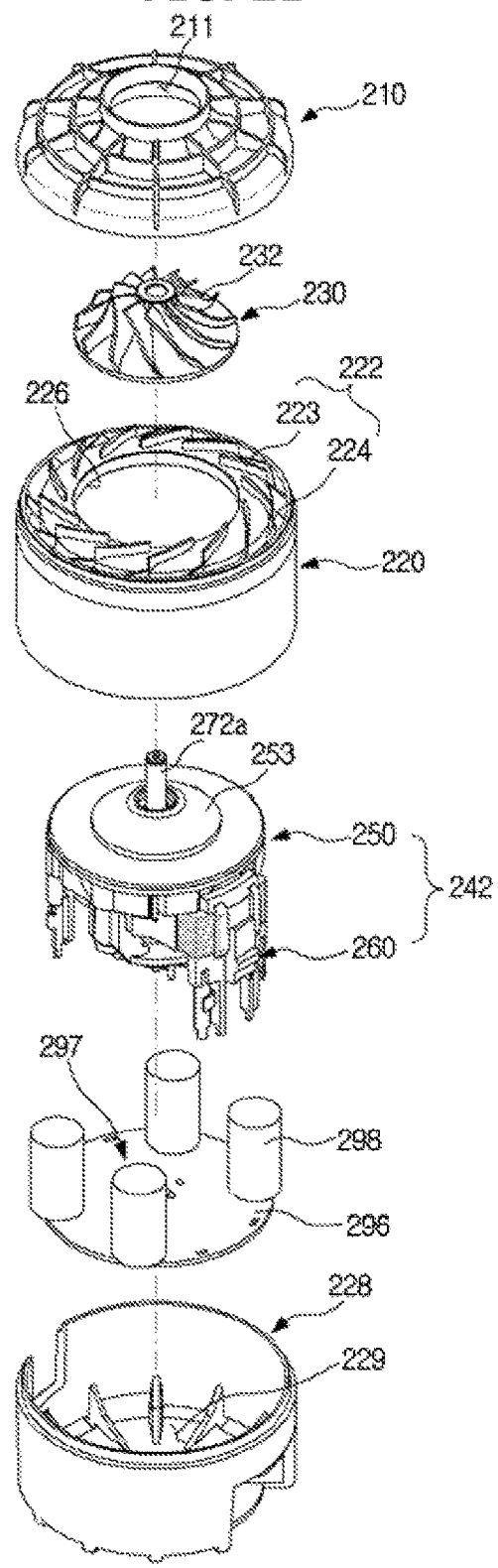
FIG. 21 is an exploded perspective view of the motor assembly according to an embodiment of the present invention.

FIG. 19 is a perspective view of a motor assembly according to the second embodiment of the present invention. FIG. 20 is a cross-sectional view of the motor assembly according to the second embodiment of the present invention. FIG. 21 is an exploded perspective view of the motor assembly according to the second embodiment of the present invention.

The motor assembly 200 may be provided inside the cleaner body 62 so as to generate suction.

The motor assembly 200 may include a housing 202, a motor 270 that may be installed in the housing 202 and generates suction, a motor housing 242 that may be provided in the housing 202 to fix the motor 270, and an impeller 230 that may be rotatably installed on a shaft of the motor 270.

The housing 202 includes a first housing 210, a second housing 220 provided to be coupled with the first housing 210, and a third housing 228 coupled to a rear surface of the second housing 220. The housing 202 may be provided to have an approximately cylindrical shape. However, the shape of the housing 202 is not limited to such a shape, and may be variously provided. The first housing 210 and the second housing 220 may be provided to be separable in an axial direction of the rotor shaft 272b. The first housing 210 may be provided with an air suction port 211 such that the air is introduced into the housing 202 by the motor 270, and the third housing 228 may be provided with an air discharge port 229 such that the air introduced into the housing 202 may be discharged.

The first housing 210 may be provided with at least one flow path interception rib 214 on an upper surface thereof such that the air sucked by the motor 270 is prevented from leaking without being sucked into the air suction port 211. The flow path interception ribs 214 may be provided outside the air suction port 211 on the upper surface of the first housing 210. The flow path interception ribs 214 may be formed on the upper surface of the first housing 210 around the air suction port 211 in a concentric shape.

The third housing 228 may be coupled with the second housing 220 at the back of the second housing 220 coupled to the rear surface of the first housing 210. Thus, the air suction port 211 may be provided in the front of the housing 202, and the air discharge port 229 may be provided in the rear of the housing 202. However, the air suction port 211 and the air discharge port 229 are not limited to such arrangement.

The first housing 210, the second housing 220, and the third housing 228 are coupled to define both an air flow path 213 that runs from the air suction port 211 to the air discharge port 229 and an internal space 227 in which the motor 270 or the impeller 230 may be disposed.

The air flow path 213 may include a module flow path 213a and a module external flow path 213b. The air may be sucked by the impeller 230 of the motor assembly 200, and the sucked air flows along the air flow path 213. The air introduced into the housing 202 may flow along the module flow path 213a into a motor module 240, and along the module external flow path 213b between an exterior of the motor module 240 and an interior of the housing 202. The sucked air passing the module flow path 213a can cool heat generated from an interior of the motor module 240. The sucked air passing the module flow path 213a and the sucked air passing the module external flow path 213b can cool heat generated from a circuit board 298 while passing the circuit board 298.

The first housing 210 may include a shroud 212.

The shroud 212 may be provided to correspond to the impeller 230 or a diffuser 122 that will be described below, and guides the air introduced into the housing 202 by the motor 270. The shroud 212 may be provided such that the flow path may be widened in a flowing direction of the air sucked from the air suction port 221 by the motor 270 and such that a space formed by the shroud 212 may be widened with respect to the axial direction of the rotor shaft 272b. The shroud 212 causes the air introduced through the air suction port 221 to be guided into the housing 202, and may be provided in a shape corresponding to an upper portion of the impeller 230.

The impeller 230 may be provided inside the air suction port 221 of the first housing 210. The impeller 230 may be provided to be rotated together with the rotor shaft 272b. The impeller 230 may be provided with a plurality of blades 132 generating a flow of air. The impeller 230 may be provided such that the radius of gyration of each blade 132 may be reduced in a direction in which the plurality of blades 132 get away from the rotor 272. The plurality of blades 132 may be provided to discharge the air, which is introduced toward the rotor shaft 272b by the rotation of the impeller 230, in a radial direction of the rotor shaft 272b. The example of the impeller 230 has been described. The shape and arrangement of the impeller 230 are not limited. Any structure may be used as long as it causes the air to flow.

The second housing 220 may include a diffuser 222. The diffuser 222 may be provided to increase a flow rate of the air flowing with the impeller 230. The diffuser 222 may be provided to be disposed outside in a radial direction of the impeller 230.

The diffuser 222 may be provided in a radial direction with respect to the impeller 230. The diffuser 222 may be made up of a plurality of ribs 223 and 224. The plurality of ribs 223 and 224 of the diffuser 222 may be formed in a direction in which they extend with respect to the plurality of blades 232 of the impeller 230 such that an interval between the neighboring ribs may be gradually increased. The plurality of ribs 223 and 224 may be formed to increase the flow rate of the air while guiding the air flowing with the impeller 230. The diffuser 222 and the shroud 212 formed at the first housing 210 define a diffuser flow path 225 so as to increase the flow rate of the air while guiding the air flowing with the impeller 230.

The plurality of ribs 223 and 224 may include first ribs 223 and second ribs 224. The first ribs 223 may be provided on the same plane as a downstream end of the air flow caused by the impeller 230, and the second ribs 224 are formed to have a predetermined inclination in a direction of the rotor axis 272a such that the air guided by the first ribs 223 may be introduced into the housing 202 in an upward/downward direction that is the direction of the rotor axis 272a.

The motor module 240 may be provided in the housing 202. The motor module 240 may be provided such that the motor 270 may be fixed in the housing 202 as one module.

The motor module 240 may include the motor 270 and the motor housing 242.

The motor housing 242 may include a front motor housing 250 and a rear motor housing 260 that may be provided to be coupled with the front motor housing 250 across the motor 270.

The front motor housing 250 may be provided to be able to be fixed to the housing 202. A seating hole 226 may be formed in the center of the second housing 220 such that the front motor housing 250 may be coupled, and thus the front motor housing 250 can be coupled to the seating hole 226. For example, the front motor housing 250 may be fitted into the seating hole 226. The coupling method is not restricted.

The front motor housing 250 may include a front motor housing body 251, an impeller seat 253, and a front seat 254. The front motor housing body 251 may be formed in an approximate disc shape, and include a body coupler 252 corresponding to a shape of the seating hole 226 so as to be coupled to the seating hole 226 of the second housing 220 as described above.

The impeller seat 253 may be provided on a front surface of the front motor housing body 251 such that the impeller 230 may be seated thereon. A front surface of the impeller seat 253 may be provided to correspond to a shape of a rear surface of the impeller 230 in order to avoid interfering with rotation of the impeller 230 coupled to the rotor shaft 272b.

The front seat 254 may be provided on a rear surface of the front motor housing body 251 such that the motor 270 may be seated thereon. The front seat 254 may be provided to seat and fix a stator 280 such that the center of a rotor 272 provided rotatably may be disposed to be identical to the rotational center of the impeller 230.

The shape of the front seat 254 is not restricted. According to an embodiment of the present invention, the front seat 254 may be formed to protrude from the front motor housing body 251 such that the motor 270 can be seated at a predetermined distance from the front motor housing body 251.

The arrangement of the front seat 254 is not restricted. According to an embodiment of the present invention, four front seats 254 may be disposed to correspond to respective ends of the stator 280 because the stator 280 may be formed long in a first direction w1.

The rear motor housing 260 may be provided to be able to be coupled with the front motor housing 250. The motor 270 may be disposed between the front motor housing 250 and the rear motor housing 260.

The rear motor housing 260 may include a rear motor housing body 261 and a rear seat 264. The rear motor housing body 261 may be formed long in the first direction w1 that is a lengthwise direction of the stator 280 so as to correspond to a shape of the stator 280.

The front and rear motor housings 250 and 260 are respectively provided with screw holes 251b and 261b such that they can be coupled to each other by screws 248.

A structure in which the motor 270 may be fixed in the front and rear motor housings 250 and 260 will be described below in detail.

Figure 22A:
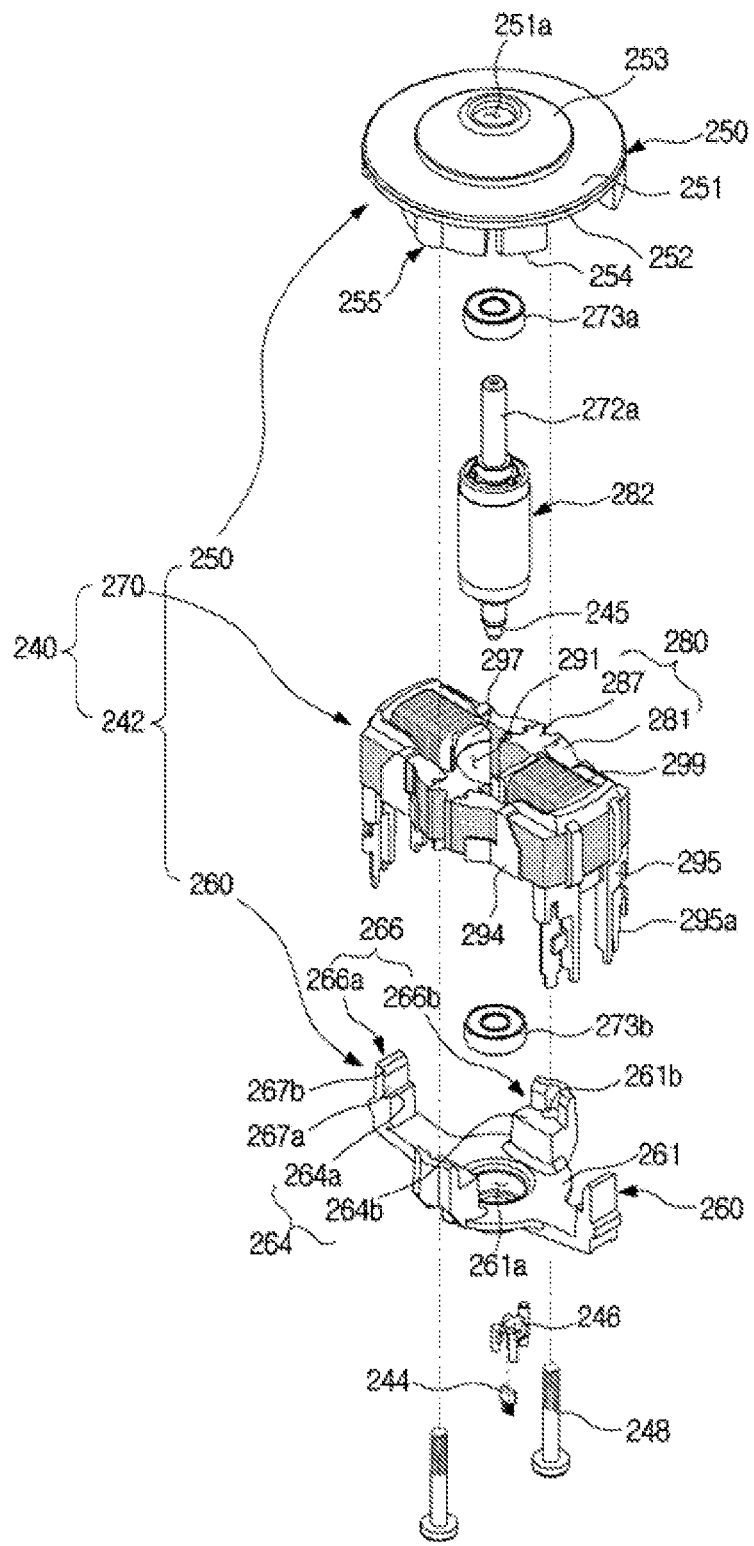
FIGS. 22A and 22B are exploded perspective views of a motor module according to an embodiment of the present invention.
Figure 22B:
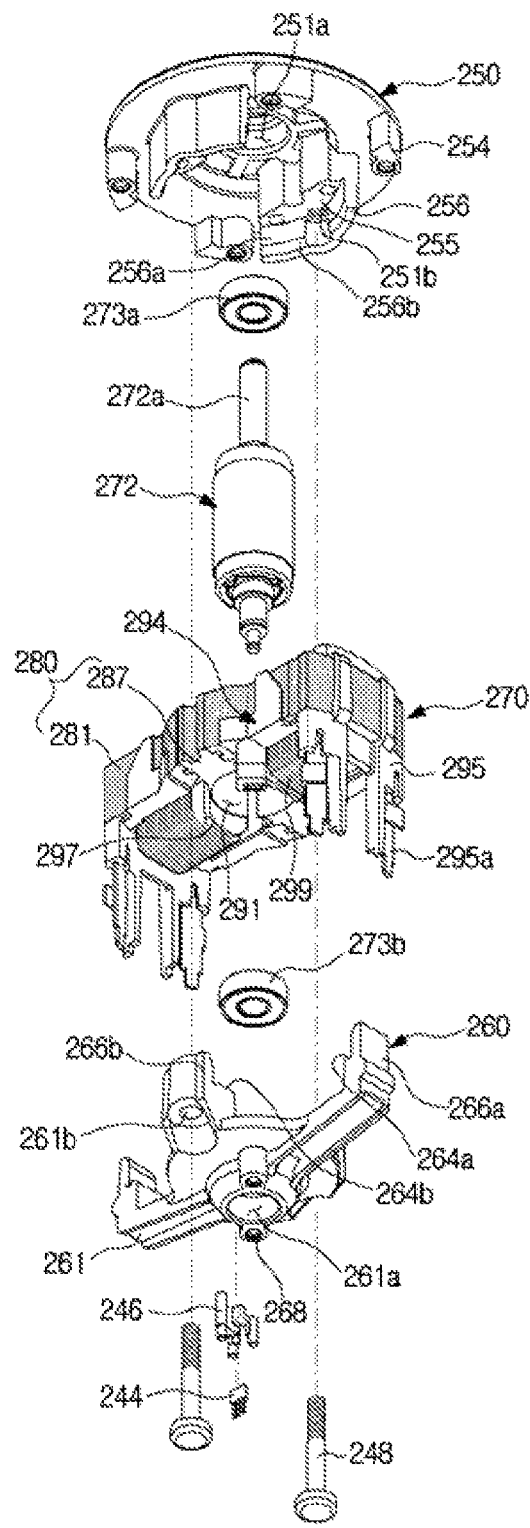

FIGS. 22A and 22B are exploded perspective views of a motor module according to the second embodiment of the present invention.

The centers of the front and rear motor housings 250 and 260 may be respectively provided with front and rear through-holes 251a and 261a through which the rotor shaft 272b can pass. Front and rear bearings 173a and 173b may be disposed in the respective front and rear through-holes 251a and 261a for the rotation of the rotor shaft 272b.

The front motor housing 250 may include front auxiliary seats 255 in addition to the front motor housing body 251 and the front seats 254.

The front motor housing body 251 may be formed in an approximately circular shape.

The front seats 254 are provided inside the front motor housing body 251 such that one side of the motor 270 may be seated thereon. That is, the front seats 254 may be provided on the rear surface of the front motor housing body 251. The front through-hole 251a may be formed in the center of the plurality of front seats 254 such that the centers of the rotor 272, the impeller 230, and the diffuser 222 are identical to each other in a state in which the stator 280 is seated on or fixed to the front seats 254.

The front auxiliary seats 255 may be provided inside the front motor housing 250. Unlike the first embodiment, the motor 270 includes at least one auxiliary stator 287. The front auxiliary seats 255 may be provided such that the auxiliary stator 287 can be seated and such that the middle of the motor 270 formed long in the lengthwise direction can be stably supported.

The front auxiliary seats 255 may be formed to protrude from the front motor housing body 251. Since a pair of auxiliary stators 287 are provided, the front auxiliary seats 255 are also provided in a pair in correspondence with the pair of auxiliary stators 287.

Each front auxiliary seat 255 may be provided with a front seating protrusion 256. The front seating protrusions 256 are formed to surround at least part of an outer surface of the stator 280, and prevent the motor 270 from deflecting in a direction perpendicular to the rotor axis 272a when the motor assembly 200 is operated.

The front seating protrusions 256 are formed to further protrude from the front motor housing body 251 than the front auxiliary seats 255 such that inner surfaces thereof can surround the auxiliary stators 287. The front seating protrusions 256 may be provided to correspond to the auxiliary stators 287 along with the front auxiliary seats 255, and particularly to be able to surround outer surfaces of the auxiliary stators 287. That is, the front surface of the motor 270 may be seated on the front seats 254 and the front auxiliary seats 255, and lateral surfaces of the motor 270 are seated on front protrusion seating faces 256a of the front seating protrusions 256. The front seating protrusions 256 may be formed with front guide faces 256b that guide the motor 270 to be easily seated on the front seats 254. The front guide faces 256b are provided with ends of the front seating protrusions 256 such that they can be formed inward so as to have a predetermined angle of inclination. The front guide faces 256b may be provided to be connected to the front protrusion seating faces 256a.

The rear motor housing 260 may include rear seating protrusions 266 in addition to the rear motor housing body 261 and the rear seats 264.

The rear motor housing body 261 may be formed long in the lengthwise direction of the stator 280 so as to correspond to the shape of the stator 280.

The rear seating protrusions 266 may be formed to protrude forward from the rear motor housing body 261, and may be provided to be able to support the lateral surfaces of the stator 280. The rear seating protrusions 266 prevent the motor 270 from deflecting in a direction perpendicular to the rotor axis 272a when the motor assembly 200 is operated along with the front seating protrusions 256.

The rear seating protrusions 266 may include first rear seating protrusions 266a and second rear seating protrusions 266b.

The first rear seating protrusions 266a may be provided to fix ends of the stator 280 in the first direction w1 that is the lengthwise direction of the stator 280, and the second rear seating protrusions 266b are provided to fix ends of the stator 280 in the second direction w2 perpendicular to the first direction w1. That is, the ends of the main stators 281 may be fixed to the first rear seating protrusions 266a, and the auxiliary stators 287 may be fixed to the second rear seating protrusions 266b.

The rear seats 264 may be provided inside the first and second rear seating protrusions 266a and 266b such that the other side of the motor 270 may be seated and supported thereon. Each of the rear seats 264 may include a first rear seat 264a provided inside each of the first rear seating protrusions 266a, and a second rear seat 264b provided inside each of the second rear seating protrusions 266b.

The rear seating protrusions 266 may include rear guide faces 267b that guide the motor 270 to be easily seated on the first rear seats 264a and the second rear seats 264b and are formed inward to be inclined at a predetermined angle. The rear surface of the motor 270 may be seated on the rear seats 264, and the lateral surfaces of the motor 270 are seated on rear protrusion seating faces 267a of the rear seating protrusions 266. The rear seating protrusions 266 may be formed with the rear guide faces 267b that guide the motor 270 to be easily seated on the rear seats 264. The rear guide faces 267b may be provided with ends of the rear seating protrusions 266 such that they can be formed to have a predetermined angle of inclination. The rear guide faces 267b may be provided to be connected to the rear protrusion seating faces 267a.

The rear motor housing body 261 of the rear motor housing 260 may be formed long in the lengthwise direction of the stator 280 so as to correspond to the shape of the stator 280 to be described below. Four rear seating protrusions 266 may be provided to be disposed at positions that face the front seating protrusions 256 of the front motor housing 250.

That is, the front seating protrusions 256 and the rear seating protrusions 266 can more firmly support the motor 270 disposed between them.

The rear motor housing 260 may be provided with a magnet sensor 244.

The magnet sensor 244 may be provided on the same line as a magnet 245 of the rotor 272, and can detect a position according to the rotation of the rotor 272. This information may be transmitted to a position sensor (not shown) of the circuit board 298. Thereby, it is possible to perform position control of the rotor 272.

The magnet sensor 244 may be disposed to be seated on a sensor bracket 246, and transmits the information to the position sensor (not shown) of the circuit board 298. The sensor bracket 246 may be provided such that one end thereof is coupled to a sensor seat 268 provided on the rear surface of the rear motor housing 260 and the other end thereof is coupled to the circuit board 298. The position sensor may not be directly located at the rotor 272, but the magnet sensor 244 may be disposed near the rotor 272. Thereby, the position control of the rotor 272 can be realized by adding a simple structure.

The front and rear motor housings 250 and 260 may be provided with the respective screw holes 251b and 261b such that they can be coupled to each other by the screws 248. According to an embodiment, the screw holes 251b are respectively formed in the two front auxiliary seat 255, and the screw holes 261b are respectively formed in the two second rear seats 264b. The screws 248 are provided to pass through the screw holes 261b of the second rear seats 264b and to be coupled to the corresponding screw holes 251b of the front auxiliary seat 255. That is, the front and rear motor housings 250 and 260 can be fixedly coupled by the two screws 248.

Figure 23:
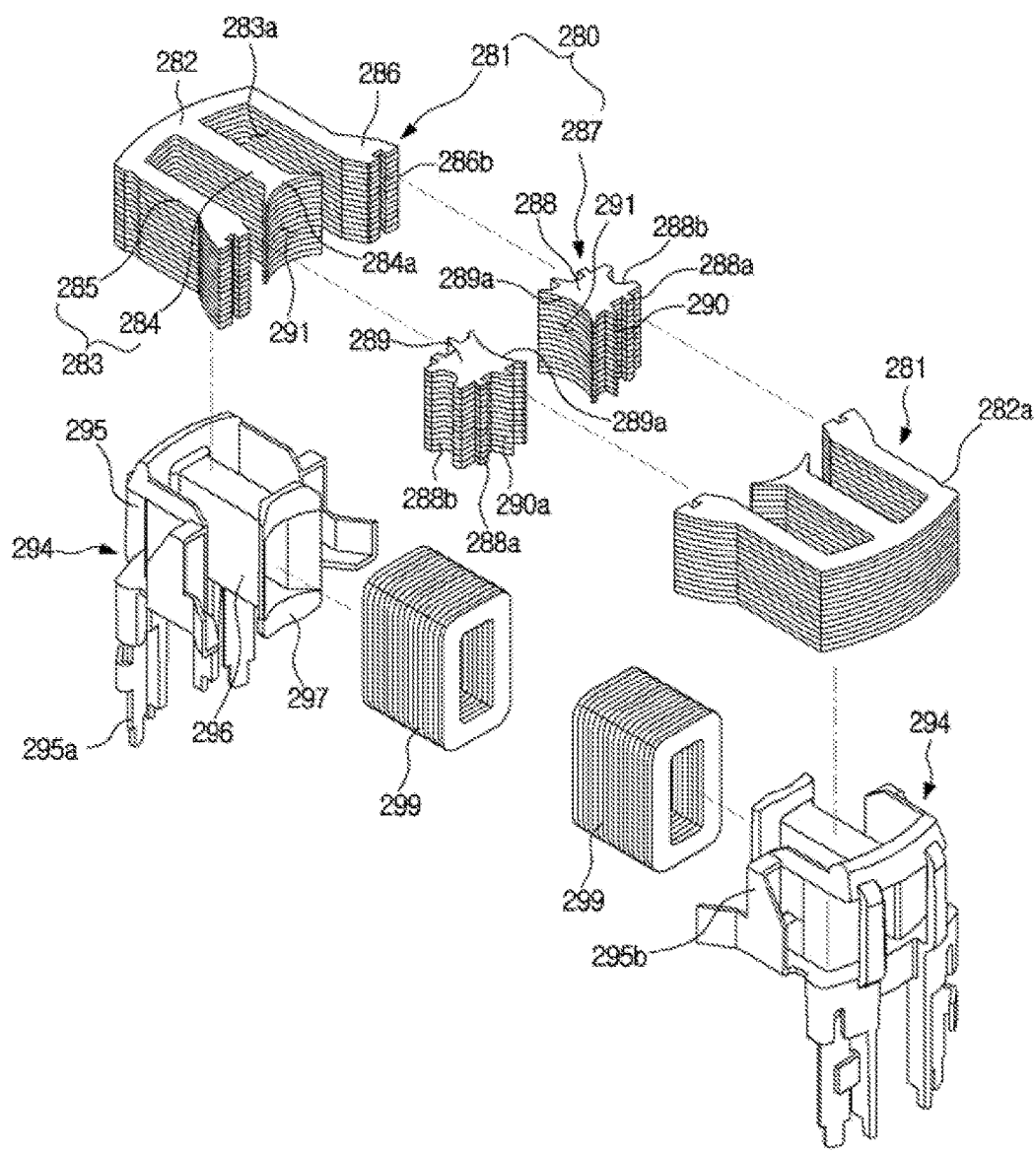
FIG. 23 is an exploded perspective view of a motor according to an embodiment of the present invention.

FIG. 23 is an exploded perspective view of a motor according to the second embodiment of the present invention.

The motor 270 may include a rotor 272 and a stator 280.

The rotor 272 may be rotatably provided in the center of the stator 280.

The stator 280 may be provided to electromagnetically interact with the rotor 272.

The stator 280 may include main stators 281 and auxiliary stators 287.

Each main stator 281 may include a main stator body 282 and at least one main stator core 283 provided to extend from the main stator body 282.

The main stator body 282 may include a pair of main stator bodies 282 that are disposed across the rotor 272 in the first direction w1 so as to face each other. The pair of main stator bodies 282 may be provided to be coupled to each other in the first direction w1 that is the lengthwise direction of the stator 280. That is, the main stators 281 are not provided around the rotor 272 in a circular shape in a circumferential direction of the rotor 272, but the main stators 281 are provided to enclose the rotor 272. A length determined in the first direction w1 may be longer than that determined in the second direction w2 perpendicular to the first direction w1. That is, assuming that the length of the stator 280 which is determined in the first direction w1 be L1, and the length of the stator 280 which is determined in the second direction w2 be L2, the stator 280 may be formed to meet a condition that L1 is greater than L2.

The main stator core 283 includes a center core 284 and side cores 285 provided at sides of the center core 284.

The center cores 284 are provided to face each other across the rotor 272. A rotor receptacle 291 may be defined between the center cores 284 such that the rotor 272 is rotatable. A pair of side cores 285 are provided at both the sides of the center core 284 in parallel to the center core 284.

A stator slot 283a may be formed between the center core 284 and the side core 285. As a coil 299 may be wound around the center core 284, the coil 299 may be housed in the stator slots 283a. An inner end of the center core 284 which is adjacent to the rotor 272 may be provided with an expanded main core 284a in which a width of the center core 284 is partly increased. The expanded main core 284a may be formed in such a way that the inner end of the center core 284 which is directed to the rotor 272 is increased in width to surround the circumference of the rotor 272. A gap 284b may be formed for the rotation of the rotor 272 between an inner surface of the expanded main core 284a and an outer surface of the rotor 272.

The auxiliary stators 287 may be provided to electromagnetically interact with the rotor 172 along with the main stators 281. The auxiliary stators 287 may face each other across the rotor 272, and may be disposed in the second direction w2 perpendicular to the first direction w1. The auxiliary stators 287 may be provided in a pair, and be disposed between the pair of main stator bodies 282 so as to face each other across the rotor 272.

Each auxiliary stator 287 may include an auxiliary stator body 288 and at least one auxiliary core 289 provided to extend from the auxiliary stator body 288.

The auxiliary cores 289 may face each other across the rotor 272, may be formed to be shorter than the center core 284, and may be disposed in the second direction w2 perpendicular to the first direction w1. The rotor receptacle 291 in which the rotor 272 may be provided rotatably may be defined between the auxiliary cores 289. That is, the rotor receptacle 291 may be formed between the pair of center core 284 and the pair of auxiliary core 289.

An inner end of the auxiliary core 289 that may be adjacent to the rotor 272 may be formed with an expanded auxiliary core 289a in which a width of the auxiliary core 289 is partly increased. The expanded auxiliary core 289a may be formed in such a way that the inner end of the auxiliary core 289 which may be directed to the rotor 272 may be partly increased in width to surround the circumference of the rotor 272. The gap 284b may be formed for the rotation of the rotor 272 between an inner surface of the expanded auxiliary core 289a and the outer surface of the rotor 272.

The main stators 281 and the auxiliary stators 287 may be formed by laminating pressed steel sheets.

Each main stator 281 may include main couplers 286 that are formed at ends of the side cores 285 so as to be bent outward.

The main couplers 286 may be formed at the ends of the side cores 285 of each main stator 281 so as to be bent outward. The main couplers 286 may be provided to increase coupling strength when coupled with the auxiliary stators 287 and to get the motor 270 stably supported on the motor housing 242. That is, the main couplers 286 are coupled with the auxiliary stators 287, thereby having a greater thickness than the neighboring main stators 281. With this configuration, the coupled regions between the main stators 281 and the auxiliary stators 287 can be increased in strength, and be stably supported on the front auxiliary seats 255 and the second rear seats 264b.

The main couplers 286 may be formed with coupling sockets 286b such that they are coupled to the auxiliary stator 287, and the auxiliary stator 287 may be formed with coupling tails 288a. Each auxiliary stator 287 may be disposed between the pair of main couplers 286 facing each other, and the main stators 281 and the auxiliary stators 287 may be coupled by interlocking between the coupling sockets 286b provided in each main coupler 286 and the coupling tails 288a provided at both the sides of each auxiliary stator 287.

Each auxiliary stator 287 may include contact flanges 290 and a fixing groove 288b.

The contact flanges 290 may be formed to extend from the auxiliary stator body 288 toward the main stators 281 disposed at both the sides of the auxiliary stator 287 in the first direction, and may be provided to be disposed inside the main couplers 286. Each main coupler 286 includes a coupling face 286a that may be provided on an inner surface thereof in a concave shape such that one of the contact flanges 290 may be seated. Each contact flange 290 includes a flange seating face 290a provided to correspond to the coupling face 286a in a convex shape. An example in which the coupling face 286a and the flange seating face 290a are the concave face and the convex face is given. However, various shapes are possible as long as the coupling face 286a and the flange seating face 290a can be in surface contact with each other. The coupling face 286a and the flange seating face 290a are provided to have a predetermined inclination with respect to the first or second direction. Thereby, the auxiliary stators 287 are not easily separated from the main stators 281.

The contact flanges 290 may be seated on the inner surfaces of the main couplers 286, and thereby the auxiliary stators 287 are prevented from moving from the inside to the outside of the main couplers 286.

The fixing groove 288b may be provided in an outward end of the auxiliary stator body 288 so as to be recessed inward from the auxiliary stator body 288. An outer surface of the screw 248 disposed when the front motor housing 250 and the rear motor housing 260 are coupled may be located in the fixing groove 288b. The outer surface of the screw 248 may be seated on the fixing groove 288b, and supports one side of the auxiliary stator 287.

An insulator 294 may be formed of a material having an electrical insulating property. The insulator 294 may be formed to surround a part of the stator 280, particularly the center core 284. The insulator 294 includes an insulator body 295 that may be provided to correspond to the main stator bodies 282 of the stator 280, a center core support 296 that may be provided to correspond to the center core 284 at the insulator body 295, and a coil guide 297 that protrudes from the center core support 296 in a radially outward direction.

The insulator 294 may include at least one body coupler 295a. The body coupler 295a may be provided at one side of the insulator body 295 so as to guide the coil 299 wound around the motor 270 to the circuit board 298. Further, the body coupler 295a may be provided to be inserted into and fixed to the circuit board 298 such that the motor 270 and the circuit board 298 can be coupled.

The coil 299 may be wound around the center core 284 and the center core support 296 in a state in which the insulator 294 may be coupled with the stator body 282 of the stator 280. The coil 299 may be wound around the side cores 285 and the insulator 294 surrounding the side cores 285. According to an embodiment of the present invention, the coil 299 is wound around the center core 284 and the center core support 296.

The insulator 294 may include core reinforcements 295b. The core reinforcements 295b may be provided outside the stator 280 so as to vertically support the stator 280. According to an embodiment of the present invention, the core reinforcements 295b are provided outside the side cores 285 so as to vertically support the side cores 285. Since the stator 280 may be formed by laminating the pressed steel sheets, the core reinforcements 295b vertically support the stator 280, and thereby the durability of the stator 280 can be improved.

According to an exemplary embodiment, the configuration of the flow path guide as in the first embodiment is omitted. However, the flow path guide may be applied to the exemplary embodiment.

As the stator 280 may be formed long in the first direction w1, arrangement regions 292 may be provided around the rotor 272 in a circumferential direction of the stator 280. That is, the arrangement regions 292 may be provided at portions perpendicular to the lengthwise direction of the stator 280

The arrangement regions 292 are regions provided on the same plane as the stator 280, and may be provided to improve practical use of the internal space 227 of the motor assembly 200. Each arrangement region 292 may be formed in an approximately semi-circular shape. The components of the motor assembly 200 may be disposed in the arrangement regions 292. According to an embodiment of the present invention, at least one capacitor 298b may be disposed.

The arrangement regions 292 may be provided in a pair at both the sides of the stator 280, and the capacitors 298b may also be provided in a pair. According to an embodiment of the present invention, a total of four capacitors 298b may be disposed in the arrangement regions 292 two by two. Each capacitor 298b serves to smooth an electric current or to remove a ripple.

Figure 24:
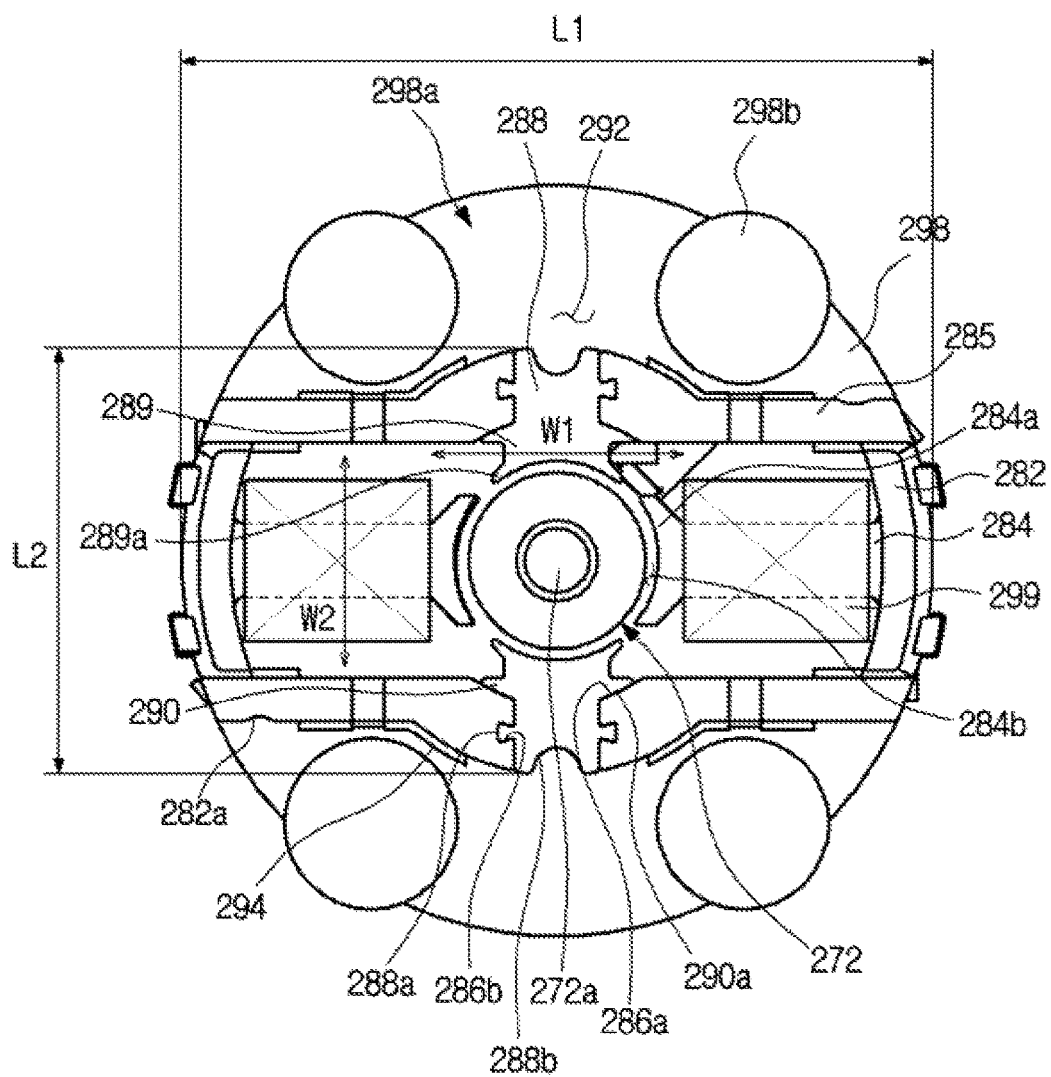
FIG. 24 is a view illustrating an arrangement relation between a circuit board and the motor according to an embodiment of the present invention.

FIG. 24 is a view illustrating an arrangement relation between the circuit board and the motor according to a second embodiment of the present invention.

The circuit board 298 may be provided below the motor 270 so as to transmit electric signals to the motor 270. A mounting region 298a in which circuit elements are disposed may be provided on one surface of the circuit board 298. The circuit elements including heat dissipating elements, capacitors 298b, etc. may be disposed in the mounting region 298a.

The electric signals may be transmitted from the circuit board 298 to the motor 270, and heat generated from the circuit board 298 can be removed through the air flow generated by the operation of the motor 270. Thus, the circuit board 298 can be disposed in the vicinity of the motor 270. However, a space to avoid interference of the motor 270 with the circuit elements is unnecessarily increased in actuality, and the motor assembly 200 may be increased in size.

According to an embodiment of the present invention, the motor 270 may be provided to be formed long in one direction, and the arrangement regions 292 may be provided on the same plane. That is, the arrangement regions 292 are extra spaces provided such that other components of the motor assembly 200 can be disposed, and may be provided at the opposite sides of the stator 280 which are formed in a lengthwise direction or in one direction. According to an embodiment of the present invention, the housing 202 has an approximately cylindrical shape, and the impeller 230 may be provided in a circular shape. Thus, each arrangement region 292 may be provided in a circular segment shape having a predetermined length of arc.

Electrical elements may be provided in the mounting region 298a of the circuit board 298. The electrical elements may be disposed to overlap the arrangement regions 292 of the motor 270 so as to avoid interfering with the motor 270.

According to an embodiment, an example in which the capacitors 298b are disposed is given. However, other electrical elements may be disposed in the arrangement regions 292.

With this configuration, for example, the motor 270 and the circuit board 298 can be disposed to be closer to each other, and thus the practical use of the internal space of the housing 202 can be improved.

Figure 25:
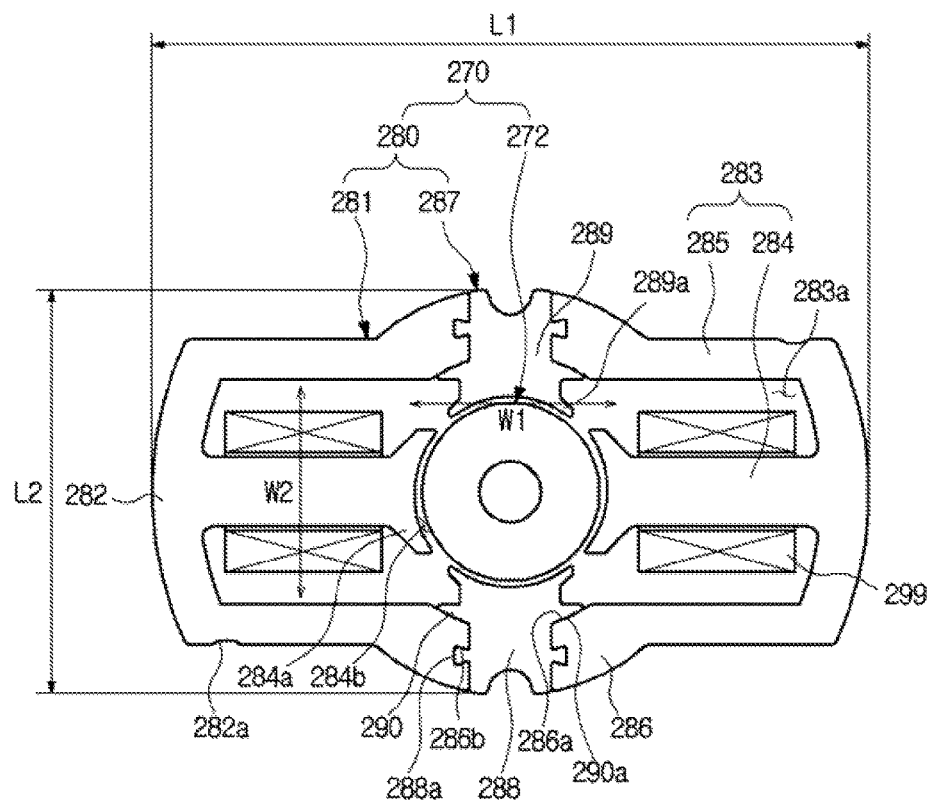
FIG. 25 is a front view of the motor according to an embodiment of the present invention.
Figure 26:
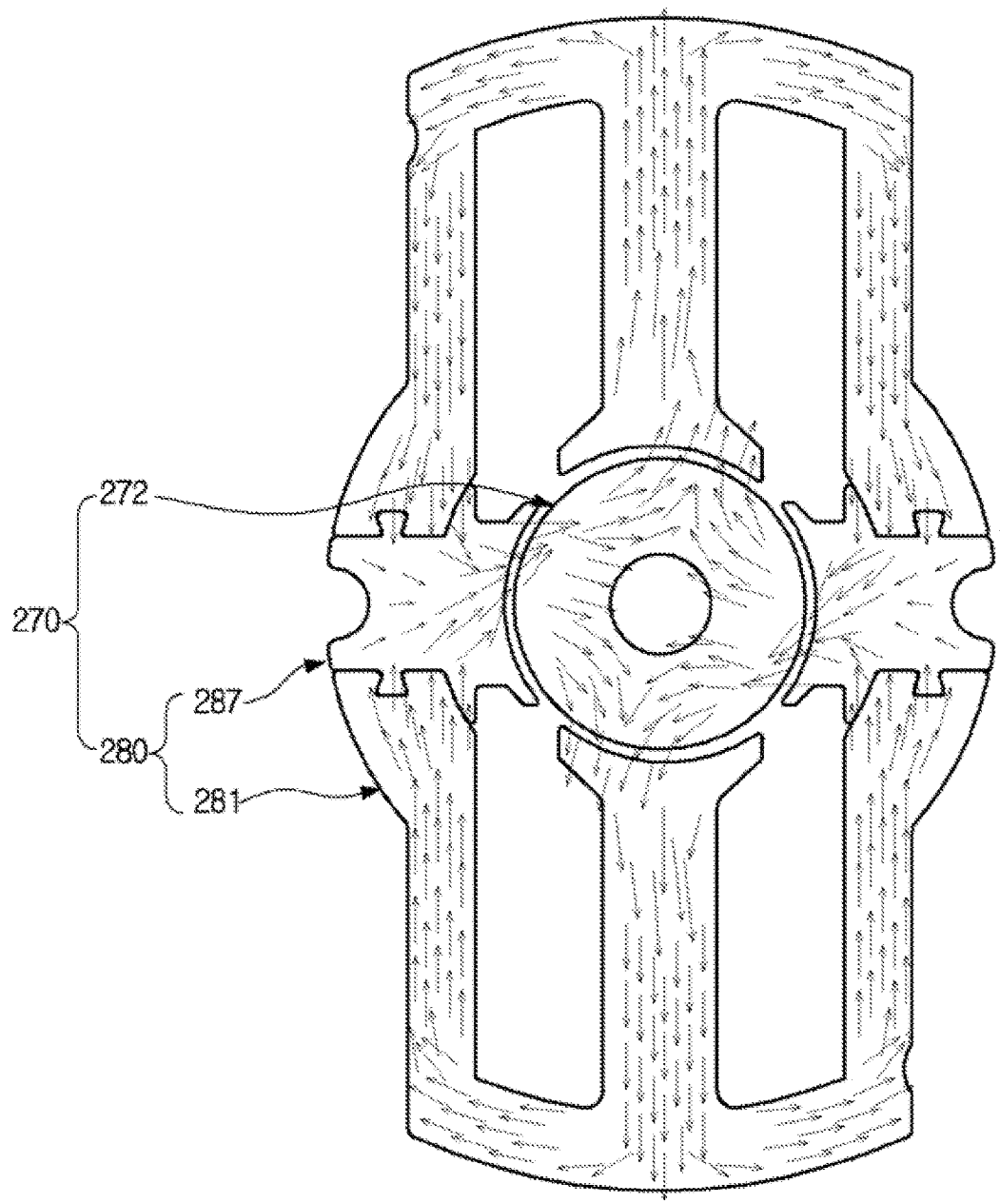
FIG. 26 is a view illustrating a flow of a magnetic field of the motor according to an embodiment of the present invention.

FIG. 25 is a front view of the motor according to the second embodiment of the present invention. FIG. 26 is a view illustrating a flow of a magnetic field of the motor according to the second embodiment of the present invention.

The main stators 281 of the stator 280 may be provided in the symmetry with respect to the rotor 272.

The pair of expanded main cores 284a and the pair of expanded auxiliary cores 289a, which form the gap 284b with respect to the outer surface of the rotor 272 around the rotor 272, may be provided such that the centers of the curved inner surfaces thereof deviate from each other.

The pair of expanded main cores 284a and the pair of expanded auxiliary cores 289a may be provided to enclose the outer surface of the rotor 272 such that the center of the inner surface of one of the expanded main cores 284a or one of the expanded auxiliary cores 289a deviates from the center of the inner surface of the other of the expanded main cores 284a or the other of the expanded auxiliary cores 289a.

With this configuration, the pair of expanded main cores 284a or the pair of expanded auxiliary cores 289a enclosing the rotor 272 are provided to have electromagnetic influences different in intensity and direction from each other such that the rotor 272 can be rotated in any one direction.

The stator bodies 282 or 288 may include direction recognition grooves 282a provided to be able to recognize a coupling direction of the stator. According to an embodiment of the present invention, an example in which the direction recognition grooves 282a are applied to the main stator bodies 282 is given. The position of the direction recognition groove 282a is not restricted. The direction recognition groove 282a may be provided only for any one of the main stator bodies 282 so as to be able to distinguish a leftward/rightward direction of the main stator body 282. A center of the inner surface of one of the expanded main cores 284a or one of the expanded auxiliary cores 289a may be formed to be different from the center of the inner surface of the other of the expanded main cores 284a or the other of the expanded auxiliary cores 289a. That is, an end of one of the expanded main cores 284a or one of the expanded auxiliary cores 289a is formed to be closer to the rotor than an end of the other of the expanded main cores 284a or the other of the expanded auxiliary cores 289a.

When the pair of stator bodies 282 or 288 are coupled without distinguishing the leftward/rightward direction in such a way that ends of the expanded main or auxiliary cores 284a or 289a that are adjacent to the rotor are disposed in the same direction, start torque required for initial rotation of the rotor 272 is not generated. Therefore, the pair of stator bodies 282 or 288 may be coupled such that the direction recognition grooves 282a provided for the stator bodies 282 or 288 are disposed in symmetry with respect to the rotor 272, and thereby making it easy to generate the start torque required to the initial rotation of the rotor. Although the direction recognition grooves 282a have been illustrated and described in the present embodiment, they may be applied to other embodiments of the present invention.

FIG. 26 is a view illustrating a magnetic field formed at the stator 280 and the rotor 272.

A magnetic field may be formed at the stator 280 and the rotor 272 when electric current is supplied to the motor 270 and thus the stator 280 and the rotor 272 electromagnetically interact with each other. The magnetic field may be formed at the stator 280 and the rotor 272 by a change in polarity caused by the rotation of the rotor 272.

A process of assembling the motor assembly 200 according to the embodiment of the present invention is described.

Referring to FIG. 23, the pair of main stator bodies 282 are coupled via the pair of auxiliary stator 287. That is, the auxiliary stators 287 are disposed between the side cores 285 of the pair of main stator bodies 282 that are opposite to each other, and are coupled with the pair of main stator bodies 282. Thereby, the stator 280 may be formed.

At least part of the stator 280 may be covered with the insulators 294 for the purpose of electrical insulation.

Referring to FIGS. 22A and 22B, the rotor 272 may be inserted into the rotor receptacle 291 formed in the stator 280 coupled to the insulators 294 with the gap 284b formed between each expanded core and the rotor 272. The motor 270 made up of the rotor 272 and the stator 280 may be fixed to the motor housing 242 as one module.

One surface and the other surface of the motor 270 may be seated on the front seat 254 and the front auxiliary seat 255 of the front motor housing 250 and the rear seat 264 of the rear motor housing 260, and the lateral surfaces of the motor 270 are seated on the front and rear seating protrusions 256 and 266.

The rotor shaft 272b passes through the through-holes of the motor housing 242 such that the rotor 272 and the stator 280 have the same center when the motor 270 may be seated on and coupled to the motor housing 242.

The front motor housing 250 and the rear motor housing 260 may be coupled by the screws 248, and the coupling method is not limited thereto.

The motor 270 and the motor housing 242 may be provided as the motor module 240.

Referring to FIG. 21, the motor module 240 may be coupled to the seating hole 226 of the second housing 220. The body coupler 252 of the front motor housing 250 may be coupled to the seating hole 226 of the second housing 220.

The impeller 230 may be coupled to the rotor shaft 272b in the front of the motor module 240. The impeller 230 may be disposed on the impeller seat 253 of the front motor housing 250.

The first housing 210 may be coupled to the front of the second housing 220. The shroud 212 may be provided on the inner surface of the first housing 210, thereby forming a flow path running into the housing 202 together with the impeller 230 and the diffuser.

The capacitors 298b are disposed in the arrangement regions 292 of the motor 270 in the rear of the motor module 240, and the circuit board 298 may be coupled to prevent the motor 270 from interfering with the other electric elements. The motor module 240 may be provided such that it can be physically coupled with the circuit board 298 by circuit couplers coupled to the insulators 294 and that the coils 299 provided for the motor 270 can be electrically coupled with the circuit board 298.

As the motor module 240 may be coupled with the housing 202 and the circuit board 298, the motor assembly 200 can be assembled.

Figure 27:
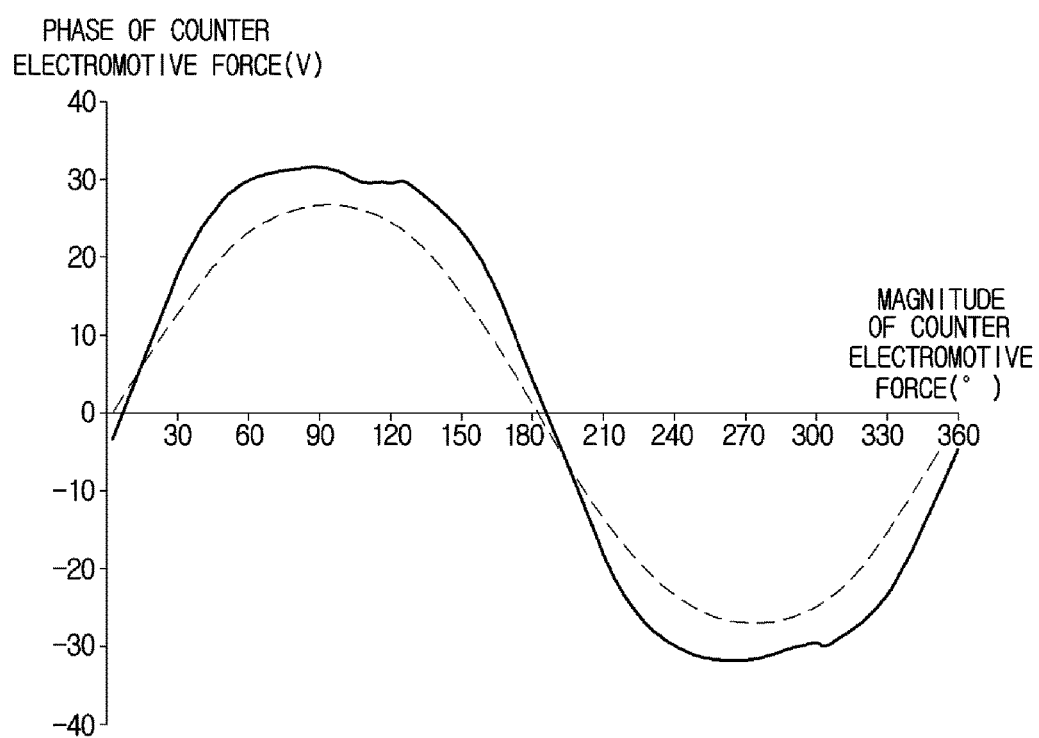
FIG. 27 is a graph showing performance of the motor according to an embodiment of the present invention.

FIG. 27 is a graph showing exemplary performance of the motor according to the second embodiment of the present invention.

The horizontal axis indicates a phase of a counter electromotive force, and the vertical axis indicates magnitude of the counter electromotive force. A dashed line indicates a counter electromotive force of the motor 170 having the pair of stator bodies 182 formed in the first direction w1 as in the first embodiment, and a solid line indicates a counter electromotive force of the motor 270 having the stator 280 made up of the main stators 281 and the auxiliary stators 287 as in the second embodiment.

In the case of the motor 270 having the auxiliary stators 287, the counter electromotive force is increased unlike the motor 170 free of the auxiliary stators 287 in the first embodiment, and thus capacity of the motor is easily increased. Therefore, it is possible to increase the capacity of the motor without increasing a lamination of the stator. That is, the capacity of the motor can be increased without increasing a size of the stator. As a result, the size of the motor 270 can be reduced.

A motor assembly according to a third embodiment and a vacuum cleaner having the same are described.

A description of components overlapping the description of those in the aforementioned embodiments is omitted.

Figure 28:
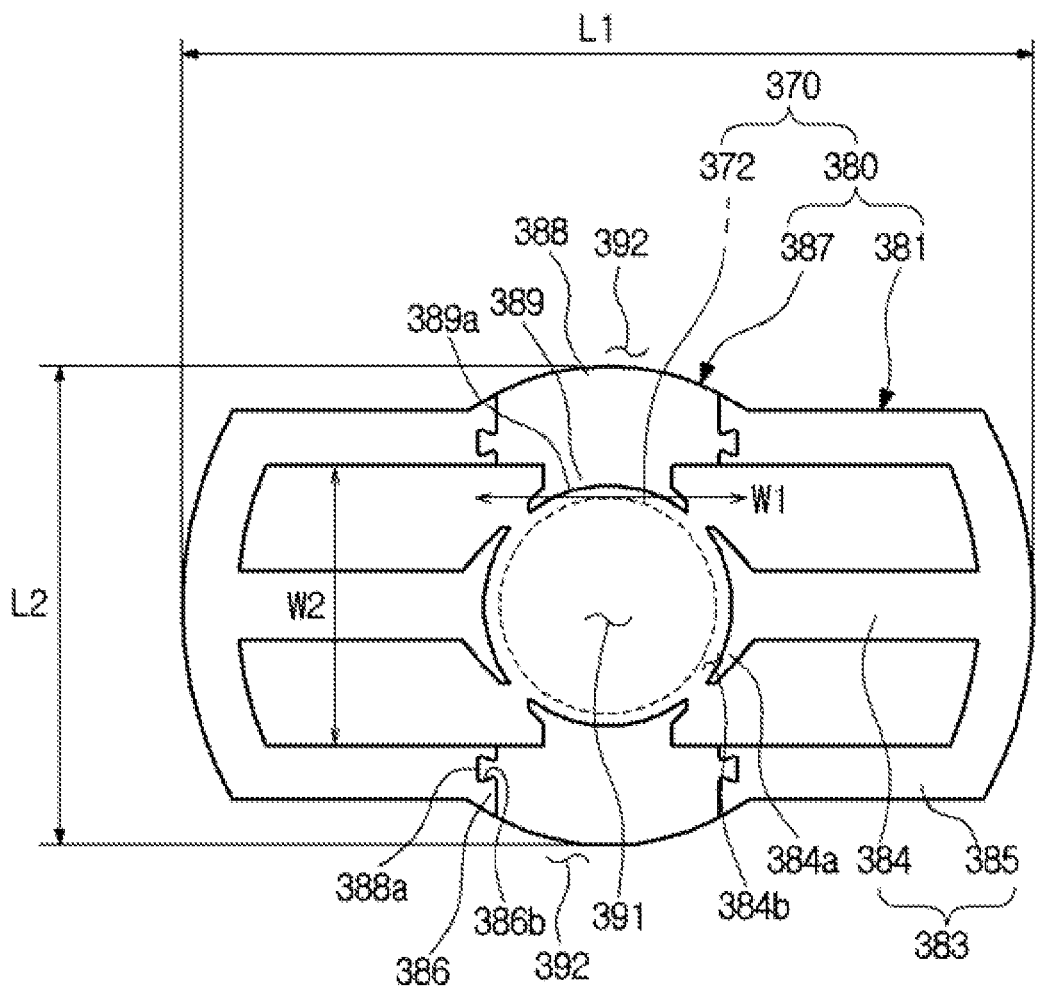
FIG. 28 is a view illustrating a stator according to an embodiment of the present invention.

FIG. 28 is a view illustrating a stator according to an embodiment of the present invention.

The present embodiment may be different from the second embodiment with regard to a shape of a stator 380. The present embodiment may be different from the second embodiment with regard to the shape and coupling configuration of the stator 380.

A motor 370 may include main stators 381 and auxiliary stators 387.

Each auxiliary stator 387 may include an auxiliary stator body 388, and at least one auxiliary core 389 provided to extend from the auxiliary stator body 388.

The auxiliary stator body 388 may be formed to have a larger width than a side core 385 of the neighboring main stator 381 in order to reinforce strength of a coupled region. The auxiliary stator body 388 may be formed such that an outer surface thereof is swollen outward with respect to an inner surface thereof.

The auxiliary cores 389 may be provided to face each other across a rotor 372, be each formed to be shorter than a center core 384, and be disposed in a second direction perpendicular to a first direction. A rotor receptacle 391 may be formed between the auxiliary cores 389 such that the rotor 372 can be rotated. The rotor receptacle 391 may be formed between the pair of center cores 384 and the pair of auxiliary cores 389.

An expanded auxiliary core 389a in which a width of each auxiliary core 389 may be partly increased may be formed at an inner end of each auxiliary core 389 adjacent to the rotor 372. The expanded auxiliary core 389a in which the width of each auxiliary core 389 may be partly increased may be formed at the inner end of each auxiliary core 389 directed to the rotor 372 so as to surround a circumference of the rotor 372. A gap 384b for rotation of the rotor 372 may be formed between an inner surface of the expanded auxiliary core 389a and an outer surface of the rotor 372.

Each auxiliary stator 387 may include an air barrier. The air barrier may be provided to have high resistance to a flow of a magnetic field so as to be able to change the flow of the magnetic field. Thereby, the flow of the magnetic field can be made smoother. In the present embodiment, the air barrier may be provided in the auxiliary stator body 388 outside the auxiliary core 389 in a hole shape.

Each main stator 381 may be provided with coupling sockets 386b that are formed in ends of the side cores 385 and are coupled to the auxiliary stators 387, and each auxiliary stator 387 may be provided with coupling tails 388a. The main stators 381 and the auxiliary stators 387 may be coupled by fitting the coupling tails 388a into the coupling sockets 386b.

Main stator bodies 382, main stator cores 383, expanded main cores 384a, stator slots 383a, main couplers 386, and arrangement regions 392 may have the same description as those of the second embodiment.

A motor assembly according to an embodiment and a vacuum cleaner having the same are described.

A description of components overlapping the description of those in the aforementioned embodiments is omitted.

Figure 29:
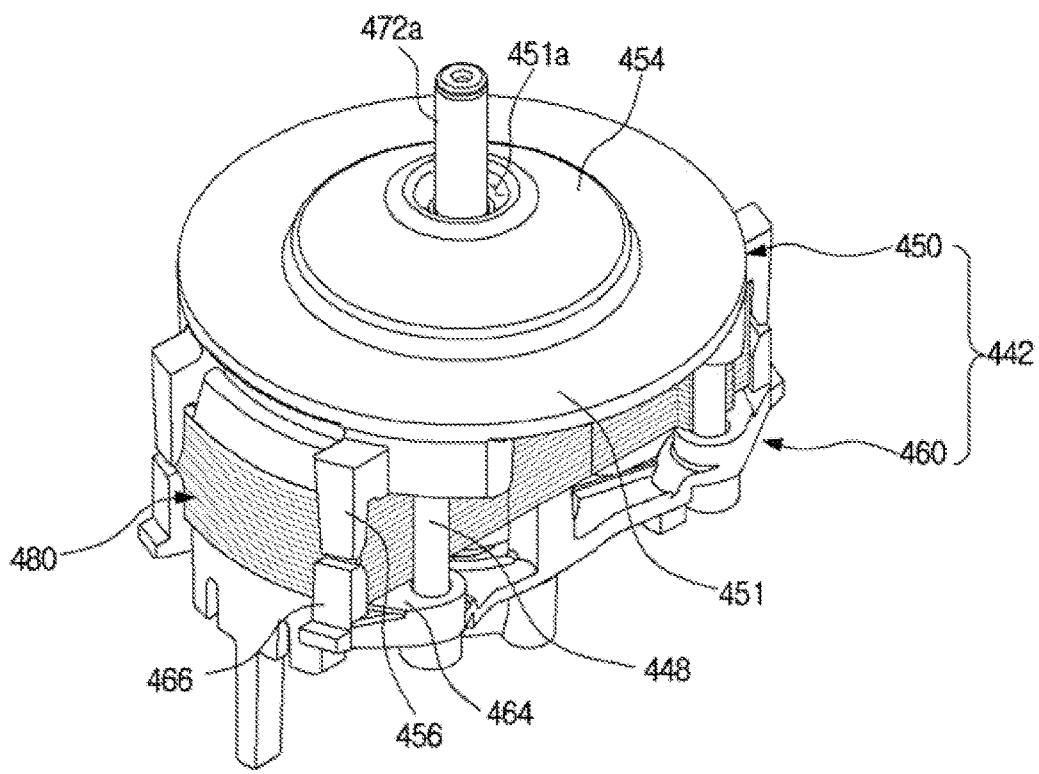
FIGS. 29 and 30 are perspective views illustrating a motor module according to an embodiment of the present invention.
Figure 30:
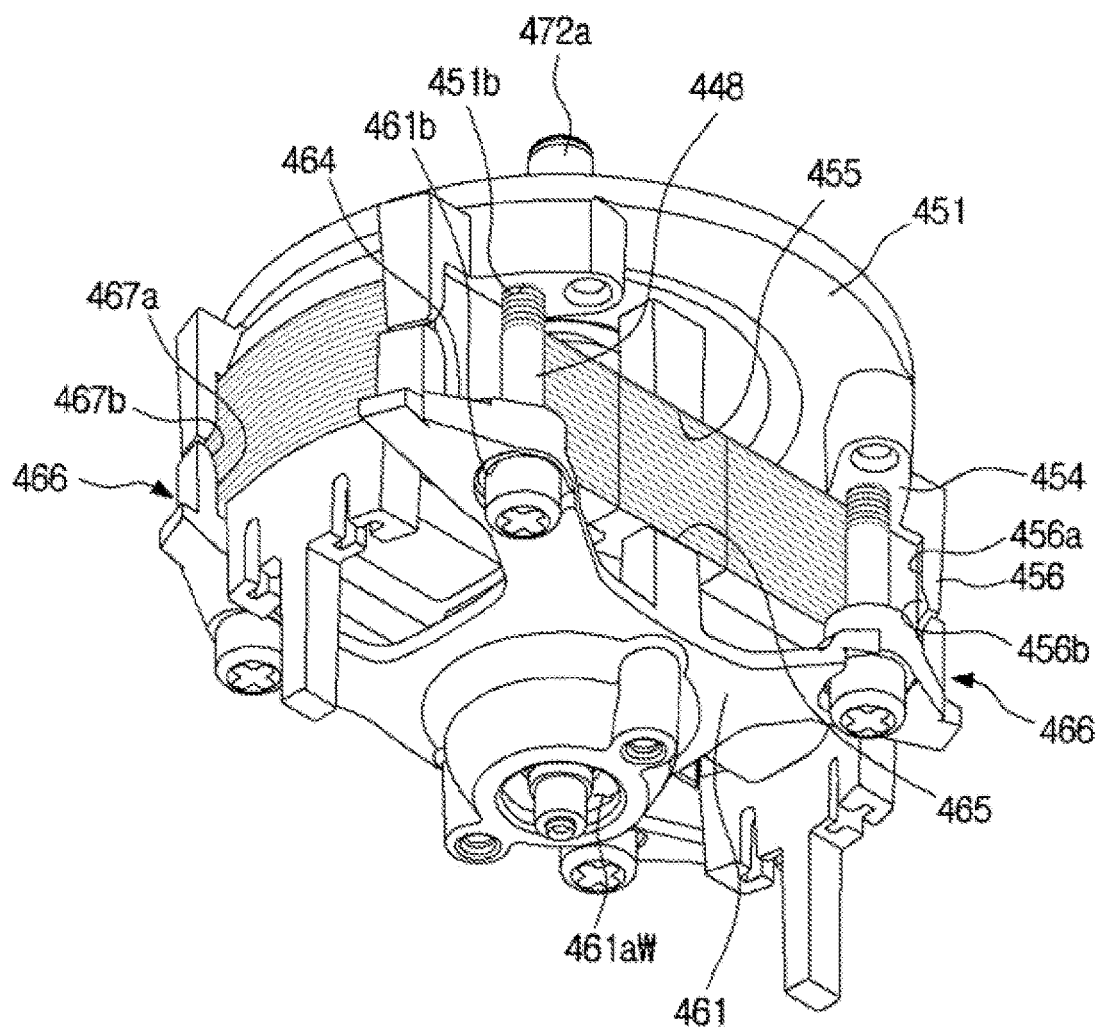
Figure 31:
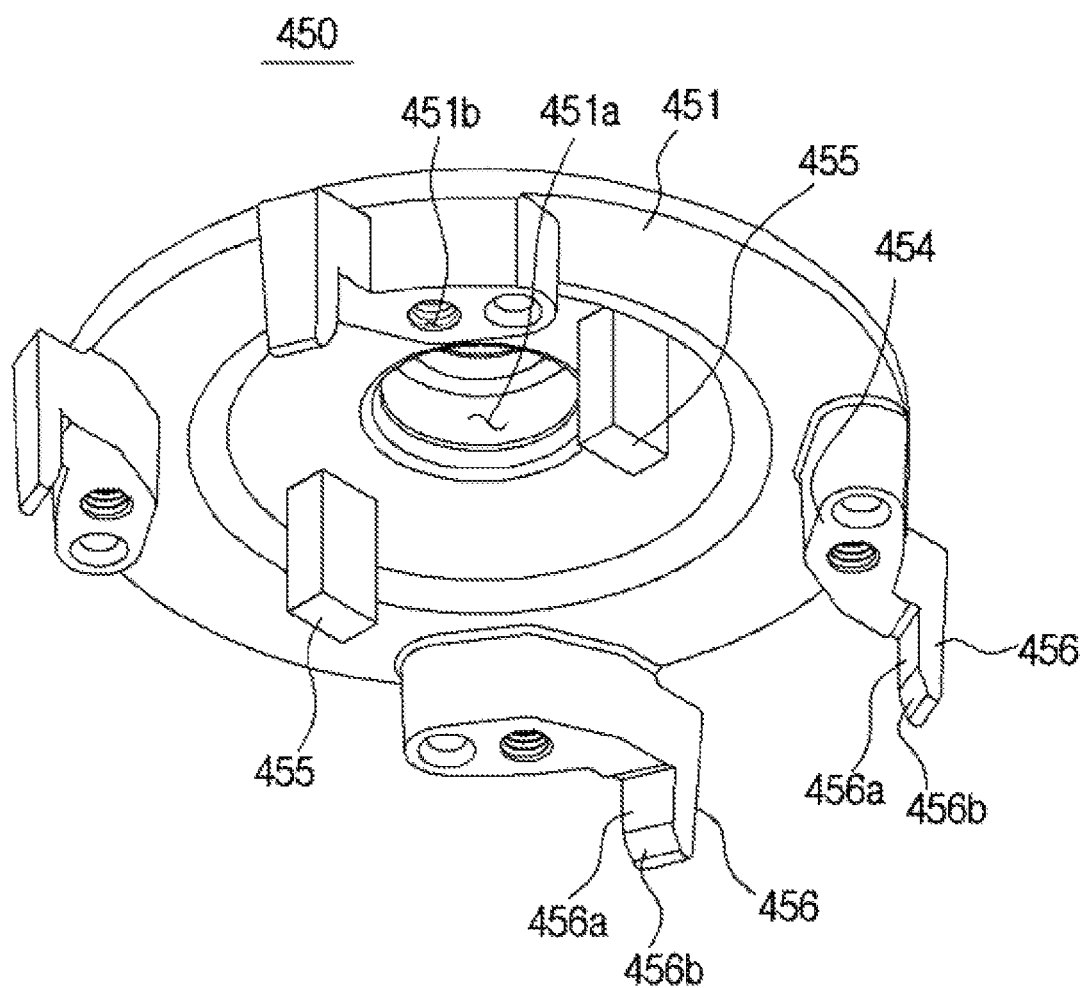
FIG. 31 is a perspective view illustrating a front motor housing according to an embodiment of the present invention.
Figure 32:
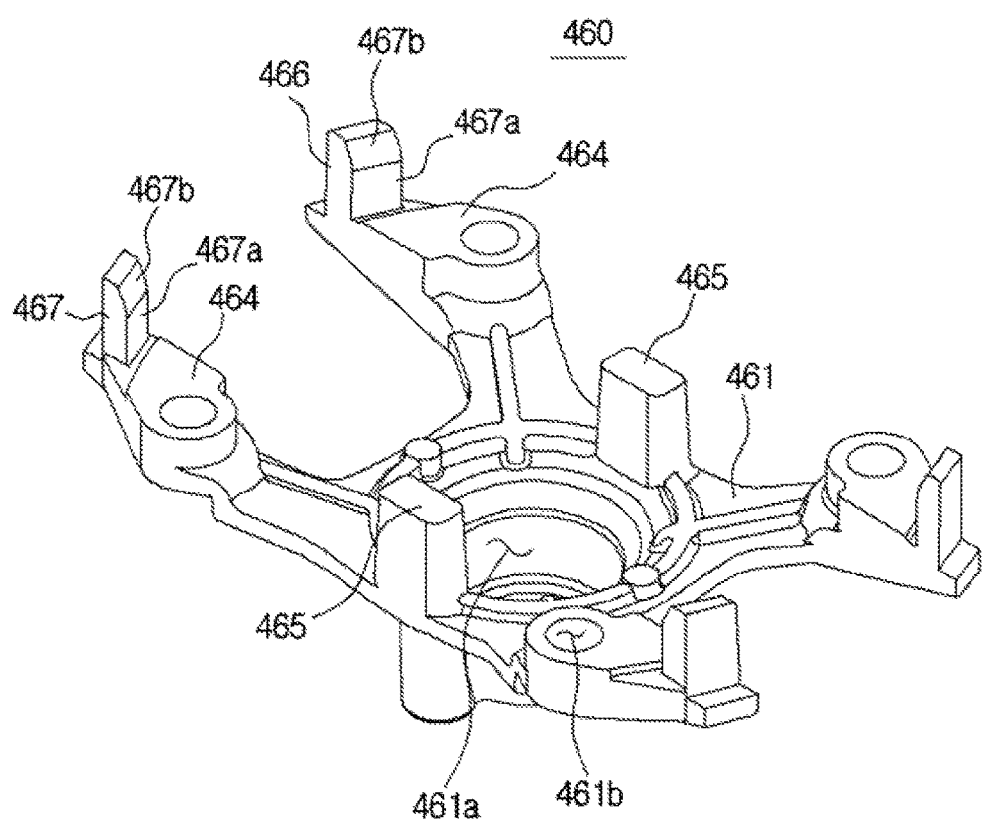
FIG. 32 is a perspective view illustrating a rear motor housing according to an embodiment of the present invention.
Figure 33:
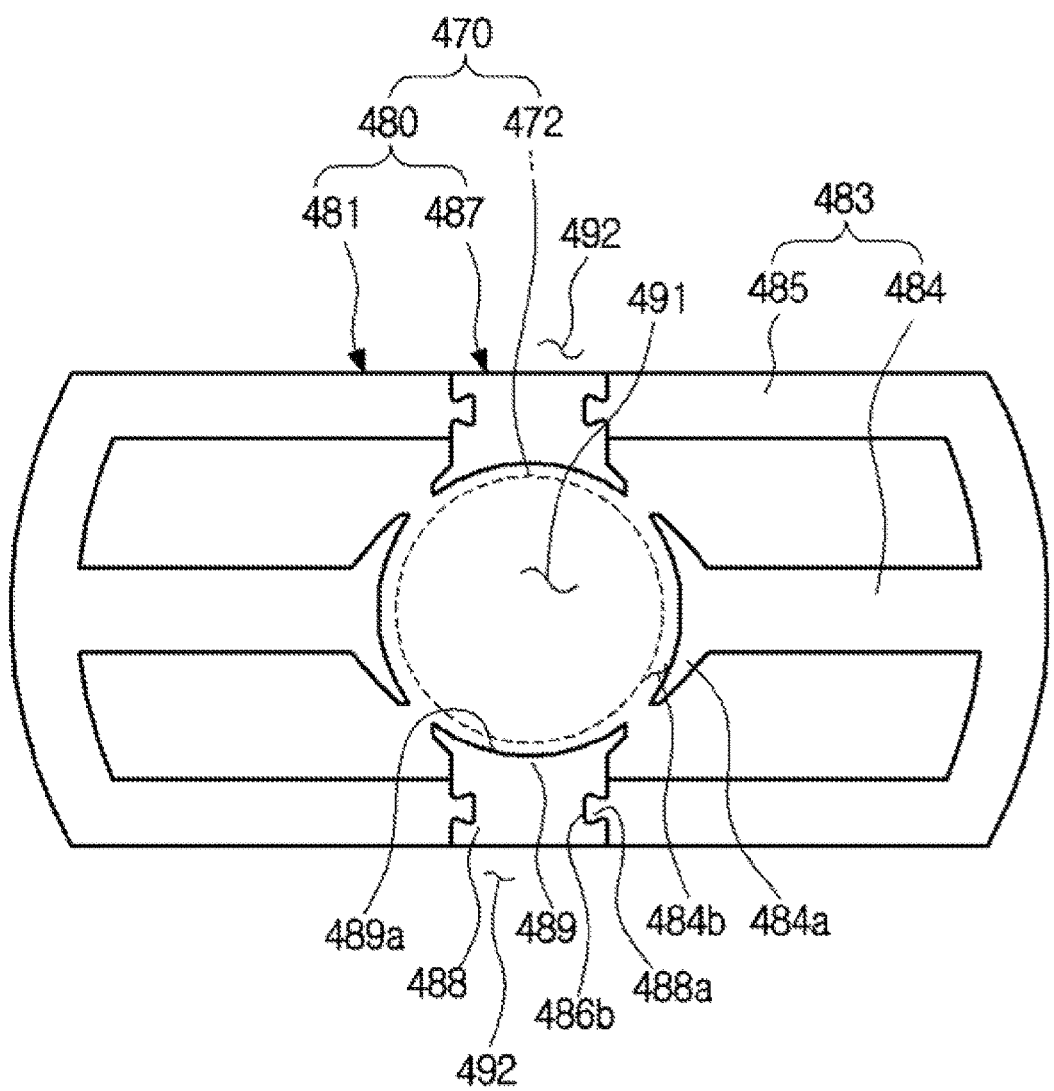
FIG. 33 is a view illustrating a motor according to an embodiment of the present invention.
Figure 34:
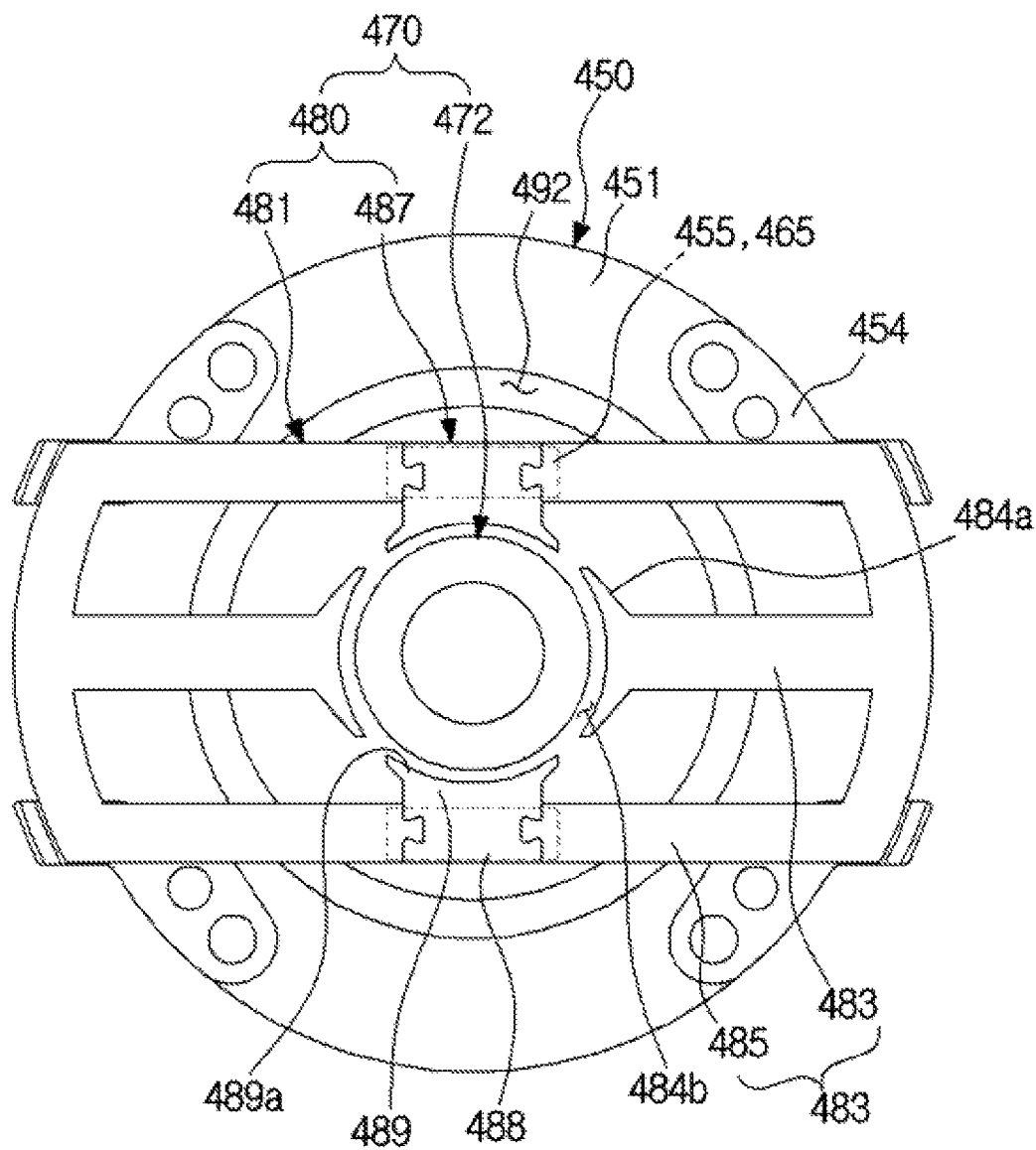
FIG. 34 is a view illustrating arrangement of the motor and the motor housing according to an embodiment of the present invention.

FIGS. 29 and 30 are perspective views illustrating a motor module according to an embodiment of the present invention. FIG. 31 is a perspective view illustrating a front motor housing according to an embodiment of the present invention. FIG. 32 is a perspective view illustrating a rear motor housing according to an embodiment of the present invention. FIG. 33 is a view illustrating a motor according to an embodiment of the present invention. FIG. 34 is a view illustrating arrangement of the motor and the motor housing according to an embodiment of the present invention.

An exemplary embodiment may be different from the third embodiment with regard to a shape of a stator 480.

An exemplary embodiment may be different from the third embodiment with regard to the shape of the stator 480 and a coupling configuration of a motor housing 442.

Each auxiliary stator 487 may include an auxiliary stator body 488, and at least one auxiliary core 489 provided to extend from the auxiliary stator body 488.

The auxiliary stator body 488 may be formed to have the same width as a side core 485 of each main stator 481. An outer lateral surface of the side core 485 and an outer lateral surface of the auxiliary stator body 488 may be disposed to be flush with each other.

Unlike the stators of the second and third embodiments, without protruding beyond lateral surfaces of the stator 480, arrangement regions 492 may be formed in the same housing so as to be larger than the stator of the second or third embodiment.

The auxiliary cores 489 may be provided to face each other across a rotor 472, be each formed to be shorter than a center core 484, and be disposed in a second direction perpendicular to a first direction. A rotor receptacle 491 may be formed between the auxiliary cores 489 such that the rotor 472 can be rotated. The rotor receptacle 491 may be formed between the pair of center cores 484 and the pair of auxiliary cores 489.

An expanded auxiliary core 489a in which a width of each auxiliary core 489 may be partly increased may be formed at an inner end of each auxiliary core 489 adjacent to the rotor 472. The expanded auxiliary core 489a in which the width of each auxiliary core 489 may be partly increased may be formed at the inner end of each auxiliary core 489 directed to the rotor 472 so as to surround a circumference of the rotor 472. A gap 484b for rotation of the rotor 472 may be formed between an inner surface of the expanded auxiliary core 489a and an outer surface of the rotor 472.

Each main stator 481 may be provided with coupling tails that are formed in ends of the side cores 485 and are coupled to the auxiliary stators 487, and each auxiliary stator 487 may be provided with coupling sockets 488a. The main stators 481 and the auxiliary stators 487 may be coupled by fitting the coupling tails into the coupling sockets 488a.

The stator 480 may be fixed by the motor housing 442.

A front motor housing 450 may include a front motor housing body 451, at least one front seat 454, and at least one front auxiliary seat 455. The front motor housing body 451 may be formed in an approximate disc shape.

The front seat 454 may be provided on a rear surface of the front motor housing body 451 such that a motor 470 may be seated thereon. The front seat 454 may be provided to seat and fix the stator 480 such that the center of the rotor 472 provided rotatably may be disposed to be identical to the rotational center of an impeller. The front seat 454 may be provided inside the front motor housing body 451 such that one side of the motor 470 may be seated thereon. That is, the front seat 454 may be provided on a rear surface of the front motor housing body 451.

The shape of the front seat 454 is not restricted. According to an embodiment of the present invention, the front seat 454 may be formed to protrude from the front motor housing body 451 such that the motor 470 can be seated at a predetermined distance from the front motor housing body 451.

The arrangement of the front seat 454 is not restricted. According to an embodiment of the present invention, four front seats 454 may be disposed to correspond to respective ends of the stator 480 because the stator 480 may be formed long in a lengthwise direction.

The front auxiliary seats 455 are provided inside the front motor housing 450. The front auxiliary seats 455 are provided to allow the auxiliary stators 487 to be seated thereon such that a middle portion of the motor 470 formed long in the lengthwise direction can be stably supported.

The front auxiliary seats 455 may be formed to protrude from the front motor housing body 451. Since the auxiliary stators 487 are provided in a pair, the front auxiliary seats 455 are also provided in a pair.

The front motor housing 450 may include front seating protrusions 456. The front seating protrusions 456 may be formed to surround at least part of the outer surface of the stator 480 and to prevent the stator 480 from moving in a leftward/rightward direction to be deflected when the motor assembly is operated.

The front seating protrusions 456 may be formed to further protrude from the front motor housing body 451 beyond the front seat 454 such that the main stators 481 can be surround with inner surfaces thereof. The front seating protrusions 456 may be provided to correspond to the main stators 481 along with the front auxiliary seat 455, and particularly to surround outer surfaces of the main stators 481.

Each front seating protrusion 456 may include a front protrusion seating face 456a on which the lateral surface of the motor 470 is seated, and a front guide face 456b that extends from the front protrusion seating face 456a and may be formed inward so as to have a predetermined angle of inclination such that the motor 470 is easily seated.

A rear motor housing 460 may be provided to be coupled with the front motor housing 450. The motor 470 can be disposed between the front motor housing 450 and the rear motor housing 460.

The rear motor housing 460 may include a rear motor housing body 461, rear seats 464, and rear seating protrusions 466. The rear motor housing body 461 may be formed long in the lengthwise direction of the stator 480 so as to correspond to a shape of the stator 480.

Each rear seat 464 may be provided on a front surface of the rear motor housing body 461 such that the motor 470 is seated thereon. The rear seats 464 are provided to seat and fix the stator 480 such that the center of the rotor 472 provided rotatably may be disposed to be identical to the rotational center of the impeller.

The shape of the front seat 154 is not restricted. According to an embodiment of the present invention, the front seat 154 may be formed to protrude from the front motor housing body 151 such that the motor 170 can be seated at a predetermined distance from the front motor housing body 151. The rear seats 464 are provided inside the rear motor housing body 461 such that the other side of the motor 470 may be seated thereon.

The shape of each rear seat 464 is not restricted. According to an embodiment of the present invention, the rear seats 464 are formed to protrude from the rear motor housing body 461 such that the motor 470 can be seated at a predetermined distance from the rear motor housing body 461.

The arrangement of the rear seats 464 is not restricted. According to an embodiment of the present invention, four rear seats 464 may be disposed to correspond to respective ends of the stator 480 because the stator 480 may be formed long in the lengthwise direction.

Rear auxiliary seats 465 may be provided inside the rear motor housing 460. The rear auxiliary seats 465 are provided to allow the auxiliary stators 487 to be seated thereon such that the middle portion of the motor 470 formed long in the lengthwise direction can be stably supported.

The rear auxiliary seats 465 may be formed to protrude from the rear motor housing body 461. Since the auxiliary stators 487 may be provided in a pair, the rear auxiliary seats 465 may also provided in a pair.

The rear seating protrusions 466 may be formed to protrude from a body of the rear motor housing 460 along a circumference of the rear motor housing 460 such that the motor 470 may be surrounded with inner surfaces thereof. Each rear seating protrusion 466 may be provided with a rear guide face 467b that may be formed inward so as to have a predetermined angle of inclination such that the motor 470 may be easily seated on the rear seats 464 when the motor 470 and the rear seating protrusions 466 are coupled. The rear surface of the motor 470 may be seated on the rear seats 464, and the lateral surfaces of the motor 470 are seated on rear protrusion seating faces 467a of the rear seating protrusions 466. The rear guide faces 467b of the rear seating protrusions 466 guide the motor 470 to be easily seated on the rear seats 464. The rear guide faces 467b may be formed on ends of the rear seating protrusions 466 so as to have a predetermined angle of inclination and to be connected to the rear protrusion seating faces 467a.

The front and rear motor housings 450 and 460 have screw holes 451b and 461b, and may be provided to be able to be coupled by screws 448.

A front through-hole 451a and a rear through-hole 461a may be provided in the centers of the front motor housing 450 and the rear motor housing 460 such that the rotor shaft 472b can pass therethrough.

Main stator bodies 482, main stator cores 483, and expanded main cores 484a, all of which are not described with reference to the figures, have the same description as those of the previous embodiment.

A motor assembly according to a fifth embodiment and a vacuum cleaner having the same will be described.

An exemplary embodiment may be different from the first embodiment with regard to a configuration of a magnet cover 776.

Figure 35:
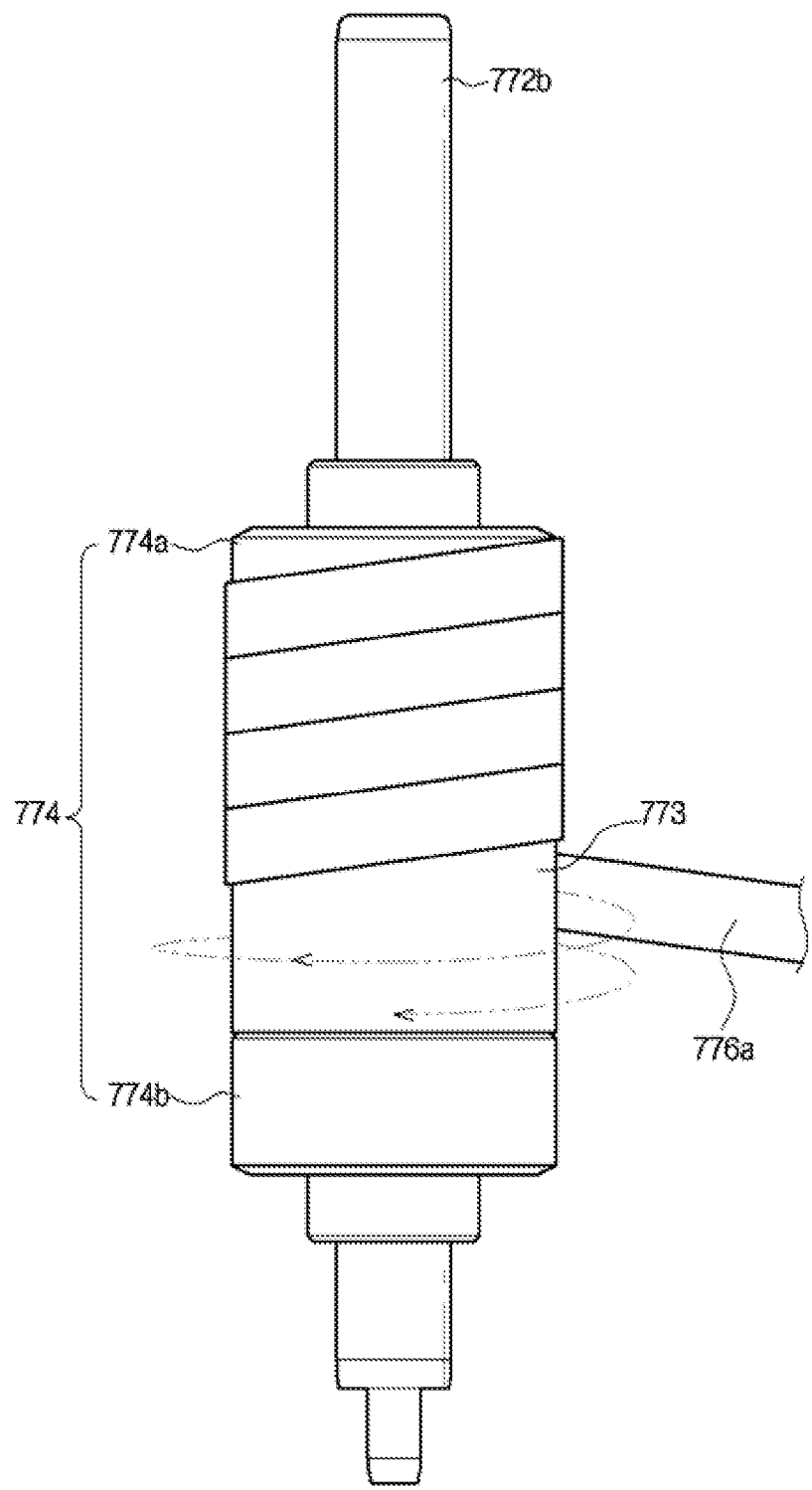
FIG. 35 is a view illustrating a method for producing a rotor according to an embodiment of the present invention.

FIG. 35 is a view illustrating a method for producing a rotor according to a fifth embodiment of the present invention.

In the first embodiment, the magnet cover 176 may be provided to enclose the outer circumferential surface of the magnet 173 by the winding process and then the hardening process.

According to an exemplary embodiment, a magnet cover 776 may include a ribbon-shaped cover body 776a.

The cover body may be provided to be wound on an outer circumferential surface of the magnet 773 in a spiral shape. The cover body of the magnet cover 776 encloses the outer circumferential surface of the magnet 773 while being wound in the spiral shape. The cover body may be wound to correspond to a length of the magnet 773, and thus be variously applied according to the length of the magnet 773.

The cover body may be provided to be directly wound on the outer circumferential surface of the magnet 773. The magnet cover 776 may be formed by winding and hardening the cover body around a jig shaped of a round rod, and be put on the outer circumferential surface of the magnet 773. The magnet cover 776 may be more firmly fixed to the magnet 773 by an adhesive applied between the magnet cover 776 and the magnet 773.

A motor assembly according to a sixth embodiment and a vacuum cleaner having the same are described.

The present embodiment may be different from the first embodiment with regard to a coupling structure of an impeller 830 and a rotor shaft 872b. A repeated description of the same components as in the aforementioned embodiments will be omitted.

Figure 36:
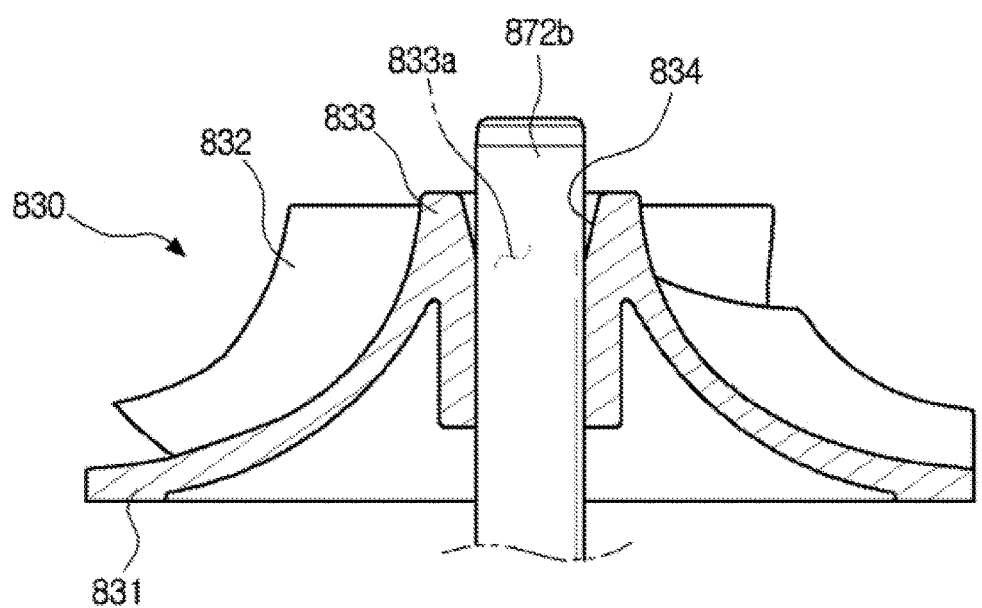
FIG. 36 is a cross-sectional view illustrating coupling of a rotor shaft and an impeller according to an embodiment of the present invention.

FIG. 36 is a cross-sectional view illustrating coupling of a rotor shaft and an impeller according to a sixth embodiment of the present invention.

The impeller 830 includes an impeller body 831, a plurality of blades 832, and a shaft coupler 833.

The shaft coupler 833 may include a shaft coupling face 834 and an oblique coupling face 835.

The shaft coupling face 834 may be provided to correspond to an outer circumferential surface of the rotor shaft 872b. The shaft coupling face 834 may be provided to allow the rotor shaft 872b to be press-fitted into the shaft coupler 833.

The oblique coupling face 835 may be provided to extend from the shaft coupling face 834 and be formed to be inclined. The oblique coupling face 835 may be provided to be inclined in a direction away from the rotor shaft 872b.

In other words, the oblique coupling face 835 may be formed on at least part of an inner circumferential surface of the shaft coupler 833, and may be inclined in an inserting direction of the rotor shaft 872b such that an inner diameter thereof is gradually increased on the inner circumferential surface of the shaft coupler 833. The outer circumferential surface of the rotor shaft 872b and the oblique coupling face 835 may be adhered by an adhesive.

With this configuration, the rotor shaft 872b may be coupled to the shaft coupling face 834 by the press-fitting and to the oblique coupling face 835 by the adhesive, and thereby may be coupled with the shaft coupler 833.

A shaft inserting hole 833a that is not described has the same description as that of the aforementioned embodiment.

Hereinafter, a motor assembly according to a seventh embodiment and a vacuum cleaner having the same is described.

The present embodiment may be different from the first embodiment with regard to a coupling structure of an impeller 930 and a rotor shaft 972b. A repeated description of the same components as in the aforementioned embodiment will be omitted.

Figure 37:
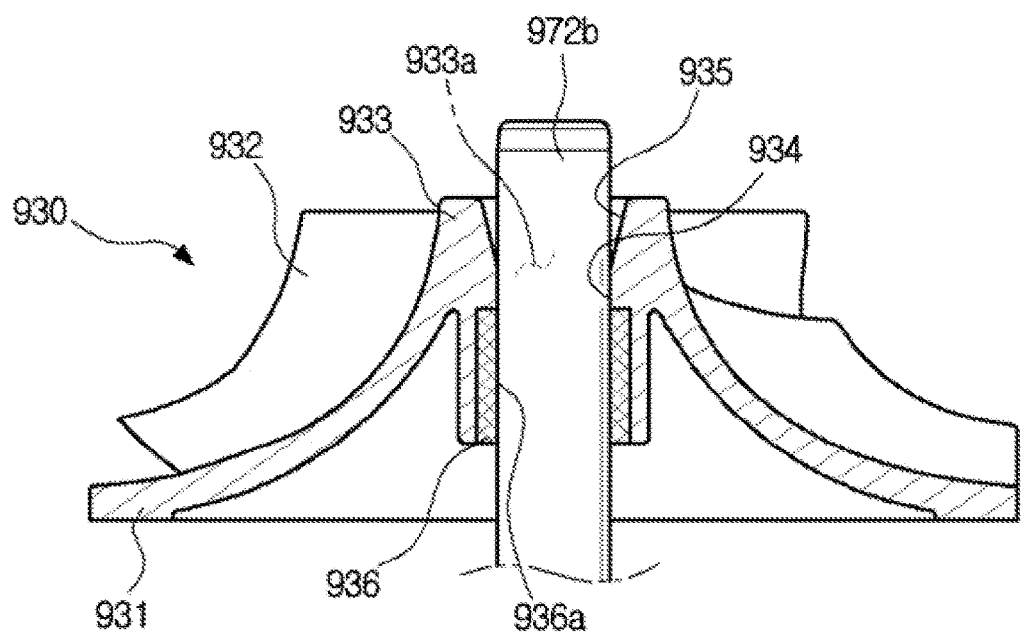
FIG. 37 is a cross-sectional view illustrating coupling of a rotor shaft and an impeller according to an embodiment of the present invention.

FIG. 37 is a cross-sectional view illustrating coupling of a rotor shaft and an impeller according to a seventh embodiment of the present invention.

The impeller 930 includes an impeller body 931, a plurality of blades 932, and a shaft coupler 933.

The shaft coupler 933 includes an anti-deformation unit 936 and an oblique coupling face 935.

The anti-deformation unit 936 may be provided to prevent deformation of the shaft coupler 933 when the rotor shaft 972b may be coupled to the shaft coupler 933. To press-fit the rotor shaft 972b into the shaft coupler 933, an outer circumferential surface of the rotor shaft 972b and an inner circumferential surface of the shaft coupler 933 are formed to be substantially identical to each other. For this reason, during the press-fitting, the inner circumferential surface of the shaft coupler 933 may be deformed.

The anti-deformation unit 936 may be formed along the inner circumferential surface of the shaft coupler 933 along with the impeller 930 in one body by insert injection molding. The anti-deformation unit 936 may be provided for the shaft coupler 933 such that at least part thereof may be disposed from an end of the shaft coupler 933 having the rotor shaft 972b.

The anti-deformation unit 936 may include an anti-deformation face 936a corresponding to the outer circumferential surface of the rotor shaft 972b. The anti-deformation face 936a may be provided to allow the rotor shaft 972b to be press-fitted into the shaft coupler 933.

A material of the anti-deformation unit 936 is not restricted. However, the anti-deformation unit 936 may be formed of a metal material so as to prevent deformation resulting from the rotor shaft 972b.

The oblique coupling face 935 has the same description as that of the aforementioned embodiment.

With this configuration, the rotor shaft 972b may be coupled to the anti-deformation face 936a of the anti-deformation unit 936 by the press-fitting and may be adhered to the oblique coupling face 935 by the adhesive. Thereby, the rotor shaft 972b may be coupled with the shaft coupler 933.

A shaft inserting hole 933a and a shaft coupling face 934 that are not described have the same description as those of the aforementioned embodiment.

A motor assembly according to an eighth embodiment and a vacuum cleaner having the same is described.

The present embodiment may be different from the seventh embodiment with regard to a coupling structure of an impeller 1030 and a rotor shaft 1072b. A repeated description of the same components as in the aforementioned embodiment will be omitted.

Figure 38:
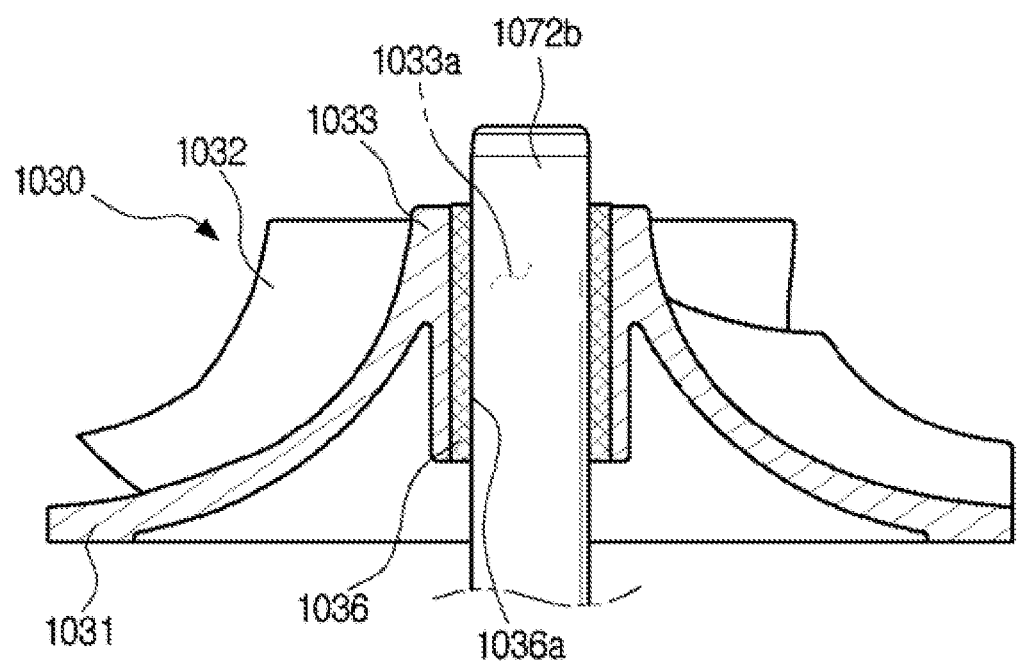
FIG. 38 is a cross-sectional view illustrating coupling of a rotor shaft and an impeller according to an embodiment of the present invention.

FIG. 38 is a cross-sectional view illustrating coupling of a rotor shaft and an impeller according to an eighth embodiment of the present invention.

The impeller 1030 includes an impeller body 1031, a plurality of blades 1032, and a shaft coupler 1033.

The shaft coupler 1033 includes an anti-deformation unit 1036.

In comparison with the seventh embodiment, in the present embodiment, the anti-deformation unit 1036 may be provided to be formed along an entire inner circumferential surface of the shaft coupler 1033.

The anti-deformation unit 1036 may be provided for the shaft coupler 1033 so as to be disposed from one end to the other end of the shaft coupler 1033 into which the rotor shaft 1072b is fitted.

The anti-deformation unit 1036 may include an anti-deformation face 1036a corresponding to an outer circumferential surface of the rotor shaft 1072b. The anti-deformation face 1036a is provided to allow the rotor shaft 1072b to be press-fitted into the shaft coupler 1033.

The rotor shaft 1072b may be coupled to the anti-deformation face 1036a of the anti-deformation unit 1036 by the press-fitting. Thereby, the rotor shaft 1072b may be coupled with the shaft coupler 1033.

A shaft inserting hole 1033a that is not described has the same description as that of the aforementioned embodiment.

A motor assembly according to a ninth embodiment and a vacuum cleaner having the same are described.

The present embodiment may be different from the eighth embodiment with regard to a coupling structure of an impeller 1130 and a rotor shaft 1172b. A repeated description of the same components as in the aforementioned embodiment will be omitted.

Figure 39:
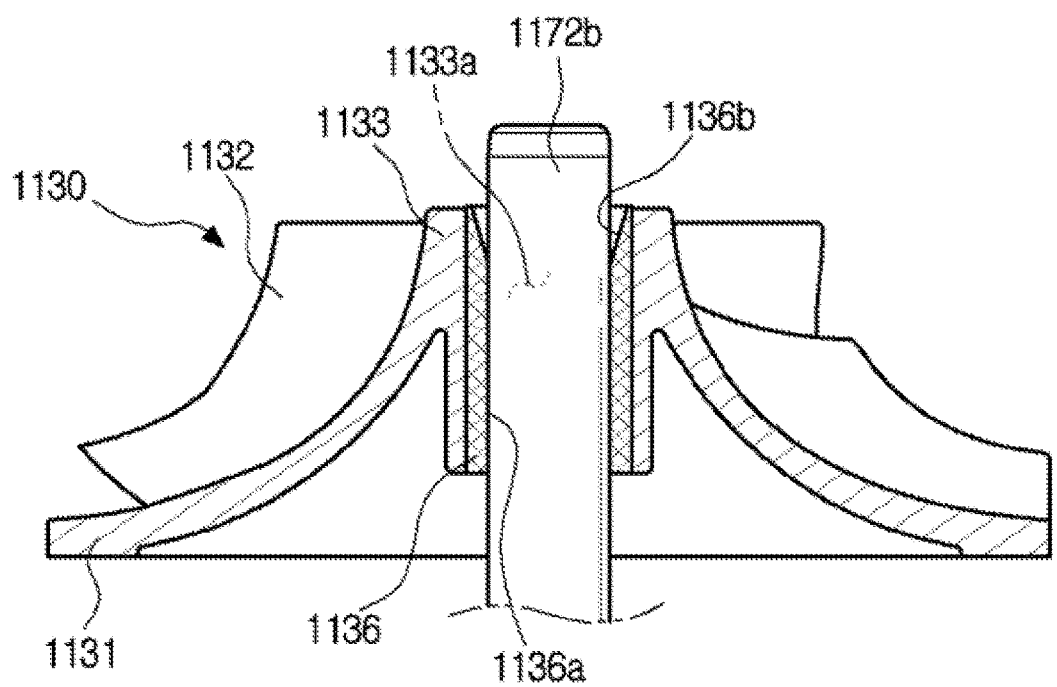
FIG. 39 is a cross-sectional view illustrating coupling of a rotor shaft and an impeller according to an embodiment of the present invention.

FIG. 39 is a cross-sectional view illustrating coupling of a rotor shaft and an impeller according to a ninth embodiment of the present invention.

The impeller 1130 includes an impeller body 1131, a plurality of blades 1132, and a shaft coupler 1133.

The shaft coupler 1133 includes an anti-deformation unit 1136.

The anti-deformation unit 1136 includes an anti-deformation face 1136a and an anti-deformation slope 1136b.

The anti-deformation face 1136a may be provided to correspond to an outer circumferential surface of the rotor shaft 1072b. The anti-deformation face 1136a may be provided to allow the rotor shaft 1172b to be press-fitted into the shaft coupler 1133.

The anti-deformation slope 1136b may be provided to extend from the anti-deformation face 1136a and be formed to be inclined. The anti-deformation slope 1136b may be provided to be inclined in a direction away from the rotor shaft 1172b.

In other words, the anti-deformation slope 1136b may be formed on at least part of an inner circumferential surface of the anti-deformation unit 1136, and may be inclined in an inserting direction of the rotor shaft 1172b such that an inner diameter thereof may be gradually increased on the inner circumferential surface of the anti-deformation unit 1136. The outer circumferential surface of the rotor shaft 1172b and the anti-deformation slope 1136b may be adhered by an adhesive.

With this configuration, the rotor shaft 1172b may be coupled to the anti-deformation face 1136a by the press-fitting and to the anti-deformation slope 1136b by the adhesive. Thereby, the rotor shaft 1172b may be coupled with the shaft coupler 1133.

A shaft inserting hole 1133a that is not described has the same description as that of the aforementioned embodiment.

Hereinafter, a motor assembly according to a tenth embodiment and a vacuum cleaner having the same will be described.

The present embodiment may be different from the first embodiment with regard to a coupling structure of an impeller 1230 and a rotor shaft 1272b. A repeated description of the same components as in the aforementioned embodiment will be omitted.

Figure 40:
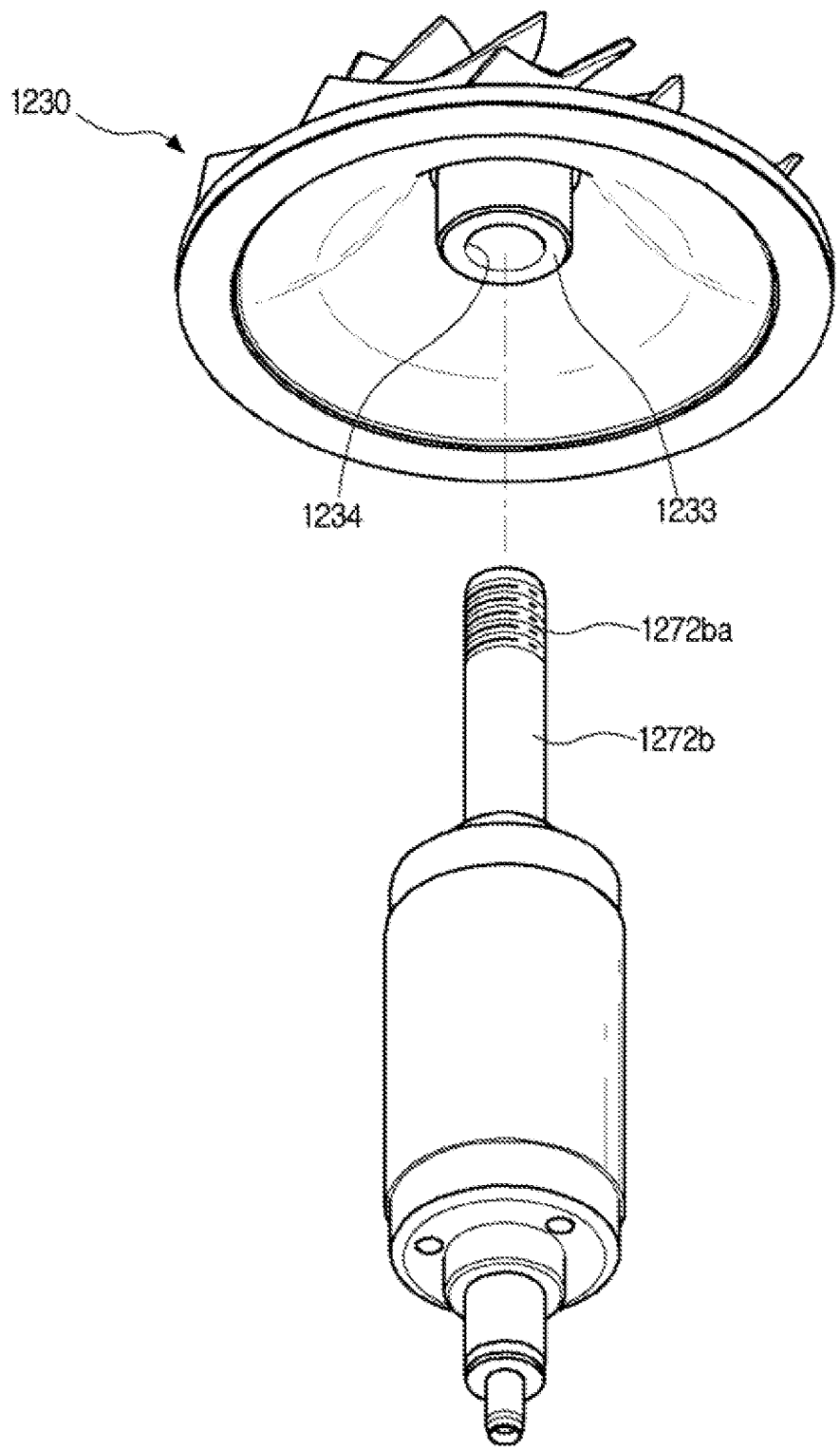
FIG. 40 is a cross-sectional view illustrating coupling of a rotor shaft and an impeller according to an embodiment of the present invention.

FIG. 40 is a view illustrating coupling of a rotor shaft and an impeller according to a tenth embodiment of the present invention.

The rotor shaft 1272b may include an anti-slip portion 1272ba formed along an outer circumferential surface thereof by knurling so as to correspond to a shaft coupling face 1234 of a shaft coupler 1233.

As the rotor shaft 1272b may be press-fitted into the shaft coupler 1233, the anti-slip portion 1272ba may be coupled to correspond to the shaft coupling face 1234.

A shaft inserting hole 1233a that is not described has the same description as that of the aforementioned embodiment.

A motor assembly according to an eleventh embodiment and a vacuum cleaner having the same is described.

The present embodiment may be different from the first embodiment with regard to a coupling structure of an impeller 1330 and a rotor shaft 1372b. A repeated description of the same components as in the aforementioned embodiment will be omitted.

Figure 41A:
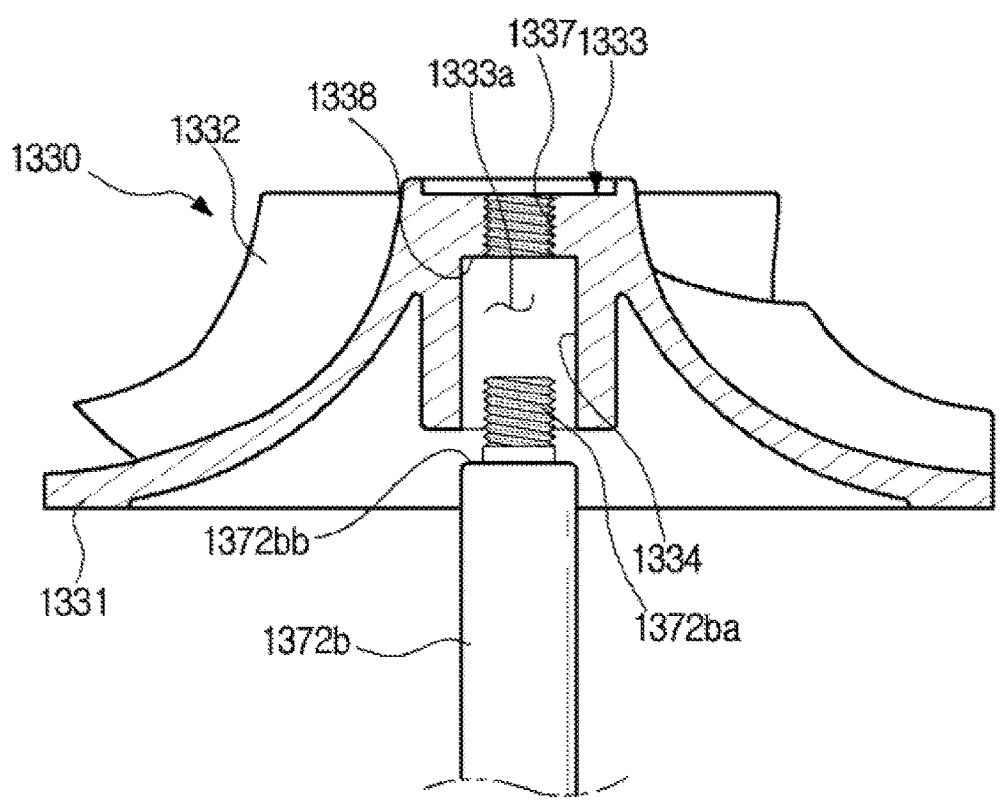
FIGS. 41A and 41B are cross-sectional views illustrating coupling of a rotor shaft and an impeller according to an embodiment of the present invention.
Figure 41B:
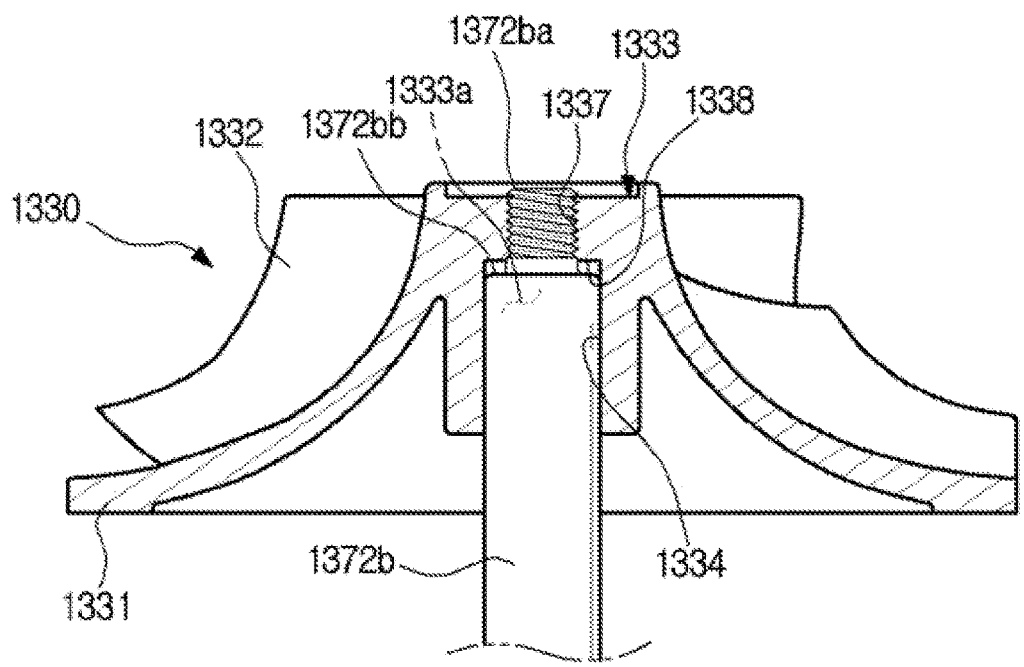

FIGS. 41A and 41B are cross-sectional views illustrating coupling of a rotor shaft and an impeller according to an eleventh embodiment of the present invention.

The rotor shaft 1372b may include a screw projection 1372ba.

The screw projection 1372ba may be provided with threads formed along an outer circumferential surface of the rotor shaft 1372b. The screw projection 1372ba may be provided at one end of the rotor shaft 1372b in a direction in which the rotor shaft 1372b may be inserted into the impeller 1330. The screw projection 1372ba may be provided to correspond to a screw hole 1337 to be described below, and may be formed to be screwed onto the screw hole 1337.

The screw projection 1372ba may be formed to have a height difference with respect to the outer circumferential surface of the rotor shaft 1372b so as to have a smaller outer diameter than the outer circumferential surface of the rotor shaft 1372b.

A shaft inserting hole 1333a that is not described has the same description as that of the aforementioned embodiment.

The impeller 1330 may include an impeller body 1331, a plurality of blades 1332, and a shaft coupler 1333.

The shaft coupler 1333 includes a shaft coupling face 1334 in addition to the screw hole.

The screw hole 1337 may be provided to correspond to the screw projection 1372ba, and may be formed with female threads with which the threads of the screw projection 1372ba are coupled. The screw hole 1337 may be formed to have a height difference with respect to an inner circumferential surface of the shaft coupler 1333 so as to have a smaller inner diameter than the inner circumferential surface of the shaft coupler 1333.

The rotor shaft 1372b may include a shaft stepped face 1372bb that may be a stepped face adjacent to the screw projection 1372ba, and the impeller 1330 may include an impeller stepped face 1338 that is a stepped face adjacent to the screw hole 1337. As the rotor shaft 1372b may be coupled to the impeller 1330, the shaft stepped face 1372bb and the impeller stepped face 1338 may be formed to face each other. The shaft stepped face 1372bb and the impeller stepped face 1338 of the impeller 1330 may be adhered by an adhesive, so that the rotor shaft 1372b and the impeller 1330 can be coupled in a direction of the rotor shaft 1372b.

With this configuration, the rotor shaft 1372b may be coupled to the shaft coupling face 1334 by press-fitting, and the screw projection 1372ba may be screwed onto the screw hole 1337. Thereby, the rotor shaft 1372b may be coupled with the shaft coupler 1333. Further, the shaft stepped face 1372bb and the impeller stepped face 1338 are adhered by the adhesive. Thereby, it is possible to make the coupling firmer.

A motor assembly according to a twelfth embodiment and a vacuum cleaner having the same is described.

The present embodiment is different from the eleventh embodiment with regard to a coupling structure of an impeller 1430 and a rotor shaft 1472b. A repeated description of the same components as in the aforementioned embodiment will be omitted.

Figure 42:
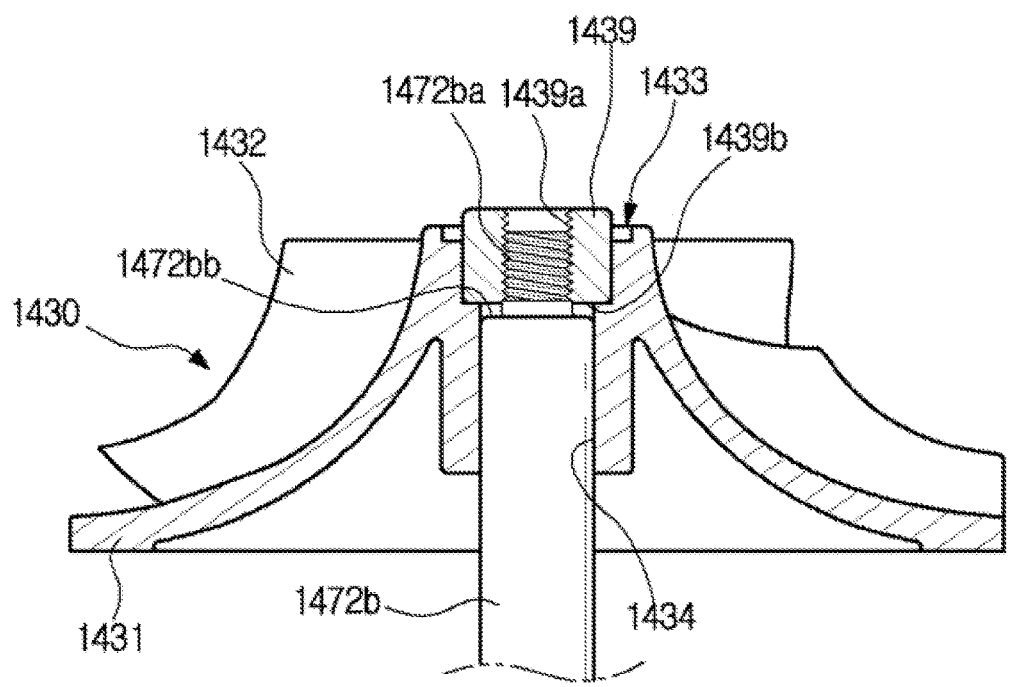
FIG. 42 is a cross-sectional view illustrating coupling of a rotor shaft and an impeller according to an embodiment of the present invention.

FIG. 42 is a cross-sectional view illustrating coupling of a rotor shaft and an impeller according to a twelfth embodiment of the present invention.

The rotor shaft 1472b may include a screw projection 1472ba.

The impeller 1430 may include an impeller body 1431, a plurality of blades 1432, and a shaft coupler 1433.

The shaft coupler 1433 includes a shaft coupling face 1434 and a nut unit 1439.

The nut unit 1439 may be provided to correspond to the screw projection 1472ba, and may be formed with a screw hole to which threads of the screw projection 1472ba are fastened. The nut unit 1439 may be formed to have a height difference with respect to an inner circumferential surface of the shaft coupler 1433 so as to have a smaller inner diameter than the inner circumferential surface of the shaft coupler 1433.

The nut unit 1439 includes a nut joint 1439a that has a shape of the screw hole so as to allow the screw projection 1472ba to be coupled thereto and may be formed on an inner circumferential surface thereof. The nut joint 1439a may be provided to have a height difference with respect to an inner circumferential surface of the shaft coupler 1433 so as to have a smaller inner diameter than the inner circumferential surface of the shaft coupler 1433.

The nut unit 1439 may be formed in the front of the impeller 1430 along with the impeller 1430 by insert injection molding, and be disposed to be simply screwed onto the rotor shaft 1472b.

A rear surface 1439b of the nut unit 1439 and a shaft stepped face 1472bb of the rotor shaft 1472b may be formed to face each other. The rear surface 1439b of the nut unit 1439 and the shaft stepped face 1472bb may be adhered by an adhesive, so that the rotor shaft 1472b and the impeller 1430 can be coupled in a direction of the rotor shaft 1472a.

With this configuration, the rotor shaft 1472b may be coupled to the shaft coupling face 1434 by press-fitting, and the screw projection 1472ba may be screwed onto the nut joint 1439a of the nut unit 1439. The rotor shaft 1472b may be coupled with the shaft coupler 1433. The shaft stepped face 1472bb and the rear surface 1439b of the nut unit 1439 are adhered by the adhesive. Thereby, it may be possible to make the coupling firmer.

A motor assembly according to a thirteenth embodiment and a vacuum cleaner having the same is described.

The present embodiment may be different from the first embodiment with regard to a coupling structure of an impeller 1530 and a rotor shaft 1572b. A repeated description of the same components as in the aforementioned embodiment will be omitted.

Figure 43A:
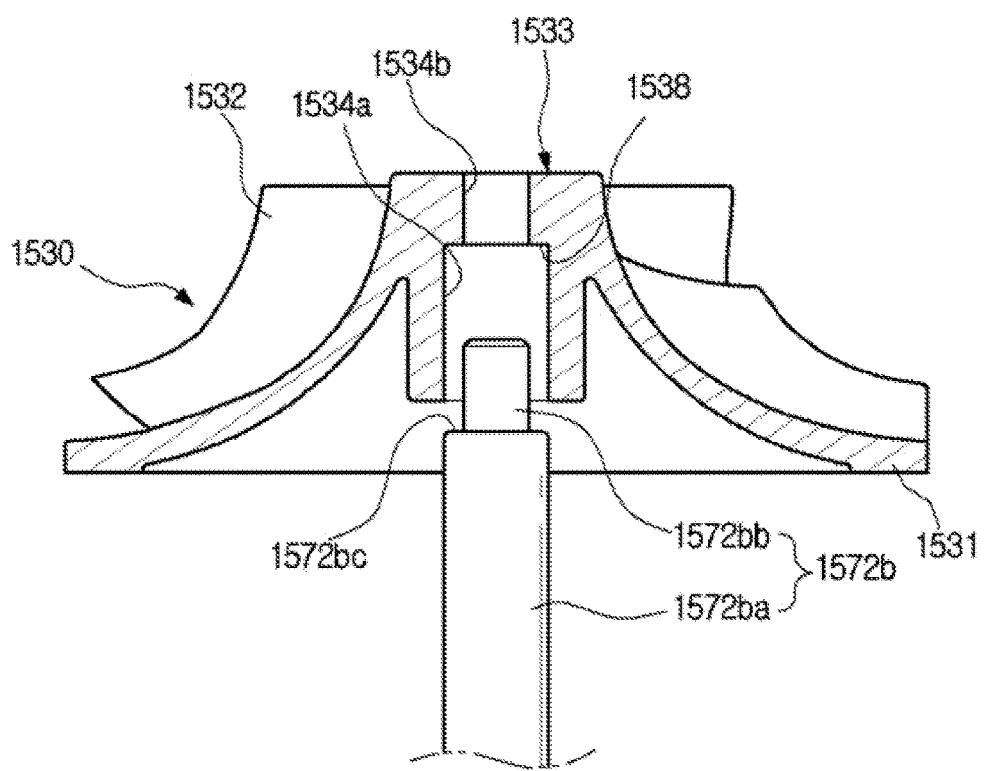
FIGS. 43A and 43B are cross-sectional views illustrating coupling of a rotor shaft and an impeller according to an embodiment of the present invention.
Figure 43B:
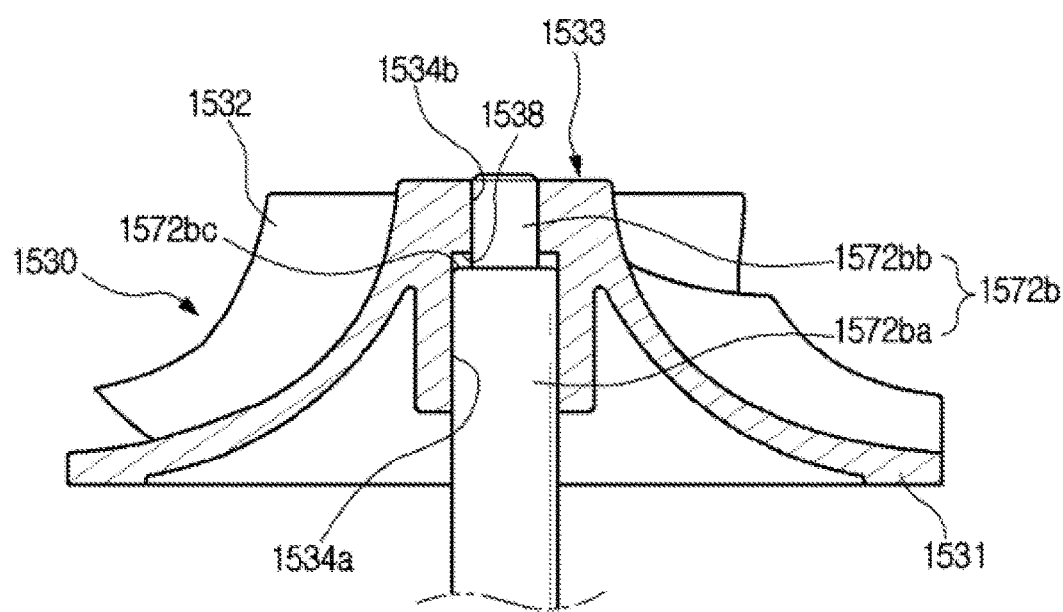

FIGS. 43A and 43B are cross-sectional views illustrating coupling of a rotor shaft and an impeller according to a thirteenth embodiment of the present invention.

The rotor shaft 1572b includes a first shaft 1572ba and a second shaft 1572bb formed to extend in the same lengthwise direction as the first shaft 1572ba.

The second shaft 1572*bb* may be formed to have a smaller diameter than the first shaft 1572*ba*. The second shaft 1572*bb* may be formed to have a height difference with respect to the first shaft 1572*ba*. In the present embodiment, the second shaft 1572*bb* may be formed to extend from an end of the first shaft 1572*ba*.

The impeller 1530 includes an impeller body 1531, a plurality of blades 1532, and a shaft coupler 1533.

The shaft coupler 1533 includes a first shaft coupling face 1534*a* and a second shaft coupling face 1534*b*.

The first shaft 1572*ba* may be seated on and coupled to the first shaft coupling face 1534*a*. The second shaft 1572*bb* may be seated on and coupled to the second shaft coupling face 1534*b*. Since the second shaft 1572*bb* having the smaller diameter than the first shaft 1572*ba* may be seated on the second shaft coupling face 1534*b*, the second shaft coupling face 1534*b* may be formed to have a smaller inner diameter than the first shaft coupling face 1534*a*.

The rotor shaft 1572*b* may include a shaft stepped face 1572*bc* that is a stepped face formed between the first shaft 1572*ba* and the second shaft 1572*bb*. The impeller 1530 may include an impeller stepped face 1538 that is a stepped face formed between the first shaft coupling face 1534*a* and the second shaft coupling face 1534*b*.

When the rotor shaft 1572*b* is press-fitted into the shaft coupler 1533, the shaft stepped face 1572*bc* and the impeller stepped face 1538 may be formed to face each other, and be adhered to each other by an adhesive, so that the rotor shaft 1572*b* and the impeller 1530 can be coupled in a direction of the rotor shaft 1572*a*.

With this configuration, the first shaft 1572*ba* and the second shaft 1572*bb* are press-fitted into the first shaft coupling face 1534*a* and the second shaft coupling face 1534*b*, and thereby the rotor shaft 1572*b* may be coupled to the shaft coupler 1533. Further, the shaft stepped face 1572*bc* and the impeller stepped face 1538 are adhered by the adhesive. Thereby, it is possible to make the coupling firmer.

Hereinafter, a motor assembly according to a fourteenth embodiment and a vacuum cleaner having the same will be described.

The present embodiment may be different from the thirteenth embodiment with regard to a coupling structure of an impeller 1630 and a rotor shaft 1672*b*. A repeated description of the same components as in the aforementioned embodiment will be omitted.

Figure 44A:
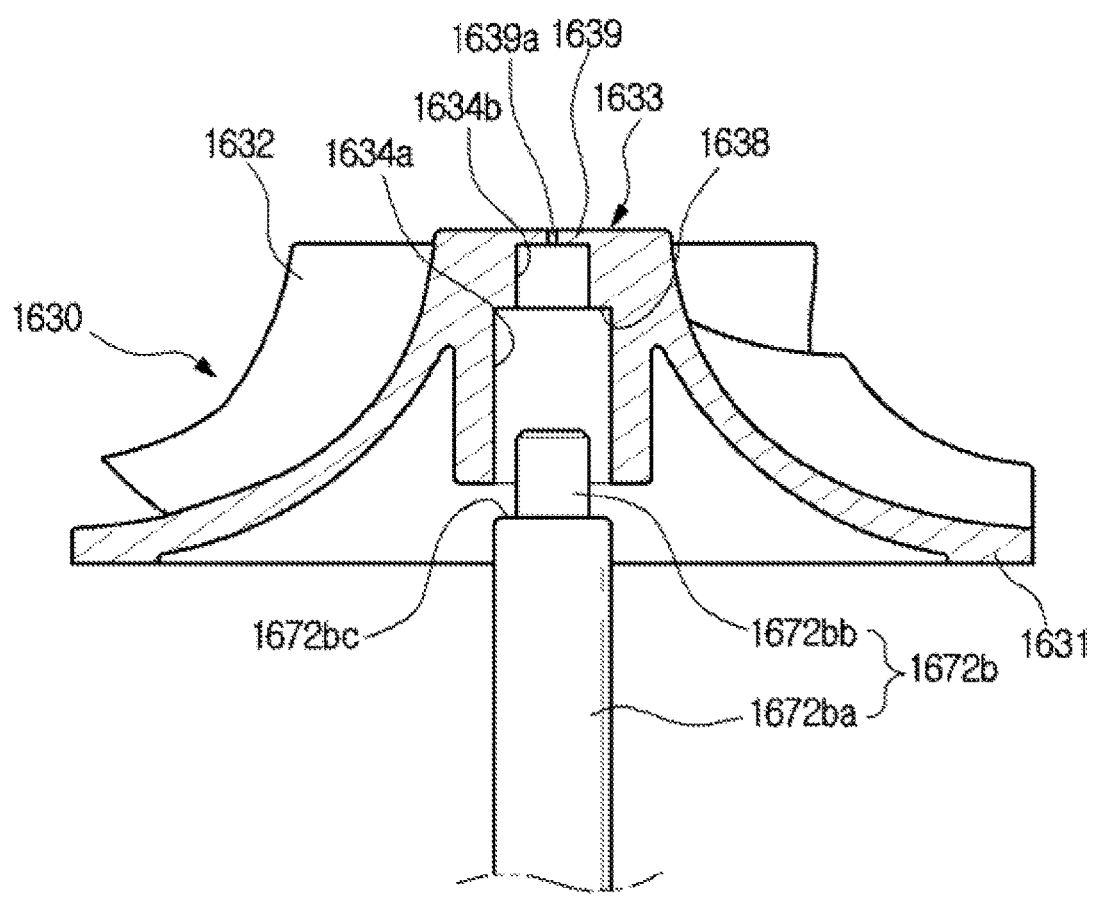
FIGS. 44A and 44B are cross-sectional views illustrating coupling of a rotor shaft and an impeller according to an embodiment of the present invention.
Figure 44B:
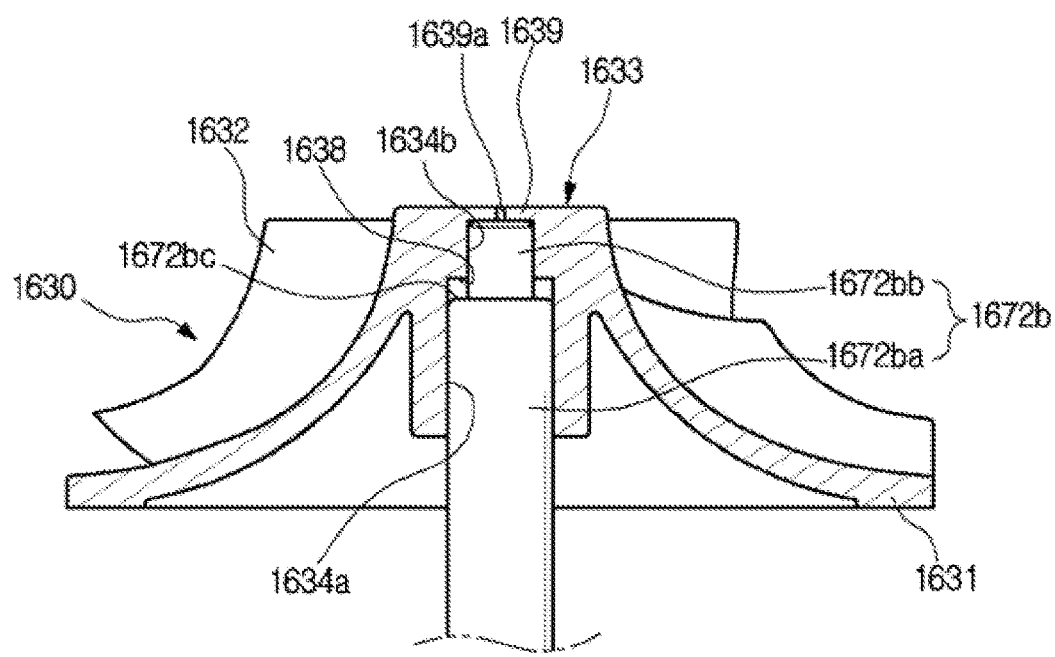

FIGS. 44A and 44B are cross-sectional views illustrating coupling of a rotor shaft and an impeller according to a fourteenth embodiment of the present invention.

The rotor shaft 1672*b* includes a first shaft 1672*ba* and a second shaft 1672*bb*. A shaft stepped face 1672*bc* may be formed between the first shaft 1672*ba* and the second shaft 1672*bb*.

The impeller 1630 includes an impeller body 1631, a plurality of blades 1632, and a shaft coupler 1633.

The shaft coupler 1633 includes a first shaft coupling face 1634*a* and a second shaft coupling face 1634*b*. An impeller stepped face 1638 may be formed between the first shaft coupling face 1634*a* and the second shaft coupling face 1634*b*.

The shaft coupler 1633 may include a shaft cover 1639 provided at an end of the second shaft coupling face 1634*b*. The shaft cover 1639 may be provided to block an end of the rotor shaft 1672*b* such that an adhesive injected between the rotor shaft 1672*b* and the shaft coupler 1633 can be collected.

The shaft cover 1639 may include a discharge hole 1639*a*. The discharge hole 1639*a* may be provided such that an internal space formed by coupling of the rotor shaft 1672*b* and the impeller 1630 communicates with an external space of the impeller 1630.

The discharge hole 1639*a* may be provided to allow internal air to be discharged when the rotor shaft 1672*b* may be press-fitted into the shaft coupler 1633. As the internal air may be discharged, the shaft coupler 1633 and the rotor shaft 1672*b* can be brought into close contact. Further, when the adhesive may be injected between the shaft coupler 1633 and the rotor shaft 1672*b*, the internal air can be extracted, and adhesion efficiency of the adhesive can be improved. A shape and arrangement of the discharge hole 1639*a* are not restricted. However, in the present embodiment, the discharge hole 1639*a* may be provided to be disposed in the center of the shaft cover 1639.

A motor assembly according to a fifteenth embodiment and a vacuum cleaner having the same is described.

The present embodiment may be different from the thirteenth embodiment with regard to a coupling structure of an impeller 1730 and a rotor shaft 1772*b*. A repeated description of the same components as in the aforementioned embodiment will be omitted.

Figure 45:
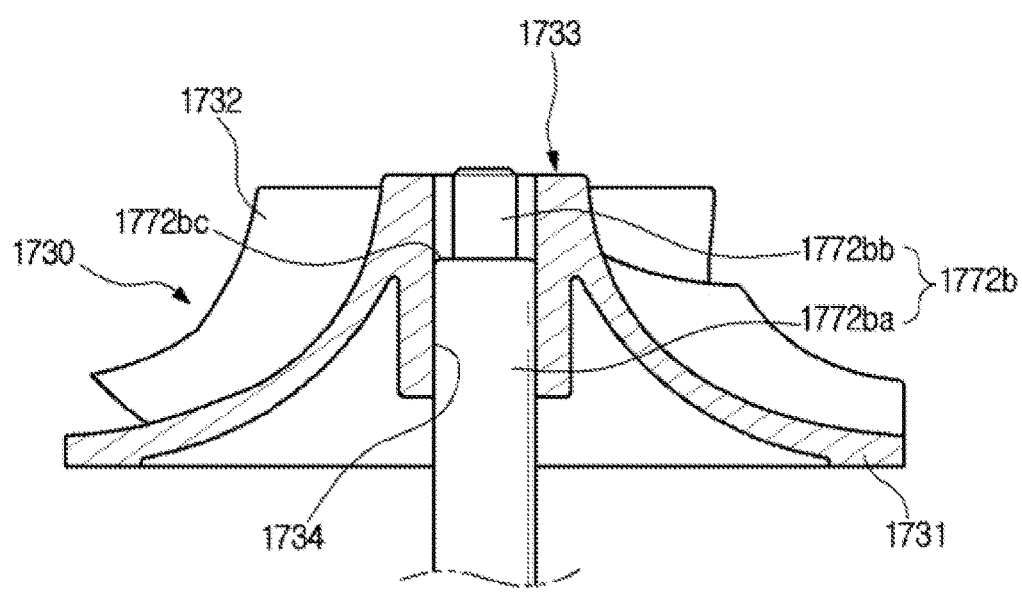
FIG. 45 is a cross-sectional view illustrating coupling of a rotor shaft and an impeller according to an embodiment of the present invention.

FIG. 45 is a cross-sectional view illustrating coupling of a rotor shaft and an impeller according to a fifteenth embodiment of the present invention.

The rotor shaft 1772*b* includes a first shaft 1772*ba* and a second shaft 1772*bb* formed to extend in the same lengthwise direction as the first shaft 1772*ba*.

The second shaft 1772*bb* may be formed to have a smaller diameter than the first shaft 1772*ba*. The second shaft 1772*bb* may be formed to have a height difference with respect to the first shaft 1772*ba*. In the present embodiment, the second shaft 1772*bb* may be formed to extend from an end of the first shaft 1772*ba*.

The rotor shaft 1772*b* may include a shaft stepped face 1772*bc* that is a stepped face formed between the first shaft 1772*ba* and the second shaft 1772*bb*.

The impeller 1730 includes an impeller body 1731, a shaft coupler 1733, and a plurality of blades 1732.

The shaft coupler 1733 may include a shaft coupling face 1734 corresponding to an outer circumferential surface of the rotor shaft 1772*b*. The shaft coupling face 1734 may be provided to allow the rotor shaft 1772*b* to be press-fitted into the shaft coupler 1733. The first shaft 1772*ba* of the rotor shaft 1772*b* may be press-fitted into the shaft coupler 1733.

The second shaft 1772*bb* and the shaft coupling face 1734 may be adhered by an adhesive.

With this configuration, the first shaft 1772*ba* may be coupled to the shaft coupling face 1734 by the press-fitting, and the second shaft 1772*bb* and the shaft coupling face 1734 are adhered by adhesive. Thereby, the rotor shaft 1772*b* can be coupled with the shaft coupler 1733.

Hereinafter, a motor assembly according to a sixteenth embodiment and a vacuum cleaner having the same will be described.

The present embodiment may be different from the fourteenth embodiment with regard to a coupling structure of an impeller 1830 and a rotor shaft 1872*b*. A repeated description of the same components as in the aforementioned embodiment will be omitted.

Figure 46:
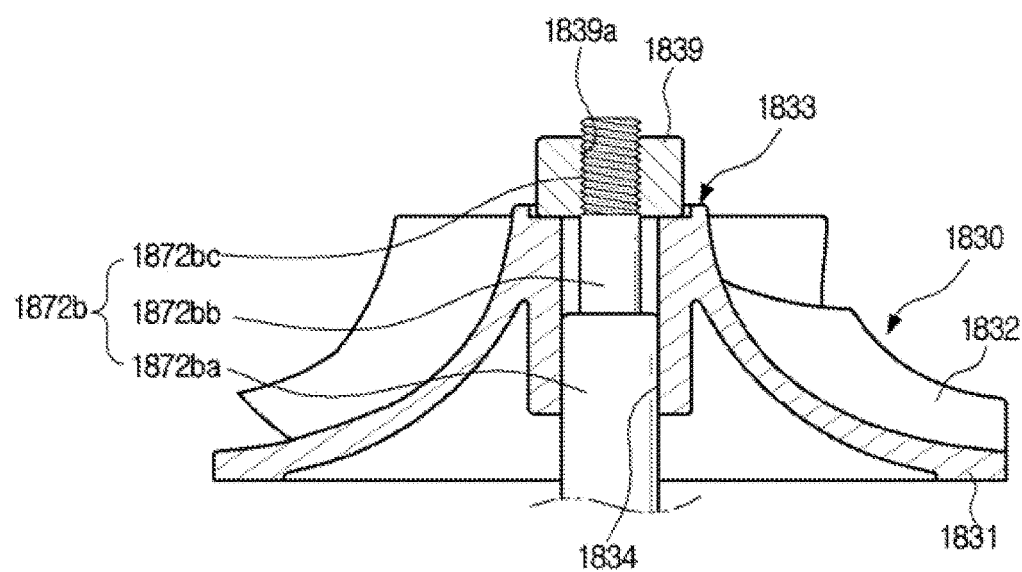
FIG. 46 is a cross-sectional view illustrating coupling of a rotor shaft and an impeller according to an embodiment of the present invention.

FIG. 46 is a cross-sectional view illustrating coupling of a rotor shaft and an impeller according to a sixteenth embodiment of the present invention.

The rotor shaft 1872*b* includes a first shaft 1872*ba*, a second shaft 1872*bb* formed to extend in the same lengthwise direction as the first shaft 1872ba, and a third shaft 1872bc formed to extend in the same lengthwise direction as the second shaft 1872bb.

The third shaft 1872bc has threads formed on an outer circumferential surface thereof such that a nut unit 1839 to be coupled.

The impeller 1830 includes an impeller body 1831, a shaft coupler 1833, and a plurality of blades 1832.

The shaft coupler 1833 includes a shaft coupling face 1834 and a nut unit 1839.

The shaft coupling face 1834 may be provided to allow the rotor shaft 1872b to be press-fitted into the shaft coupler 1833. The first shaft 1872ba of the rotor shaft 1872b may be press-fitted into the shaft coupler 1833. The second shaft 1872bb and the shaft coupling face 1834 may be adhered by an adhesive.

The nut unit 1839 may be provided to correspond to the third shaft 1872bc, and may be provided with a screw hole such that the threads of the outer circumferential surface of the third shaft 1872bc are fastened. The nut unit 1839 includes a nut joint 1839a that has a shape of the screw hole so as to allow the third shaft to be coupled thereto and may be formed on an inner circumferential surface thereof. The nut joint 1839a may be provided to have a height difference with respect to an inner circumferential surface of the shaft coupler 1833 so as to have a smaller inner diameter than the inner circumferential surface of the shaft coupler 1833.

The nut unit 1839 may be formed in the front of the impeller 1830 along with the impeller 1830 by insert injection molding, and be disposed to be simply screwed onto the rotor shaft 1872b.

With this configuration, the first shaft 1872ba may be coupled to the shaft coupling face 1834 by press-fitting, and the second shaft 1872bb and the shaft coupling face 1834 are adhered by the adhesive. Further, the third shaft 1872bc may be screwed onto the nut unit 1839. Thereby, the rotor shaft 1872b can be coupled with the shaft coupler 1833.

Hereinafter, a motor assembly according to a seventeenth embodiment and a vacuum cleaner having the same will be described.

The present embodiment may be different from the fifteenth embodiment with regard to a coupling structure of an impeller 1930 and a rotor shaft 1972b. A repeated description of the same components as in the aforementioned embodiment will be omitted.

Figure 47A:
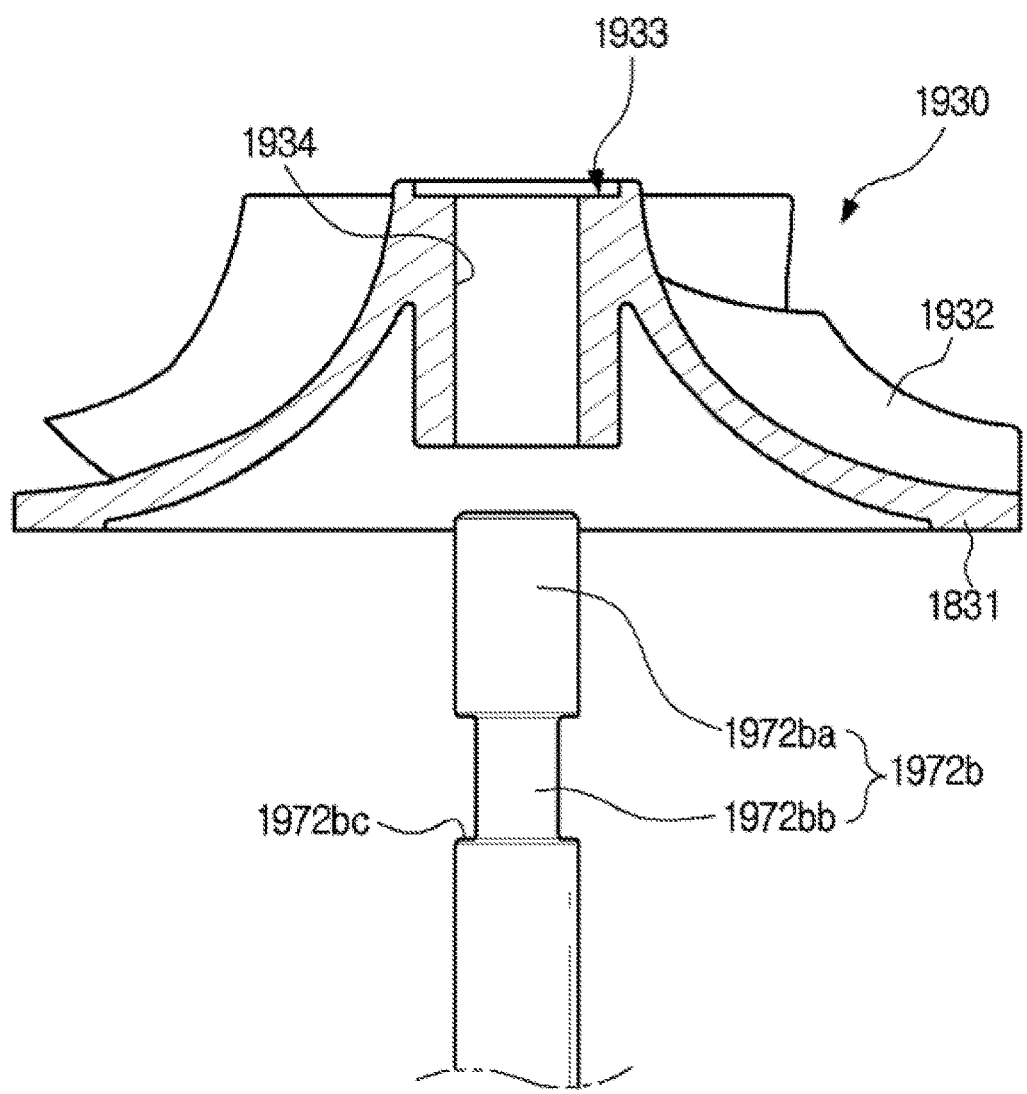
FIGS. 47A and 47B are cross-sectional views illustrating coupling of a rotor shaft and an impeller according to an embodiment of the present invention.
Figure 47B:
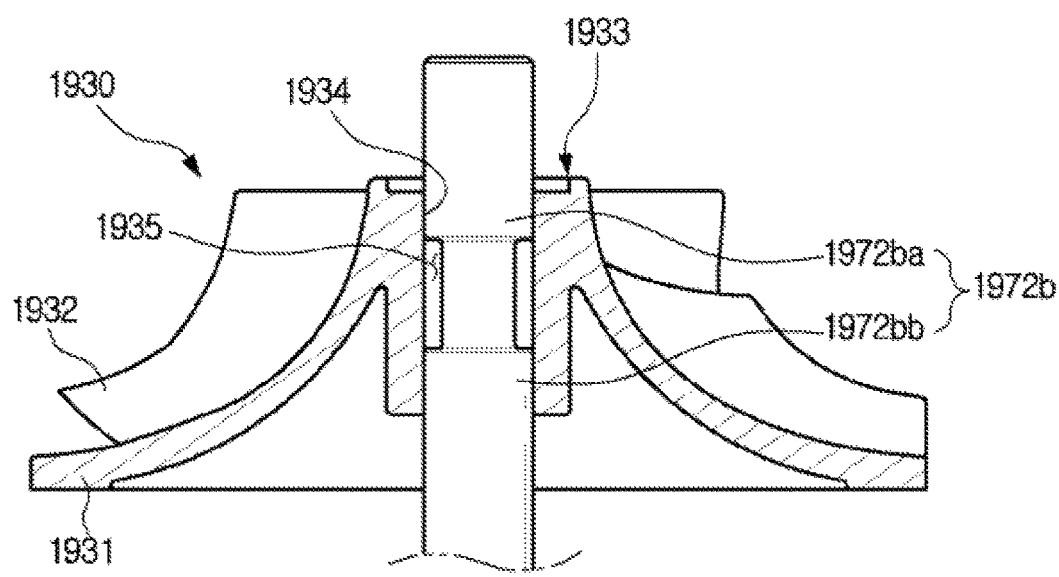

FIGS. 47A and 47B are cross-sectional views illustrating coupling of a rotor shaft and an impeller according to a seventeenth embodiment of the present invention.

The rotor shaft 1972b includes a first shaft 1972ba and a second shaft 1972bb formed to extend in the same lengthwise direction as the first shaft 1972ba. The second shaft 1972bb may be formed to have a smaller diameter than the first shaft 1972ba. The second shaft 1972bb may be formed to have a height difference with respect to the first shaft 1972ba. In the present embodiment, the second shaft 1972bb may be formed to extend from an end of the first shaft 1772ba. The rotor shaft 1972b may include a shaft stepped face 1972bc that is a stepped face formed between the first shaft 1972ba and the second shaft 1972bb.

Unlike the rotor shaft 1772b of the fifteenth embodiment, the second shaft 1972bb may be disposed on the first shaft 1972ba. In other words, the first shaft 1972ba may be provided to be disposed on both ends of the second shaft 1972bb.

The impeller 1930 includes an impeller body 1931, a shaft coupler 1933, and a plurality of blades 1932.

The shaft coupler 1933 may include a shaft coupling face 1934 corresponding to an outer circumferential surface of the rotor shaft 1972b. The shaft coupling face 1934 may be provided such that an inner diameter of the shaft coupler 1933 having the shaft coupling face 1934 corresponds to an outer diameter of the rotor shaft 1972b. The rotor shaft 1972b can be press-fitted into the shaft coupler 1933. The first shaft 1972ba of the rotor shaft 1972b may be press-fitted into the shaft coupler 1933.

The second shaft 1972bb and the shaft coupling face 1934 may be adhered by an adhesive. The adhesive injected between the second shaft 1972bb and the shaft coupling face 1934 may be disposed in a space sealed by the shaft stepped face 1972bc.

With this configuration, the first shaft 1972ba may be coupled to the shaft coupling face 1934 by the press-fitting, and the second shaft 1972bb and the shaft coupling face 1934 are adhered by the adhesive. Thereby, the rotor shaft 1972b can be coupled with the shaft coupler 1933.

Hereinafter, a motor assembly according to an eighteenth embodiment and a vacuum cleaner having the same will be described.

The present embodiment may be different from the first embodiment with regard to a coupling structure of an impeller 2030 and a rotor shaft 2072b. A repeated description of the same components as in the aforementioned embodiment will be omitted.

Figure 48A:
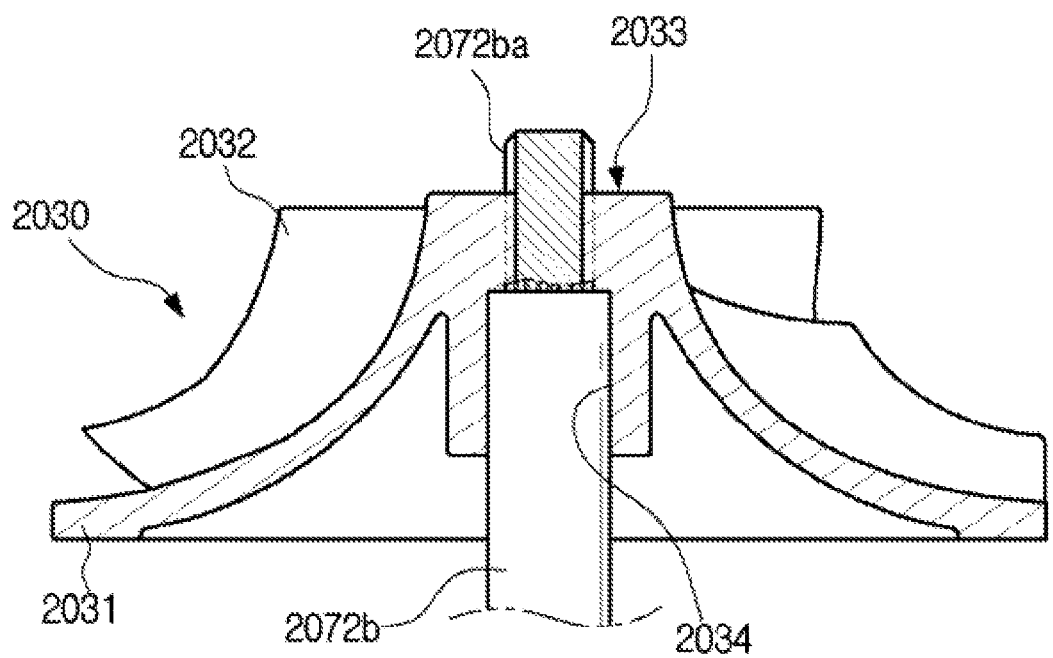
FIGS. 48A and 48B are cross-sectional views illustrating coupling of a rotor shaft and an impeller according to an embodiment of the present invention.
Figure 48B:
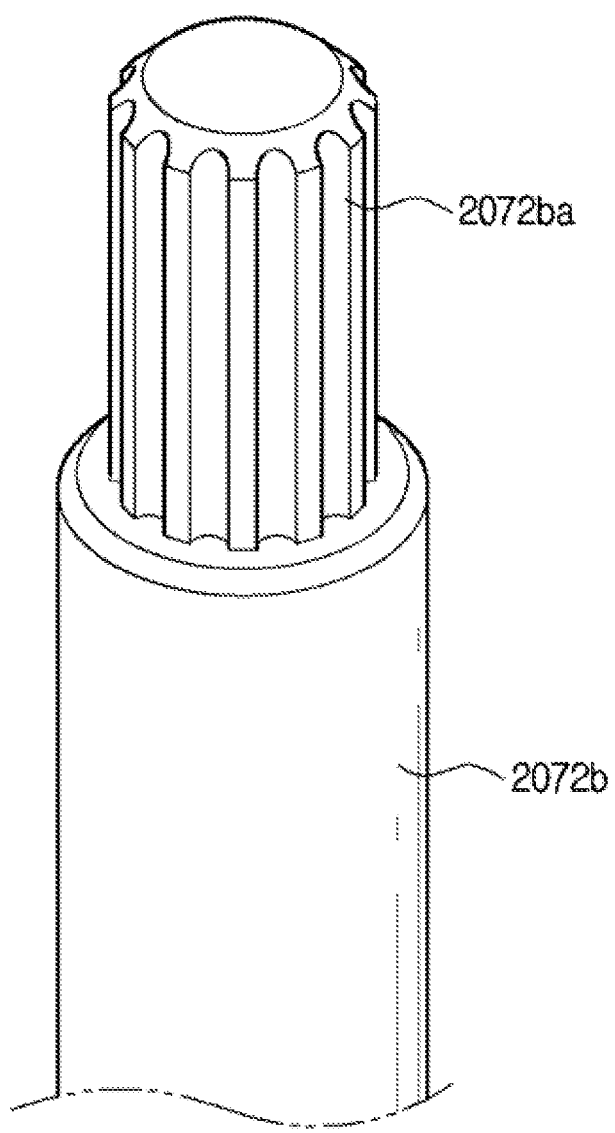

FIGS. 48A and 48B are cross-sectional views illustrating coupling of a rotor shaft and an impeller according to an eighteenth embodiment of the present invention.

The impeller 2030 and the rotor shaft 2072b may be integrally formed by injection molding. In detail, when the impeller 2030 may be formed by injection molding, the rotor shaft 2072b can be inserted such that the rotor shaft 2072b can be integrally formed.

The impeller 2030 may include an impeller body 2031, a shaft coupler 2033, and a plurality of blades 2032.

The rotor shaft 2072b may be provided to correspond to the shaft coupler 2033, and may include a plurality of anti-slip grooves 2072ba provided to prevent a slip of the impeller 2030.

The plurality of anti-slip grooves 2072ba are provided in an outer circumferential surface of the rotor shaft 2072b in radial and axial directions of the rotor shaft 2072a, and are equally spaced at regular intervals in a circumferential direction of the rotor shaft 2072b. Since the impeller 2030 and the rotor shaft 2072b are integrally formed by injection molding, the shaft coupler 2033 of the impeller 2030 may include a meshing face 2034 having a plurality of ridges on an inner circumferential surface thereof so as to correspond to shapes of the plurality of anti-slip grooves 2072ba.

A motor assembly according to a nineteenth embodiment and a vacuum cleaner having the same is described.

The present embodiment may be different from the eighteenth embodiment with regard to a coupling structure of an impeller 2030 and a rotor shaft 2072b. A repeated description of the same components as in the aforementioned embodiment will be omitted.

Figure 49A:
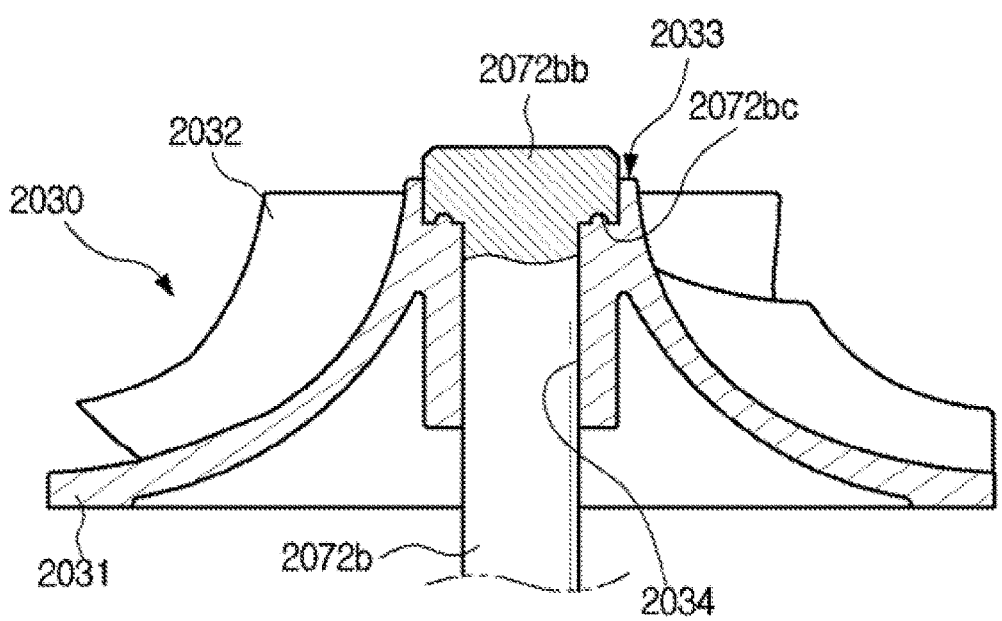
FIGS. 49A and 49B are cross-sectional views illustrating coupling of a rotor shaft and an impeller according to an embodiment of the present invention.
Figure 49B:
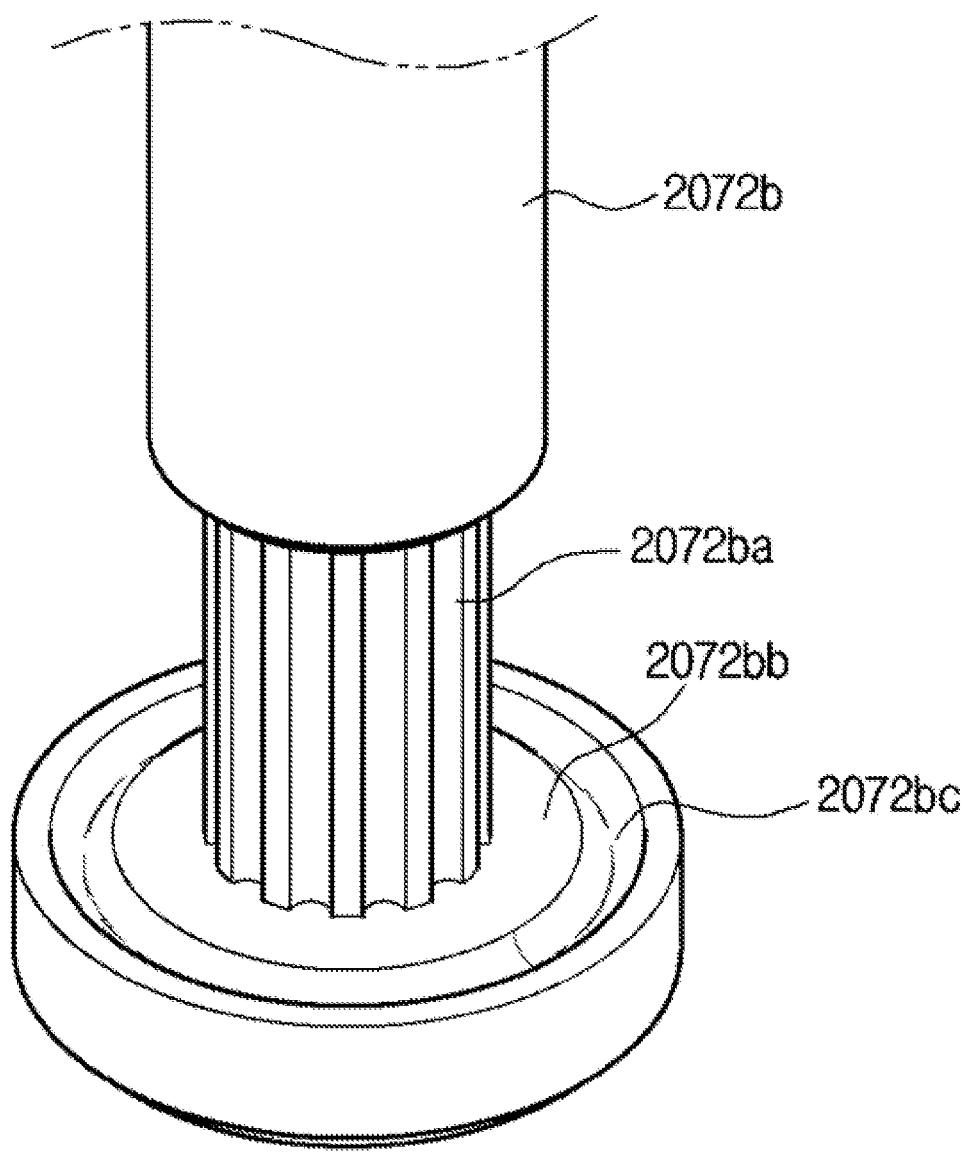

FIGS. 49A and 49B are cross-sectional views illustrating coupling of a rotor shaft and an impeller according to a nineteenth embodiment of the present invention.

The rotor shaft 2072b may include an anti-leakage flange 2072bb provided at an end thereof.

The anti-leakage flange 2072bb may be provided at the end of the rotor shaft 2072b so as to have a larger diameter than the rotor shaft 2072b. An adhesive may be applied to an outer circumferential surface of the rotor shaft 2072b for the purpose of firmer coupling when the impeller 2030 and the rotor shaft 2072*b* are formed by injection molding. In this process, the adhesive may leak outside. The anti-leakage flange 2072*bb* may be provided to prevent the adhesive from leaking from a front surface of the impeller 2030.

The anti-leakage flange 2072*bb* may be formed at the end of the rotor shaft 2072*b* so as to have a flange shape. When the anti-leakage flange 2072*bb* may be combined with a plurality of anti-slip grooves 2072*ba*, the anti-leakage flange 2072*bb* may be provided near the plurality of anti-slip grooves 2072*ba*.

The anti-leakage flange 2072*bb* may include an anti-leakage groove 2072*bc* that may be recessed in an inner surface thereof along a circumference of the rotor shaft 2072*b* such that the adhesive leaking outside may be collected. The anti-leakage groove 2072*bc* may be provided along the circumference of the rotor shaft 2072*b* so as to have an annular groove shape around the rotor shaft 2072*b*.

According to an exemplary embodiment, the anti-slip grooves 2072*ba* and the anti-leakage flange 2072*bb* are combined together, but only one of the two components may be applied.

A motor assembly according to a twentieth embodiment and a vacuum cleaner having the same is described.

A detailed description of the same components as in the first embodiment will be omitted.

Figure 50:
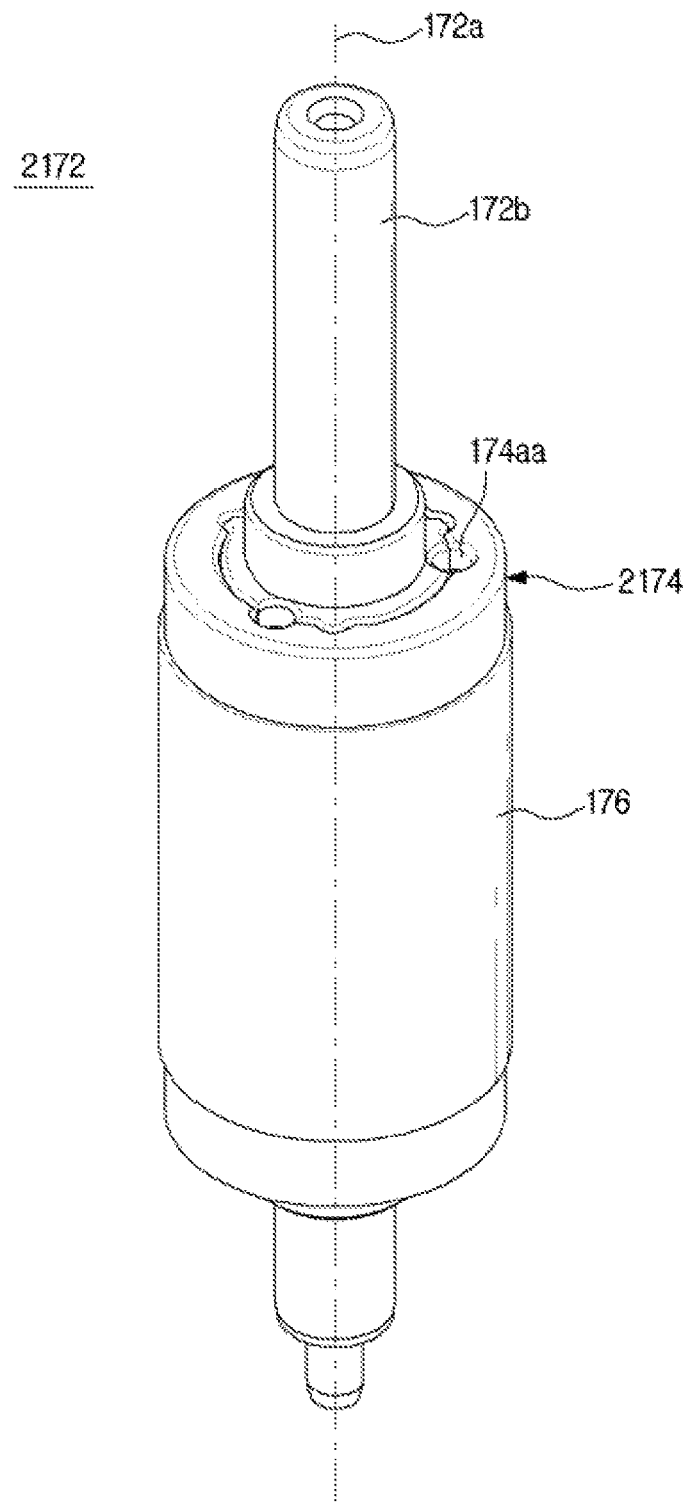
FIG. 50 is a perspective view of a rotor according to an embodiment of the present invention.
Figure 51A:
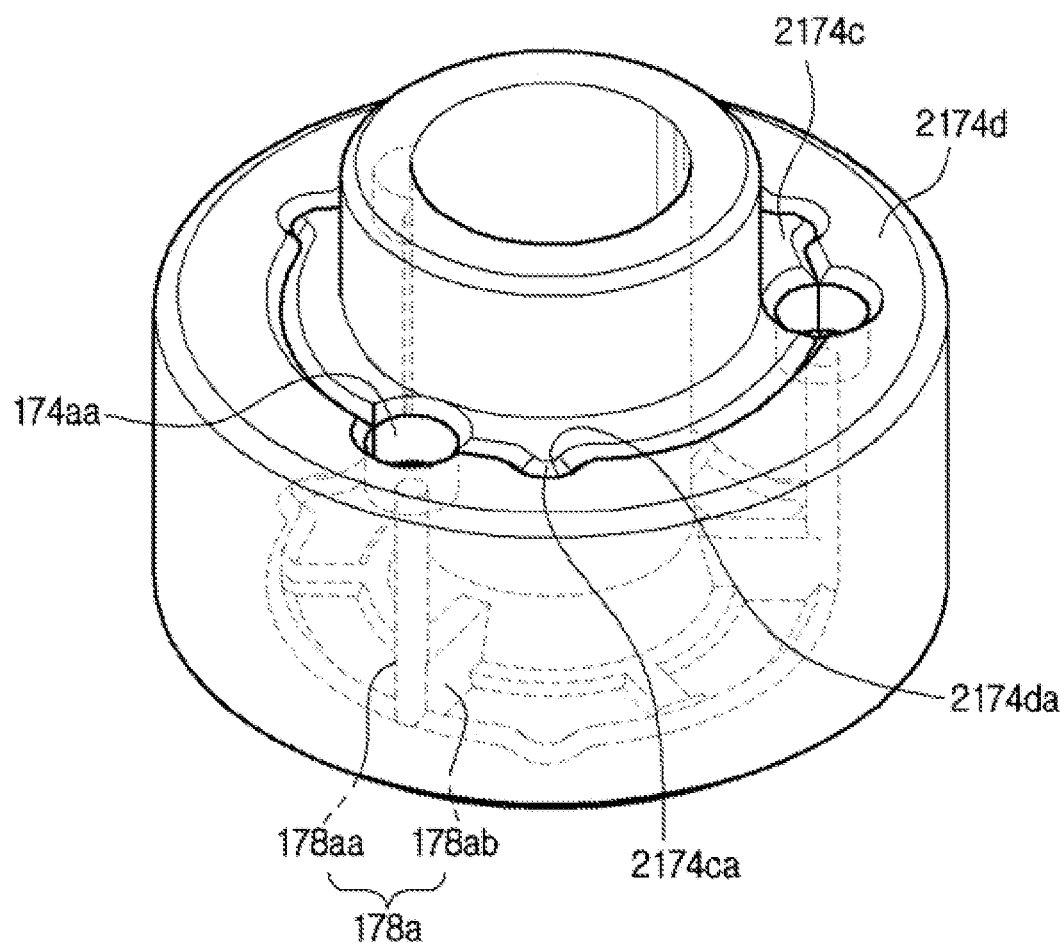
FIGS. 51A and 51B are perspective views illustrating an auxiliary member of the rotor according to an embodiment of the present invention.
Figure 51B:
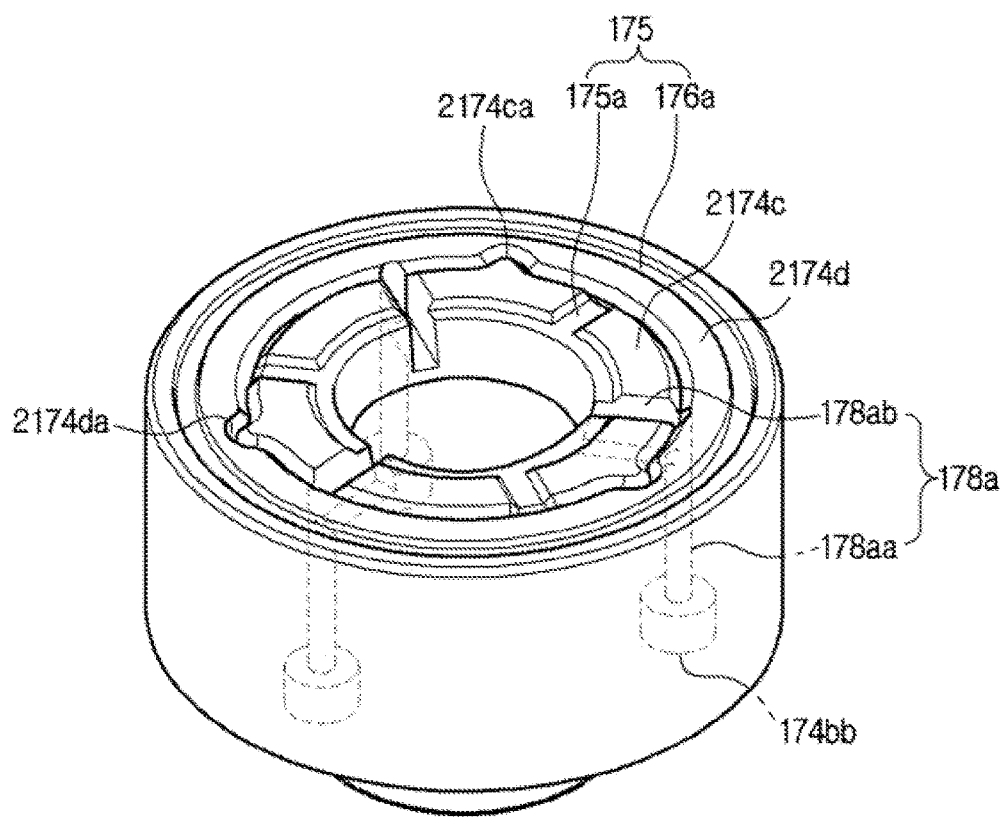

FIG. 50 is a perspective view of a rotor according to a twentieth embodiment of the present invention. FIGS. 51A and 51B are perspective views illustrating an auxiliary member of the rotor according to an embodiment of the present invention.

A rotor 2172 may include at least one support member 2174.

The support members 2174 are provided near a magnet 173. The support members 2174 may be disposed near the magnet 173 in a direction of a rotor axis 172*a*. The support members 2174 may be provided in a pair, and be disposed at one side and the other side of the magnet 173 in the direction of the rotor axis 172*a*. The support members 2174 may include balancers. That is, a pair of balancers may be provided at one side and the other side of the magnet 173 so as to compensate for eccentricity caused by rotation of the rotor 2172.

Each support member 2174 may include an internal support member 2174*c* and an external support member 2174*d*. The internal support member 2174*c* and the external support member 2174*d* may be separably provided. The internal support member 2174*c* and the external support member 2174*d* are provided to have the same center. The internal support member 2174*c* and the external support member 2174*d* are coupled, and thereby an inlet 174*aa*, an outlet 174*bb*, and an internal channel 177 can be formed.

Any one of the internal support member 2174*c* and the external support member 2174*d* may include at least one assembly projection 2174*ca* formed to protrude in a radially outward direction, and the other may include at least one assembly recess 2174*da* corresponding to the assembly projection 2174*ca*. According to an exemplary embodiment, the internal support member 2174*c* includes the assembly projection 2174*ca*, and the external support member 2174*d* includes the assembly recess 2174*da*. When the internal support member 2174*c* and the external support member 2174*d* are coupled, they can be firmly coupled in a circumferential direction.

The inlet 174*aa*, the outlet 174*bb*, and the internal channel 177 have the same description as those of the first embodiment, and thus the description thereof will be omitted.

The motor assembly of the present invention and the method for producing the same improve a structure of the rotor. Thereby, it is possible to improve durability of the rotor, and production efficiency of the rotor through a structure of the internal channel along which an adhesive can flow.

Although a few embodiments of the present invention have been shown and described, it would be appreciated by those skilled in the art that changes may be made in these embodiments without departing from the principles and spirit of the invention, the scope of which is defined in the claims and their equivalents.

Further, the embodiments are rather independent embodiments than embodiments in which the components can be compatible, and thus various changes thereof may be made.

What is claimed is:

1. A motor assembly comprising:
 a stator having a rotor receptacle; and
 a rotor disposed in the rotor receptacle, the rotor electromagnetically interactable with the stator, the rotor including
  a rotor shaft rotatable about a rotor axis,
  a magnet bonded to the rotor shaft and configured to form a magnetic field, the magnet including a magnet bonding channel formed therein and through which an adhesive is flowable to fill the magnet bonding channel so that the rotor shaft is bonded to the magnet by the adhesive,
  a first support member disposed on one end of the magnet in a direction of the rotor axis, the first support member including
   an inlet through which the adhesive is inputtable,
   an inflow channel formed therein and through which the input adhesive is flowable, the inflow channel formed parallel to the rotor axis and configured to communicate with the inlet,
   a first flow channel formed in a surface facing the magnet thereof and extending from the inflow channel toward the rotor axis, the first flow channel configured to communicate with the inflow channel and the magnet bonding channel so that the first support member is bonded to the magnet by the adhesive flowed from the first flow channel, and
  a second support member disposed at an other end of the magnet in the direction of the rotor axis, the second support member including
   a second adhesive channel formed therein and configured to communicate with the first adhesive channel via the magnet bonding channel such that the input adhesive is flowable between the second support member and the other end of the magnet, and
   an outlet through which the adhesive that flowed from the second adhesive channel is outputtable.

2. The motor assembly according to claim 1, wherein the magnet bonding channel is formed in a space between an outer circumferential surface of the rotor shaft and an inner circumferential surface of the magnet.

3. The motor assembly according to claim 1, wherein the first support member and the second support member are balancers and configured to reduce a vibration by compensating eccentricity caused by a rotation the rotor.

4. The motor assembly according to claim 1, wherein the first adhesive channel and the second adhesive channel having at least a portion formed perpendicular to the rotor axis, respectively.

5. The motor assembly according to claim 1, wherein:
the first adhesive channel and the second adhesive channel include a plurality of first adhesive channels and a plurality of second adhesive channels, respectively; and
the plurality of first adhesive channels and the plurality of second adhesive channels are formed around the rotor axis at intervals in a circumferential direction.

6. The motor assembly according to claim 1, wherein the magnet bonding channel is formed between the rotor shaft and the magnet in a range between the end of the magnet and the other end of the magnet at the rotor shaft.

7. The motor assembly according to claim 1, further including a magnet cover made of a carbon fiber and provided on an outer circumferential surface thereof in order to prevent the magnet from being separated when the rotor is rotated.

8. A motor assembly comprising:
a stator having a rotor receptacle; and
a rotor disposed in the rotor receptacle to electromagnetically interact with the stator,
wherein the rotor includes
a rotor shaft rotatable about a rotor axis,
a magnet bonded to the rotor shaft and configured to form a magnetic field, the magnet including a magnet bonding channel formed therein and through which an adhesive is flowable to fill the magnet bonding channel so that the rotor is bonded to the magnet by the adhesive,
a first support member disposed on one end of the magnet in a direction of the rotor axis, the first support member having
a first adhesive channel formed therein and through which the adhesive is flowable and configured to communicate with the magnet bonding channel so that the first support member is bonded to the magnet by the adhesive flowed from the first adhesive channel, and
a second support member disposed at an other end of the magnet in the direction of the rotor axis and having a second adhesive channel configured to communicate with the first adhesive channel via the magnet bonding channel such that the adhesive is flowable between the second support member and the other end of the magnet,
wherein:
the first adhesive channel includes:
an inlet formed in an outer surface of the first support member through which the adhesive is inputtable;
an inflow channel configured to communicate with the inlet; and
a first flow channel configured to communicate with the inflow channel, in an inner surface of the first support member facing the one end of the magnet, and is extending from the inflow channel toward the rotor axis, so that the first support member is bonded to the magnet by the adhesive flowed from the first flow channel; and
the second adhesive channel includes:
a second flow channel configured to communicate with the magnet bonding channel, in an inner surface of the second support member facing the other end of the magnet, and is radially formed around the rotor axis; and
an outflow channel in an outer surface of the second support member configured to communicate with the second flow channel and an outlet out of which the adhesive is outputtable.

9. The motor assembly according to claim 8, wherein the inlet and the outlet are disposed apart from the rotor shaft.

10. The motor assembly according to claim 8, wherein the inflow channel and the outflow channel are spaced apart from the rotor shaft in a direction parallel to the rotor shaft, and are provided to pass through the first support member and the second support member respectively.

11. A motor assembly comprising:
a stator having a rotor receptacle; and
a rotor disposed in the rotor receptacle to electromagnetically interact with the stator,
wherein the rotor includes
a rotor shaft rotatable about a rotor axis,
a magnet bonded to the rotor shaft and configured to form a magnetic field, the magnet having a magnet bonding channel formed therein and through which an adhesive is flowable to fill the magnet bonding channel so that the rotor shaft is bonded to the magnet by the adhesive, and
a first support member disposed on one end of the magnet in a direction of the rotor axis, the first support member having
a first adhesive channel formed therein and through which the adhesive is flowable and configured to communicate with the magnet bonding channel so that the first support member is bonded to the magnet by the adhesive flowed from the first adhesive channel, and
a second support member disposed at an other end of the magnet in the direction of the rotor axis, the second support member having
a second adhesive channel configured to communicate with the first adhesive channel via the magnet bonding channel such that the adhesive is flowable between the second support member and the other end of the magnet,
wherein the first support member includes:
an adhesion portion provided in a top surface of second support member that faces the magnet, and
an anti-leakage groove that is recessed as a shape of trench in the adhesion portion and configured to collect the adhesive leaked from the second adhesive channel, the anti-leakage groove configured to prevent the adhesive from flowing on the outside the rotor.

12. The motor assembly according to claim 11, wherein the anti-leakage groove includes an outer anti-leakage groove that is disposed outside the first adhesive channel and the second adhesive channel around the rotor axis and that is formed around the rotor axis in a circumferential direction.

13. The motor assembly according to claim 11, wherein:
the first adhesive channel and the second adhesive channel respectively include a plurality of first channels and a plurality of second channels that are disposed around the rotor axis at intervals in a circumferential direction respectively, and
the anti-leakage groove further includes inner anti-leakage grooves that are spaced around the rotor axis in the circumferential direction and are disposed between the plurality of first channels and the plurality of second channels.

14. A motor assembly comprising:
a rotor shaft rotatable about a rotor axis;
a magnet including a channel formed therein and through which an adhesive is flowable so that the rotor shaft is bonded to the magnet by the adhesive;

a first support member including
- an inlet through which the adhesive is inputtable, and
- a first flow channel formed so the adhesive input through the inlet flows between the first support member and one end of the magnet so that the first support member is bonded to the magnet by the adhesive, the first flow channel extending radially inward to the rotor axis; and a second support member including
- a second flow channel configured to communicate with the first flow channel so that the adhesive flows between the second support member and an other end of the magnet, and
- an outlet through which the adhesive that flows between the second support member and the other end of the magnet is outputtable, wherein at least one of the first support member and the second support member includes at least a portion formed parallel to the rotor axis.

* * * * *